US010955953B2

(12) United States Patent
Mizuhashi et al.

(10) Patent No.: US 10,955,953 B2
(45) Date of Patent: Mar. 23, 2021

(54) LIQUID CRYSTAL DISPLAY DEVICE

(71) Applicant: Japan Display Inc., Tokyo (JP)

(72) Inventors: Hiroshi Mizuhashi, Tokyo (JP);
Yasuyuki Teranishi, Tokyo (JP);
Toshiaki Fukushima, Tokyo (JP);
Daisuke Ito, Tokyo (JP); Gen Koide,
Tokyo (JP); Tadayoshi Katsuta, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 16/859,281

(22) Filed: Apr. 27, 2020

(65) Prior Publication Data

US 2020/0257401 A1 Aug. 13, 2020

Related U.S. Application Data

(63) Continuation of application No. 16/161,901, filed on Oct. 16, 2018, now Pat. No. 10,635,229, which is a
(Continued)

(30) Foreign Application Priority Data

Jan. 9, 2015 (JP) .................................. 2015-003700

(51) Int. Cl.
*G06F 3/041* (2006.01)
*G09G 3/36* (2006.01)
(Continued)

(52) U.S. Cl.
CPC .......... *G06F 3/0412* (2013.01); *G02F 1/1368* (2013.01); *G02F 1/13306* (2013.01);
(Continued)

(58) Field of Classification Search
None
See application file for complete search history.

(56) References Cited

U.S. PATENT DOCUMENTS 9,201,541 B2  12/2015  Kida et al.
9,442,596 B2   9/2016  Kida et al.
(Continued)

FOREIGN PATENT DOCUMENTS

JP     2012230657      11/2012
JP     2014132446 A    7/2014
KR  10-2014-0144651 A  12/2014

OTHER PUBLICATIONS

Notification of Reasons for Refusal (with English translation) dated Jan. 17, 2017 in corresponding Korean application No. 10-2016-0001715 (15 pages).

*Primary Examiner* — Carl Adams
(74) *Attorney, Agent, or Firm* — K&L Gates LLP

(57) ABSTRACT

A liquid crystal display device is provided and includes a liquid crystal element array having pixel electrodes and switching elements arranged in a matrix form; scanning lines arranged in each row of the liquid crystal element array and supply a scanning signal to switching elements; signal lines arranged in each column of the liquid crystal element array and supply an image signal to the pixel electrodes through switching elements; touch electrodes overlapping pixel electrodes and arranged in the column of the liquid crystal element array; signal line drive circuit arranged along one side of the liquid crystal element array parallel to the row of the liquid crystal element array and forms the image signal; first circuit arranged along the other side of the liquid crystal element array parallel to the row of the liquid crystal element array and is connected to the touch electrodes; and second circuit arranged along the one side of the liquid crystal element array and is connected to the touch elec-
(Continued)

trodes, wherein a touch signal is supplied from the second circuit on the one side of the liquid crystal element array and the touch signal is supplied from the first circuit on the other side of the liquid crystal element array.

4 Claims, 23 Drawing Sheets

Related U.S. Application Data continuation of application No. 14/987,358, filed on Jan. 4, 2016, now Pat. No. 10,156,926.

(51) Int. Cl.
*G06F 3/044* (2006.01)
*G02F 1/133* (2006.01)
*G02F 1/1343* (2006.01)
*G02F 1/1362* (2006.01)
*G02F 1/1368* (2006.01)
*G02F 1/1345* (2006.01)
*G02F 1/1333* (2006.01)

(52) U.S. Cl.
CPC .. *G02F 1/134336* (2013.01); *G02F 1/136286* (2013.01); *G06F 3/0445* (2019.05); *G06F 3/0446* (2019.05); *G06F 3/04184* (2019.05); *G06F 3/041662* (2019.05); *G09G 3/3611* (2013.01); *G02F 1/1345* (2013.01); *G02F 1/13338* (2013.01); *G06F 2203/04101* (2013.01)

(56) References Cited

U.S. PATENT DOCUMENTS

| | | | |
|---|---|---|---|
| 2006/0244741 | A1 | 11/2006 | Kimura et al. |
| 2011/0169761 | A1* | 7/2011 | Sakai .................... G06F 3/0412 345/173 |
| 2012/0056835 | A1 | 3/2012 | Choo et al. |
| 2013/0076675 | A1 | 3/2013 | Shin et al. |
| 2014/0132534 | A1* | 5/2014 | Kim ................. G06F 3/04166 345/173 |
| 2014/0362042 | A1 | 12/2014 | Noguchi et al. |
| 2016/0364049 | A1 | 12/2016 | Kida et al. |

* cited by examiner

FIG 4A
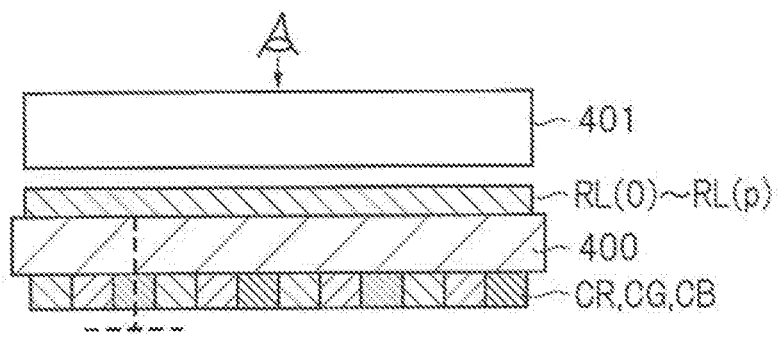
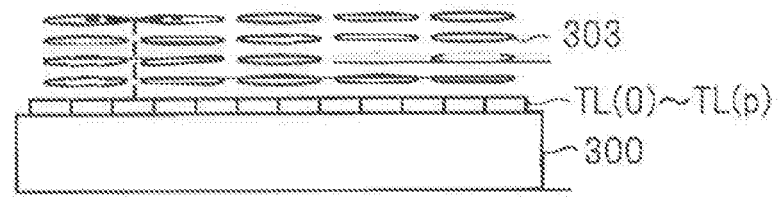
FIG 4B
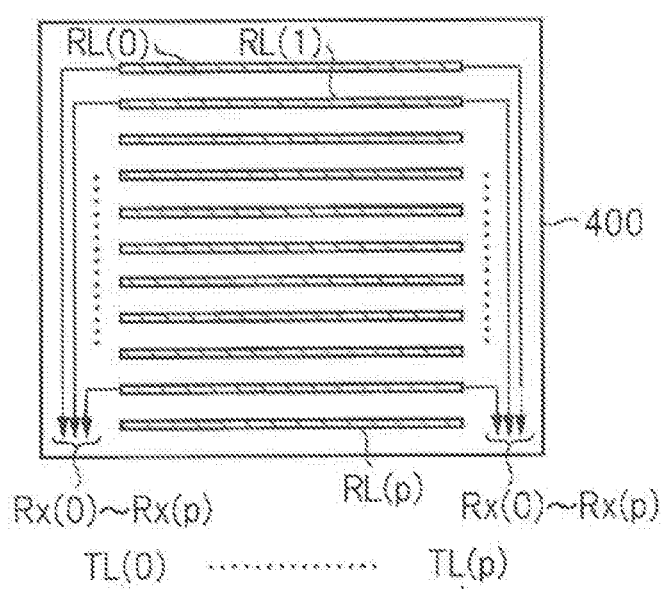
FIG 4C
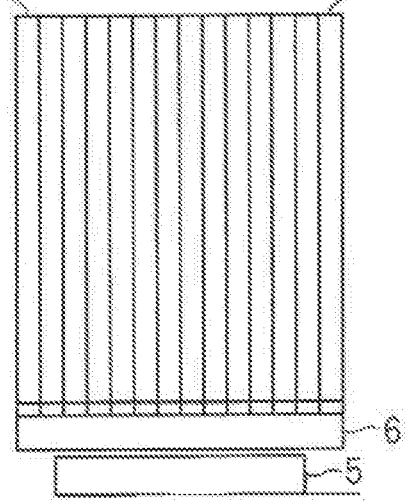

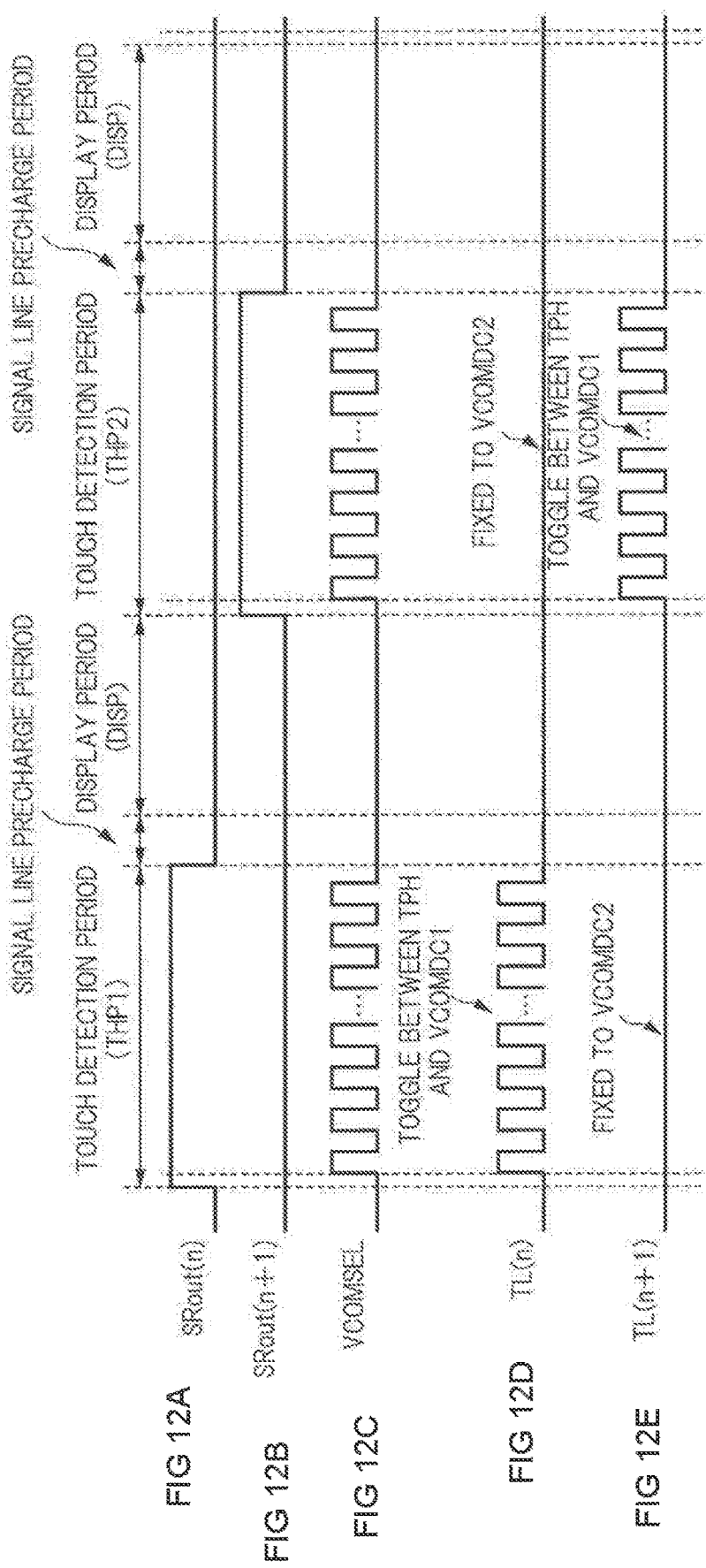

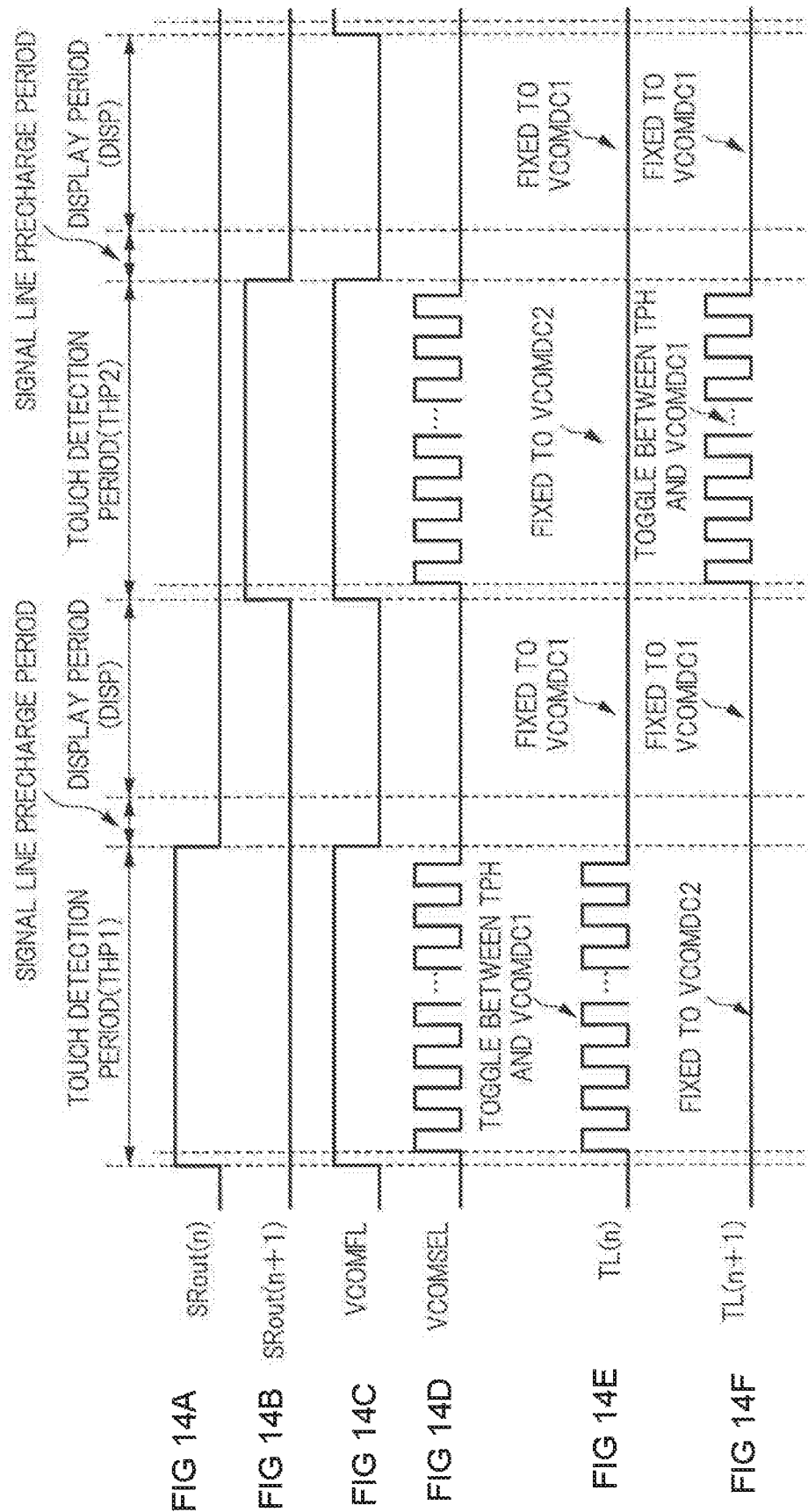

LIQUID CRYSTAL DISPLAY DEVICE

CROSS REFERENCES TO RELATED APPLICATIONS

The present application is a continuation of U.S. application Ser. No. 16/161,901, filed on Oct. 16, 2018, which application is a continuation of U.S. application Ser. No. 14/987,358, filed on Jan. 4, 2016 and issued as U.S. Pat. No. 10,156,926 on Dec. 18, 2018, which application claims priority to Japanese Priority Patent Application JP 2015-003700 filed in the Japan Patent Office on Jan. 9, 2015, the entire content of which is hereby incorporated by reference.

BACKGROUND

The present invention relates to a liquid crystal display device, and in particular, relates to a liquid crystal display device with a touch detection function capable of detecting an external proximity object.

In recent years, a touch detection device referred to as a touch panel capable of detecting an external proximity object has attracted attention. The touch panel is mounted on or integrated with a display device such as a liquid crystal display device. In a liquid crystal display device in which a touch panel is mounted on or integrated with a display device, that is, a liquid crystal display device with a touch detection function, various button images or the like are displayed on the display device, and proximity of an external object to a button image is detected through the touch panel. This enables the use of the touch panel as information input means instead of a normal mechanical button. Since such a liquid crystal display device with a touch detection function does not necessarily need information input means such as a keyboard or a mouse, its use tends to increase with the inclusion of mobile information terminals such as mobile phones in addition to computers.

As a detection method of a touch detection device, some methods such as an optical type, a resistance type and a capacitance type are known. Among these types, a capacitance type touch detection device has a relatively simple structure and consumes less power and so is used for mobile information terminals and the like. Japanese Patent Application Laid-Open Publication No. 2012-230657 (Patent Document 1) describes a capacitance type touch detection device.

Further, in the liquid crystal display device, a narrower edge frame has been more and more demanded. Namely, the reduction in width of the edge frame surrounding a display surface of the liquid crystal display device has been demanded.

SUMMARY

In a capacitance type touch detection device, for example, proximity of an external object is detected by utilizing the change in the capacitance value at an intersecting portion where a drive electrode and a detection electrode intersect due to the proximity (including contact) of an external object such as a finger as illustrated in Patent Document 1. Namely, proximity of an external object is detected based on a detection signal generated in the detection electrode when a drive signal is supplied to the drive electrode. In a touch detection device, a plurality of drive electrodes and a plurality of detection electrodes are provided, and the plurality of drive electrodes are sequentially arranged in a column direction and the plurality of detection electrodes are sequentially arranged in a row direction so as to intersect with the plurality of drive electrodes.

On the other hand, a drive circuit that forms a drive signal supplied to the drive electrode is arranged in a part of a module covered with an edge frame. Thus, with the further reduction in width of the edge frame, the part where the drive circuit is arranged becomes smaller, so that the driving ability of the drive circuit may become insufficient for achieving a predetermined value of the voltage of the drive electrode within a predetermined time.

In Patent Document 1, insufficient driving ability of the drive circuit due to the reduction in width of the edge frame is not recognized.

An object of the present invention is to provide a liquid crystal display device with a touch detection function capable of achieving the reduction in width of an edge frame while suppressing the degradation in driving ability.

A liquid crystal display device according to an aspect of the present invention includes: a liquid crystal element array having a plurality of liquid crystal display elements arranged in a matrix form; a plurality of scanning lines which are arranged in each row of the liquid crystal element array and supply a scanning signal to the plurality of liquid crystal display elements arranged in a corresponding row; a plurality of signal lines which are arranged in each column of the liquid crystal element array and supply an image signal to the plurality of liquid crystal display elements arranged in a corresponding column; a plurality of drive electrodes which are arranged in the column of the liquid crystal element array and to which a drive signal to detect a touch is supplied; a signal line drive circuit which is arranged along one side of the liquid crystal element array parallel to the row of the liquid crystal element array and forms the image signal; and a first electrode drive circuit which is arranged along the other side of the liquid crystal element array parallel to the row of the liquid crystal element array and forms the drive signal, and the drive signal is supplied from the first electrode drive circuit to the drive electrodes arranged in the column of the liquid crystal element array on the other side of the liquid crystal element array.

In another aspect, the liquid crystal display device includes: a first voltage wire to supply a first voltage; a second voltage wire to supply a second voltage; and a third voltage wire to supply a third voltage, the first electrode drive circuit is connected to the first voltage wire, the second voltage wire and the third voltage wire and supplies the drive signal whose voltage periodically changes between a voltage based on a voltage of the first voltage wire and a voltage based on a voltage of the second voltage wire to a selected drive electrode among the plurality of drive electrodes, and the first electrode drive circuit supplies a voltage based on a voltage of the third voltage wire to a non-selected drive electrode among the plurality of drive electrodes.

In another aspect, each of the first voltage wire, the second voltage wire and the third voltage wire is arranged along the other side of the liquid crystal element array.

In another aspect, the second voltage and the third voltage have the same voltage value.

In another aspect, a line width of the third voltage wire is smaller than a line width of the second voltage wire.

In another aspect, the liquid crystal display device includes: a second electrode drive circuit which is arranged along the one side of the liquid crystal element array and forms the drive signal, and to the drive electrodes arranged in the column of the liquid crystal element array, the drive signal is supplied from the second electrode drive circuit on the one side of the liquid crystal element array and the drive signal is supplied from the first electrode drive circuit on the other side of the liquid crystal element array.

In another aspect, the liquid crystal display device includes: first and second voltage wires to supply a first voltage; third and fourth voltage wires to supply a second voltage; and fifth and sixth voltage wires to supply a third voltage, the first electrode drive circuit is connected to the first voltage wire, the third voltage wire and the fifth voltage wire and supplies the drive signal whose voltage periodically changes between a voltage based on a voltage of the first voltage wire and a voltage based on a voltage of the third voltage wire to a selected drive electrode among the plurality of drive electrodes, the first electrode drive circuit supplies a voltage based on a voltage of the fifth voltage wire to a non-selected drive electrode among the plurality of drive electrodes, the second electrode drive circuit is connected to the second voltage wire, the fourth voltage wire and the sixth voltage wire and supplies the drive signal whose voltage periodically changes between a voltage based on a voltage of the second voltage wire and a voltage based on a voltage of the fourth voltage wire to the selected drive electrode among the plurality of drive electrodes, and the second electrode drive circuit supplies a voltage based on a voltage of the sixth voltage wire to the non-selected drive electrode among the plurality of drive electrodes.

In another aspect, the second voltage and the third voltage have the same voltage value and a line width of the sixth voltage wire is smaller than a line width of the fourth voltage wire.

In another aspect, the liquid crystal display device includes: first and second voltage wires to supply a first voltage; third and fourth voltage wires to supply a second voltage; and a fifth voltage wire to supply a third voltage, the first electrode drive circuit is connected to the first voltage wire, the third voltage wire and the fifth voltage wire and supplies the drive signal whose voltage periodically changes between a voltage based on a voltage of the first voltage wire and a voltage based on a voltage of the third voltage wire to a selected drive electrode among a plurality of touch detection drive electrodes, the first electrode drive circuit supplies a voltage based on a voltage of the fifth voltage wire to a non-selected drive electrode among the plurality of drive electrodes, the second electrode drive circuit is connected to the second voltage wire and the fourth voltage wire and supplies the drive signal whose voltage periodically changes between a voltage based on a voltage of the second voltage wire and a voltage based on a voltage of the fourth voltage wire to the selected drive electrode among the plurality of touch detection drive electrodes, and the second electrode drive circuit is in a high-impedance state with respect to the non-selected drive electrode among the plurality of drive electrodes.

In another aspect, the first electrode drive circuit includes a plurality of first unit electrode drive circuits corresponding to each of the plurality of drive electrodes and connected to the first voltage wire, the third voltage wire and the fifth voltage wire, each of the plurality of first unit electrode drive circuits includes a first switch connected between a corresponding drive electrode and the first voltage wire, a second switch connected between a corresponding drive electrode and the third voltage wire, a third switch connected between a corresponding drive electrode and the fifth voltage wire, and a first control circuit, the first switch, the second switch and the third switch are controlled by the first control circuit so as to be alternatively brought into conduction, the second electrode drive circuit includes a plurality of second unit electrode drive circuits corresponding to each of the plurality of drive electrodes and connected to the second voltage wire and the fourth voltage wire, each of the plurality of second unit electrode drive circuits includes a fourth switch connected between a corresponding drive electrode and the second voltage wire, a fifth switch connected between a corresponding drive electrode and the fourth voltage wire, and a second control circuit, and each of the fourth switch and the fifth switch is controlled by the second control circuit so as to be brought into conduction or out of conduction.

In another aspect, each of the plurality of drive electrodes is a common electrode, and the plurality of liquid crystal display elements are connected between the signal line and the common electrode at a time of display and a predetermined voltage is supplied from the first electrode drive circuit and the second electrode drive circuit to the common electrode to perform the display in accordance with the image signal.

In another aspect, the liquid crystal display device includes: a plurality of detection electrodes arranged in the row of the liquid crystal element array; and a touch control device connected to the plurality of detection electrodes to detect a change of a signal in the detection electrodes caused by a touch.

In another aspect, each of the first electrode drive circuit and the second electrode drive circuit includes a scanning circuit which sequentially forms a selection signal, and each of the first electrode drive circuit and the second electrode drive circuit sequentially supplies the drive signal to the drive electrodes arranged in the column of the liquid crystal element array based on the selection signal.

In another aspect, the liquid crystal display device includes: a touch control device which detects a change of a signal in the drive electrodes depending on presence or absence of the touch by the supply of the drive signal to the drive electrodes.

Additional features and advantages are described herein, and will be apparent from the following Detailed Description and the figures.

BRIEF DESCRIPTION OF THE FIGURES

FIG. 4(A) to FIG. 4(C) are a sectional view and plan views showing an overview of the module mounted with the liquid crystal display device with a touch detection function according to the first embodiment;

FIG. 12(A) to FIG. 12(E) are waveform charts showing operations of the first electrode drive circuit and the second electrode drive circuit according to the first embodiment;

FIG. 14(A) to FIG. 14(F) are waveform charts showing operations of the first electrode drive circuit and the second electrode drive circuit;

DETAILED DESCRIPTION

Figure 1:
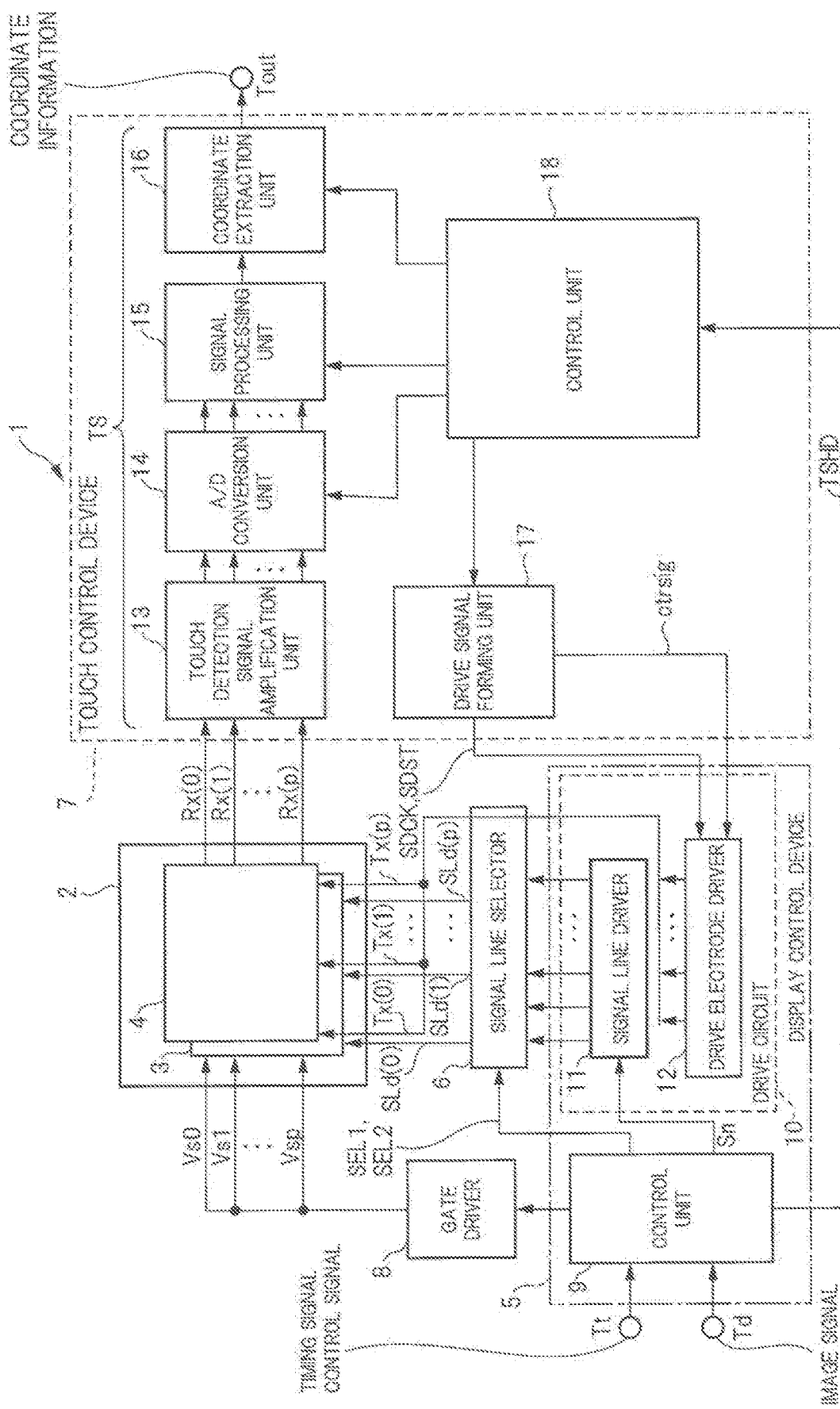
FIG. 1 is a block diagram showing a configuration of a liquid crystal display device with a touch detection function according to the first embodiment.

Hereinafter, each embodiment of the present invention will be described with reference to the drawings. However, the disclosure is only by way of example and inventions that can easily be anticipated by persons skilled in the art by making appropriate alterations without deviating from the spirit of the invention are naturally included in the scope of the present invention. Some drawings are shown schematically concerning the width, thickness, shape or the like of each portion when compared with an actual mode for the purpose of making the description clearly understood, but are provided only by way of example and do not intend to limit the interpretation of the present invention.

In this specification and each drawing, the same reference characters are attached to elements similar to those described in previous drawings and a detailed description thereof may be omitted.

First Embodiment

As the first embodiment, an example in which a touch detection device is applied to an in-cell type liquid crystal display device with a touch detection function integrated with a display device will be described. Here, the in-cell type liquid crystal display device with a touch detection function means a liquid crystal display device with a touch detection function in which at least one of the drive electrode and the detection electrode included in the touch detection device is provided between a pair of substrates opposed via the liquid crystal of the display device. In the first embodiment, the case in which the drive electrode included in the touch detection device is used also as a drive electrode that drives the liquid crystal will be described.

Overall Configuration

First, an overall configuration of a liquid crystal display device 1 with a touch detection function will be described with reference to FIG. 1. FIG. 1 is a block diagram showing the configuration of the liquid crystal display device 1 with a touch detection function. The liquid crystal display device 1 with a touch detection function includes a liquid crystal panel (display panel) 2, a display control device 5, a signal line selector 6, a touch control device 7 and a gate driver 8. In FIG. 1, the liquid crystal panel 2 is depicted schematically to make the drawing easier to view and includes a liquid crystal panel unit (display panel unit) 3 and a touch detection panel unit 4. The configuration of the liquid crystal panel 2 will be described below with reference to FIGS. 3, 4 and 5.

As will be described below, the liquid crystal panel unit 3 and the touch detection panel unit 4 share a part of the configuration such as the drive electrode. Scanning signals Vs0 to Vsp are supplied to the liquid crystal panel unit 3 from the gate driver 8 and image signals SLd(0) to SLd(p) are further supplied thereto from the display control device 5 via the signal line selector 6 to display images in accordance with the image signals SLd(0) to SLd(p). The touch detection panel unit 4 receives drive signals Tx(0) to Tx(p) supplied from the display control device 5 and outputs detection signals Rx(0) to Rx(p) to the touch control device 7.

The display control device 5 has a control unit 9 and a drive circuit 10, and the drive circuit 10 includes a signal line driver (signal line drive circuit) 11 that forms and outputs image signals and a drive electrode driver (first electrode drive circuit) 12 that outputs the drive signals Tx(0) to Tx(p). The control unit 9 receives a timing signal and a control signal supplied to a control terminal Tt and an image signal supplied to an image terminal Td and supplies an image signal Sn in accordance with the image signal supplied to the image terminal Td to the signal line driver 11. Though not particularly limited, the signal line driver 11 temporarily multiplexes the image signals Sn supplied from the control unit 9 and outputs the multiplexed signal to the signal line selector 6. Namely, when one output terminal of the signal line driver 11 is viewed, two image signals are output from one terminal while being temporarily shifted.

Also, the control unit 9 supplies selection signals SEL1 and SEL2 to distribute temporarily multiplexed signals to mutually different signal lines in the signal line selector 6 to the signal line selector 6. The signal line selector 6 distributes the image signals supplied after being multiplexed to mutually different signal lines based on the selection signals SEL1 and SEL2 and supplies the image signals as the image signals SLd(0) to SLd(p) to the liquid crystal panel unit 3. The signal line selector 6 is disposed near the liquid crystal panel unit 3. By temporarily multiplexing image signals as described above, the number of wires to electrically connect the display control device 5 and the liquid crystal panel unit 3 can be reduced. In other words, the delay of image signals can be reduced by increasing the line width of the wire connecting the display control device 5 and the liquid crystal panel unit 3.

The control unit 9 supplies a timing signal to the gate driver 8 based on a timing signal and a control signal supplied to the control terminal Tt. The gate driver 8 generates and supplies the scanning signals Vs0 to Vsp to the liquid crystal panel unit 3 based on the supplied timing signal. The scanning signals Vs0 to Vsp generated by the gate driver 8 are, for example, pulse signals which become higher in level sequentially from the scanning signal Vs0 to the scanning signal Vsp.

The drive electrode driver 12 in the drive circuit 10 receives a clock signal SDCK and a selection signal SDST supplied from the touch control device 7, and selects a drive electrode TL(i) from a plurality of drive electrodes TL (i, i=0 to p: see FIG. 3 and the like) included in the liquid crystal panel 2 to supply a drive signal Tx(i) to the selected drive electrode TL(i).

The liquid crystal display device 1 with a touch detection function according to the first embodiment is of an in-cell type, and the drive electrode TL(i) is used for both of the driving of touch detection and the driving of liquid crystal. Namely, the drive electrode TL(i) functions to form an electric field for driving the liquid crystal between the drive electrode and a pixel electrode described below at the time of the image display and functions to transmit a drive signal for touch detection at the time of the touch detection. Thus, in this specification, the drive electrode TL(i) may be referred to also as a common electrode TL(i). Particularly when it is clear that the common electrode TL(i) functions for the touch detection, the electrode may simply be referred to as the drive electrode TL(i).

FIG. 1 shows the drive signal Tx(i) as a signal supplied to the common electrode TL(i). The image display of the liquid crystal in the liquid crystal panel unit 3 and the touch detection in the touch detection panel unit 4 are performed in a time-division manner to avoid temporal overlapping. In this specification, a period in which an image is displayed is referred to as a display period and a period in which a touch detection is performed is referred to as a touch detection period.

The drive electrode driver 12 supplies the drive signal Tx(i) to drive the liquid crystal to the common electrode TL(i) in the liquid crystal panel 2 in the display period in which the image display is performed, and supplies the drive signal Tx(i) for touch detection to the common electrode TL(i) in the liquid crystal panel 2 in the detection period in which the touch detection is performed. Naturally, a drive electrode driver for touch detection and a drive electrode driver for driving liquid crystal may be separately provided in the drive circuit 10. In addition, the control unit 9 outputs a touch-display synchronizing signal TSHD that distinguishes between the display period and the touch detection period.

The touch control device (touch control unit) 7 includes a detection signal processing unit (determination unit) TS that processes the detection signals Rx(0) to Rx(p) from the touch detection panel unit 4, a drive signal forming unit 17 that forms the clock signal SDCK, the selection signal SDST and a plurality of control signals ctrsig supplied to the drive electrode driver 12, and a control unit 18 that controls the detection signal processing unit TS and the drive signal forming unit 17. Here, the detection signal processing unit TS detects whether the touch detection panel unit 4 is touched, and if it is touched, the detection signal processing unit TS performs the processing to determine coordinates of the touched position. Also, the drive signal forming unit 17 specifies and controls an area where a touch is detected in the touch detection panel unit 4.

The detection signal processing unit TS will be first described. The detection signal processing unit TS includes a touch detection signal amplification unit 13 that receives the detection signals Rx(0) to Rx(p) from the touch detection panel unit 4 and amplifies the received detection signals Rx(0) to Rx(p) and an analog/digital conversion unit (hereinafter, referred to as an A/D conversion unit) 14 that converts an analog detection signal amplified by the touch detection signal amplification unit 13 into a digital signal. Here, the touch detection signal amplification unit 13 performs an amplification operation by removing high frequency components (noise components) from the received detection signals Rx(0) to Rx(p). Also, as will be described below with reference to FIG. 2, the detection signals Rx(0) to Rx(p) are generated in response to the drive signal Tx(i) supplied to the common electrode TL(i). Thus, in the first embodiment, the A/D conversion unit 14 is controlled by the control unit 18 so as to sample an amplified signal from the touch detection signal amplification unit 13 and convert it into a digital signal in synchronization with the drive signal Tx(i).

Further, the detection signal processing unit TS includes a signal processing unit 15 that receives the digital signal obtained by the conversion operation of the A/D conversion unit 14 and performs signal processing on the digital signal and a coordinate extraction unit 16 that extracts coordinates of the touched position from the signal obtained by the processing of the signal processing unit 15. The signal processing performed by the signal processing unit 15 includes the processing to remove noise components of higher frequencies than the sampling frequency by the A/D conversion unit 14 and detect whether the touch detection panel unit 4 is touched. Coordinates of the touched position extracted by the coordinate extraction unit 16 are output from an output terminal Tout as coordinate information.

The drive signal forming unit 17 forms the clock signal SDCK, the selection signal SDST and the plurality of control signals ctrsig based on the control signal from the control unit 18, and supplies these signals to the drive electrode driver 12. As will be described in detail below, the drive electrode driver 12 includes a scanning circuit.

The scanning circuit has a shift register that receives the clock signal SDCK as a shift clock signal in the touch detection period. Here, each stage of the shift register corresponds to the common electrode TL(i). For example, a selection signal is set to the initial stage of the shift register and the selection signal moves through the stages of the shift register in accordance with the change of the clock signal SDCK serving as a shift clock signal. The drive electrode driver 12 forms and supplies the drive signal Tx(i) to the common electrode TL(i) corresponding to the stage reached by the selection signal. Accordingly, by controlling the clock signal SDCK and the selection signal SDST, the selection signal can be sequentially moved from any common electrode TL(i) to the stages corresponding to a plurality of common electrodes TL(i) arranged next to each other, and whether a neighborhood of the plurality of common electrodes arranged next to each other is touched can be scanned.

The control unit 18 receives the touch-display synchronizing signal TSHD output from the control unit 9 of the display control device 5, and when the touch-display synchronizing signal TSHD indicates the touch detection period, the control unit 18 controls the drive signal forming unit 17 to form the clock signal SDCK, the selection signal SDST and the control signal ctrsig. Also, the control unit 18 controls the A/D conversion unit 14, the signal processing unit 15 and the coordinate extraction unit 16 so that the detection signals Rx(0) to Rx(p) received by the touch detection signal amplification unit 13 are converted and the touched coordinates are extracted in the touch detection period.

Basic Principle of Capacitance Type Touch Detection (Mutual Capacitance Type)

Figure 2A:
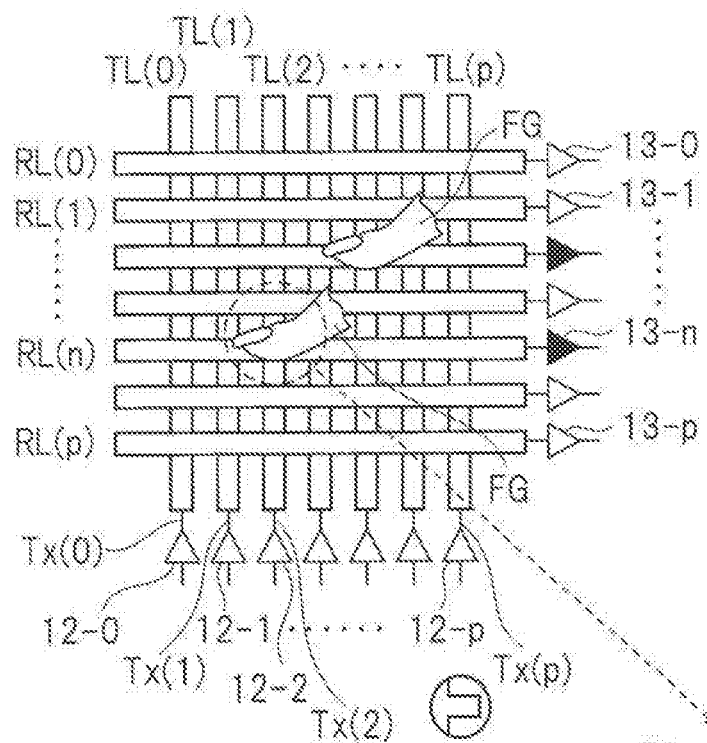
FIG. 2(A) to FIG. 2(C) are explanatory views for describing the basic principle of capacitance type touch detection (mutual capacitance type)
Figure 2B:
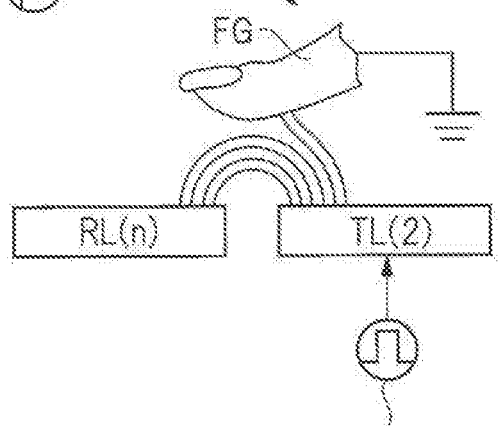
Figure 2C:
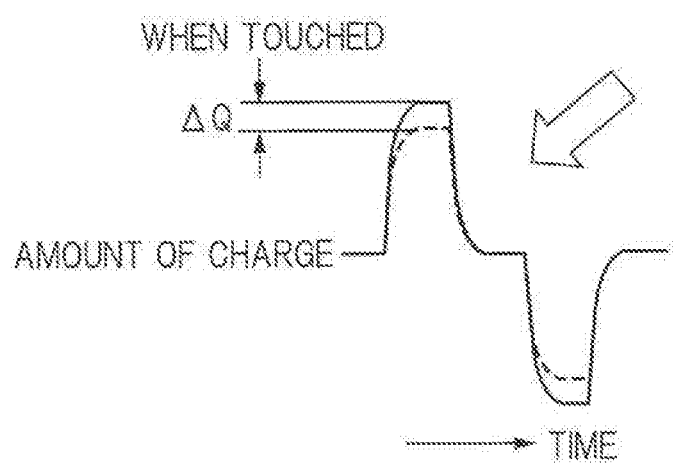

FIG. 2(A) to FIG. 2(C) are schematic diagrams showing the basic principle of the capacitance type touch detection used in the first embodiment. In FIG. 2(A), each of TL(0) to TL(p) is a common electrode provided in the liquid crystal panel 2 and each of RL(0) to RL(p) is a detection electrode provided in the touch detection panel unit 4. In FIG. 2(A), each of the common electrodes TL(0) to TL(p) extends in a column direction and is arranged in parallel to a row direction. Also, each of the detection electrodes RL(0) to RL(p) extends in the row direction so as to intersect with the common electrodes TL(0) to TL(p) and is arranged in parallel to the column direction. The detection electrodes RL(0) to RL(p) are formed above the common electrodes TL(0) to TL(p) so that a gap arises between the detection electrodes RL(0) to RL(p) and the common electrodes TL(0) to TL(p).

In FIG. 2(A), each of 12-0 to 12-$p$ schematically shows a unit drive electrode driver provided in the drive electrode driver 12. In FIG. 2(A), the drive signals Tx(0) to Tx(p) are output from the unit drive electrode drivers 12-0 to 12-$p$, respectively. Also, each of 13-0 to 13-$p$ schematically shows a unit amplifier in the touch detection signal amplification unit 13. In FIG. 2(A), a pulse signal encircled by a solid line shows the waveform of the drive signal Tx(i). In FIG. 2(A), a finger FG is shown as an external object.

In the example of FIG. 2, the drive signal Tx(2) is supplied to the common electrode TL(2) from the drive electrode driver 12. By supplying the drive signal Tx(2) serving as a pulse signal to the common electrode TL(2), as shown in FIG. 2(B), an electric field is generated between the common electrode TL(2) and the detection electrode RL(n) intersecting with the common electrode TL(2). If the finger FG touches a position near the common electrode TL(2) of the liquid crystal panel 2 at this time, an electric field is generated also between the finger FG and the common electrode TL(2) and the electric field generated between the common electrode TL(2) and the detection electrode RL(n) decreases. Accordingly, the amount of charge between the common electrode TL(2) and the detection electrode RL(n) decreases. As a result, as shown in FIG. 2(C), the amount of charge generated in response to the supply of the drive signal Tx(2) decreases by ΔQ when the finger FG touches compared with the case in which the finger FG does not touch. The difference in the amount of charge appears in the detection signal Rx(n) as a difference of voltage, and is supplied to the unit amplifier 13-$n$ in the touch detection signal amplification unit 13 and then amplified.

In FIG. 2(C), the horizontal axis represents the time and the vertical axis represents the amount of charge. The amount of charge increases (increases upward in FIG. 2(C)) in response to a rise of the drive signal Tx(2) and the amount of charge increases (increases downward in FIG. 2(C)) in response to a fall of the voltage of the drive signal Tx(2). At this time, an increased amount of charge changes depending on the presence or absence of the touch of the finger FG. Further, in the drawing, after the amount of charge increases upward, a reset of the amount of charge is carried out before the amount of charge increases downward. Similarly, after the amount of charge increases downward, a reset of the amount of charge is carried out before the amount of charge increases upward. In this manner, the amount of charge changes upward and downward on the basis of the reset amount of charge.

By sequentially supplying the drive signals Tx(0) to Tx(p) to the common electrodes TL(0) to TL(p), the detection signals Rx(0) to Rx(p) having the voltage value depending on whether the finger FG touches a position near the respective intersection portions are output from each of the plurality of detection electrodes RL(0) to RL(p) intersecting with the common electrode to which the drive signal Tx(i) is supplied. The A/D conversion unit 14 (FIG. 1) samples and converts each of the detection signals Rx(0) to Rx(p) into a digital signal at the time when the difference ΔQ arises in the amount of charge based on whether the finger FG touches.

Module

Figure 3A:
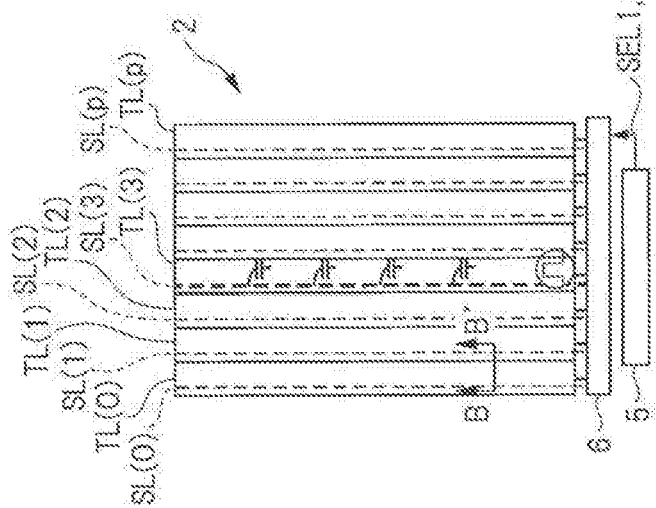
FIG. 3(A) and FIG. 3(B) are a plan view and a sectional view showing an overview of a module mounted with the liquid crystal display device with a touch detection function according to the first embodiment.
Figure 3B:
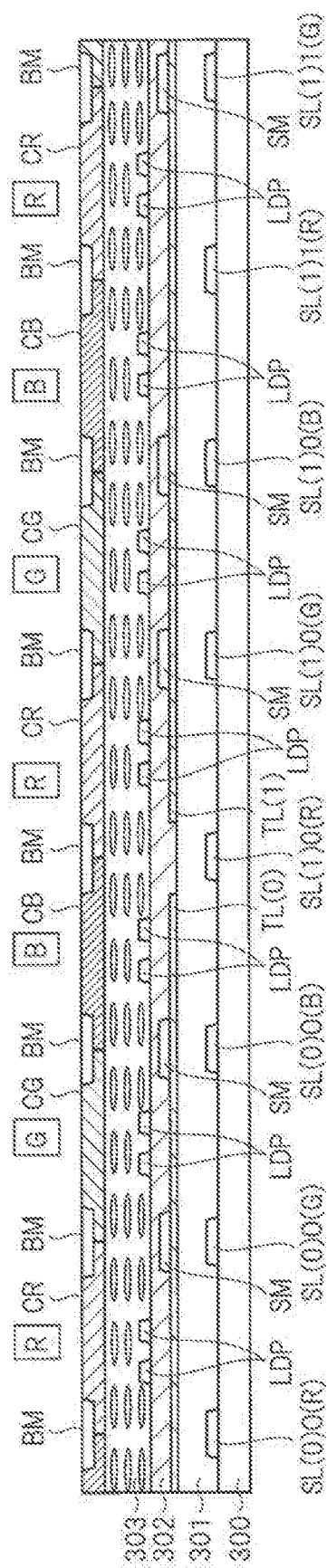

FIG. 3(A) is a plan view showing an overview of a module in which the liquid crystal display device 1 with a touch detection function according to the first embodiment is mounted. FIG. 3(B) is a sectional view of the line B-B' in FIG. 3(A).

The liquid crystal panel 2 includes signal lines SL(0) to SL(p) extending in a longitudinal direction in FIG. 3(A) and arranged in parallel in a lateral direction and a plurality of common electrodes TL(0) to TL(p) extending in the same direction as the extending direction of the signal lines SL(0) to SL(p). Namely, the common electrodes TL(0) to TL(p) also extend in a longitudinal direction in FIG. 3(A) and are arranged in parallel in a lateral direction. Note that scanning lines to which the selection signals Vs0 to Vsp are supplied and the detection electrodes RL(0) to RL(p) that transmit the detection signals Rx(0) to Rx(p) extend in a lateral direction and are arranged in parallel in a longitudinal direction, but are omitted in FIG. 3(A).

The display control device 5 and the signal line selector 6 described with reference to FIG. 1 are arranged on the side of a short side of the liquid crystal panel 2. Namely, the display control device 5 and the signal line selector 6 extend in a direction perpendicular to the signal lines SL(0) to SL(p) and the common electrode TL(0) to TL(p). As will be described below with reference to FIG. 5, the signal line selector 6 is formed on the same substrate as the liquid crystal panel 2, the signal lines SL(0) to SL(p) are connected to the signal line selector 6, and an image signal output from the display control device 5 is supplied to the signal lines SL(0) to SL(p) of the liquid crystal panel 2 via the signal line selector 6. Here, signals supplied from the display control device 5 to the signal line selector 6 are an image signal and a selection signal. Since the liquid crystal panel 2 performs a color display, the image signals supplied from the display control device 5 to the signal line selector 6 are image signals of R (red), G (green) and B (blue) corresponding to three primary colors and are shown as R/G/B in FIG. 3(A). Also, selection signals are shown as SEL1 and SEL2 in FIG. 3(A).

Each of the signal lines SL(0) to SL(p) is formed on one main surface of a TFT substrate 300 serving as a glass substrate. In the module shown in FIG. 3, a plurality of signal lines (for example, signal lines SL(0)0 and SL(0)1) correspond to one common electrode (for example, the common electrode TL(0)) and each of the signal lines SL(0)0 and SL(0)1 includes three signal lines corresponding to the image signals R, G and B. FIG. 3(B) shows signal lines SL(0)0(R), SL(0)0(G) and SL(0)0(B) corresponding to the image signals R, G and B included in the signal line SL(0)0 and signal lines SL(1)0(R), SL(1)0(G) and SL(1)0 (B) corresponding to the image signals R, G and B included in the signal line SL(1).

Here, the notation of the signal lines used in this specification will be described. In the description using the signal line SL(0)0(R) and the signal line SL(1)0(R) as an example, the number in ( ) indicates the number of the common electrode, the next number indicates the number of the pixel in the corresponding common electrode, and the alphabet in ( ) indicates the three primary colors (R, G, B) of the pixel. Namely, the signal line SL(0)0(R) indicates a signal line corresponding to the common electrode TL(0) and indicates a signal line that transmits an image signal corresponding to red of the three primary colors in the 0-th pixel. Similarly, the signal line SL(1)0(R) indicates a signal line corresponding to the common electrode TL(1) arranged next to the common electrode TL(0) and indicates a signal line that transmits an image signal corresponding to red of the three primary colors in the 0-th pixel. Therefore, SL(1)1(R) and SL(1)1(G) shown in FIG. 3(B) indicate signal lines corresponding to the common electrode TL(1) and indicate signal lines that transmit image signals corresponding to red and green of the three primary colors in the first pixel.

As shown in FIG. 3(B), an insulating layer 301 is further formed on one main surface of the signal lines SL(0)0(R), SL(0)0(G), SL(0)0(B) and the like corresponding to the image signals R, G and B and on one main surface of the TFT substrate 300, and the common electrodes TL(0) to TL(p) are formed on the insulating layer 301. An auxiliary electrode SM is formed in each of these common electrodes TL(0) to TL(p) and the auxiliary electrode SM is electrically connected to the common electrode to reduce electric resistance of the common electrode. An insulating layer 302 is formed on the top surface of the common electrodes TL(0) to TL(p) and the auxiliary electrode SM and a pixel electrode LDP is formed on the top surface of the insulating layer 302. In FIG. 3(B), each of CR, CB and CG is a color filter and a liquid crystal layer 303 is sandwiched between the color filters CR (red), CG (green) and CB (blue) and the insulating layer 302. Here, the pixel electrode LDP is provided at an intersection of a scanning line and a signal line, and the color filter CR, CG or CB corresponding to each of the pixel electrodes LDP is provided above each pixel electrode LDP. A black matrix BM is provided between the respective color filters CR, CG and CB.

FIG. 4 is a schematic diagram showing a relationship between the detection electrodes RL(0) to RL(p) and the common electrodes TL(0) to TL(p). As shown in FIG. 4(A), a CF glass substrate 400 serving as a glass substrate is provided on the upper surface of the color filters CR, CG and CB and the detection electrodes RL(0) to RL(p) are formed on the upper surface of the CF glass substrate 400. Further, a polarizing plate 401 is formed above the detection electrodes RL(0) to RL(p). Note that, since the case of being viewed from above is taken as an example as shown in FIG. 4(A), the surface is mentioned as the upper surface, but it is needless to say that the upper surface may be a lower surface or a side surface when the direction of viewing changes. Further, an electrode of a capacitive element formed between the detection electrodes RL(0) to RL(p) and the common electrodes TL(0) to TL(p) is depicted by a broken line in FIG. 4(A).

As shown in FIG. 3(A) and FIG. 4(C), each of the signal lines SL(0) to SL(p) and the common electrodes TL(0) to TL(p) extends in a longitudinal direction, that is, in a long side direction and is arranged in parallel in a lateral direction, that is, in a short side direction. Meanwhile, the detection electrodes RL(0) to RL(p) are provided on the CF glass substrate 400 and arranged so as to intersect with the common electrodes TL(0) to TL(p) as shown in FIG. 4(B). Namely, in FIG. 4(B), the detection electrodes RL(0) to RL(p) extend in a lateral direction (short side) and are arranged in parallel in a longitudinal direction (long side). The detection signals Rx(0) to Rx(p) from the respective detection electrodes RL(0) to RL(p) are supplied to the touch control device 7.

When viewed in a plan view, the signal lines SL(0) to SL(p) and the common electrodes TL(0) to TL(p) can be regarded as extending in parallel as shown in FIG. 3(A). "Parallel" means the state in which electrodes extend from one end to the other end without intersecting with each other, and even when a part or whole of one line is provided in a state inclined to the other line, the state is assumed to be "parallel" if these lines do not intersect between one end and the other end.

Also, when the arrangement of the common electrodes TL(0) to TL(p) is viewed based on the signal line selector 6 and the display control device 5 as a reference point, each of the common electrodes TL(0) to TL(p) can be regarded as extending in a direction away from the signal line selector 6 and the display control device 5 as a reference point. In this case, the signal lines SL(0) to SL(p) can also be regarded as extending in a direction away from the signal line selector 6 and the display control device 5 as a reference point.

Note that the signal lines and the pixel electrodes LDP shown in FIG. 3(B) are omitted in FIG. 4(A).

Overall Configurations of Module

Here, two overall configurations according to the first embodiment will be described.

Overall Configuration of Module (1)

Figure 5:
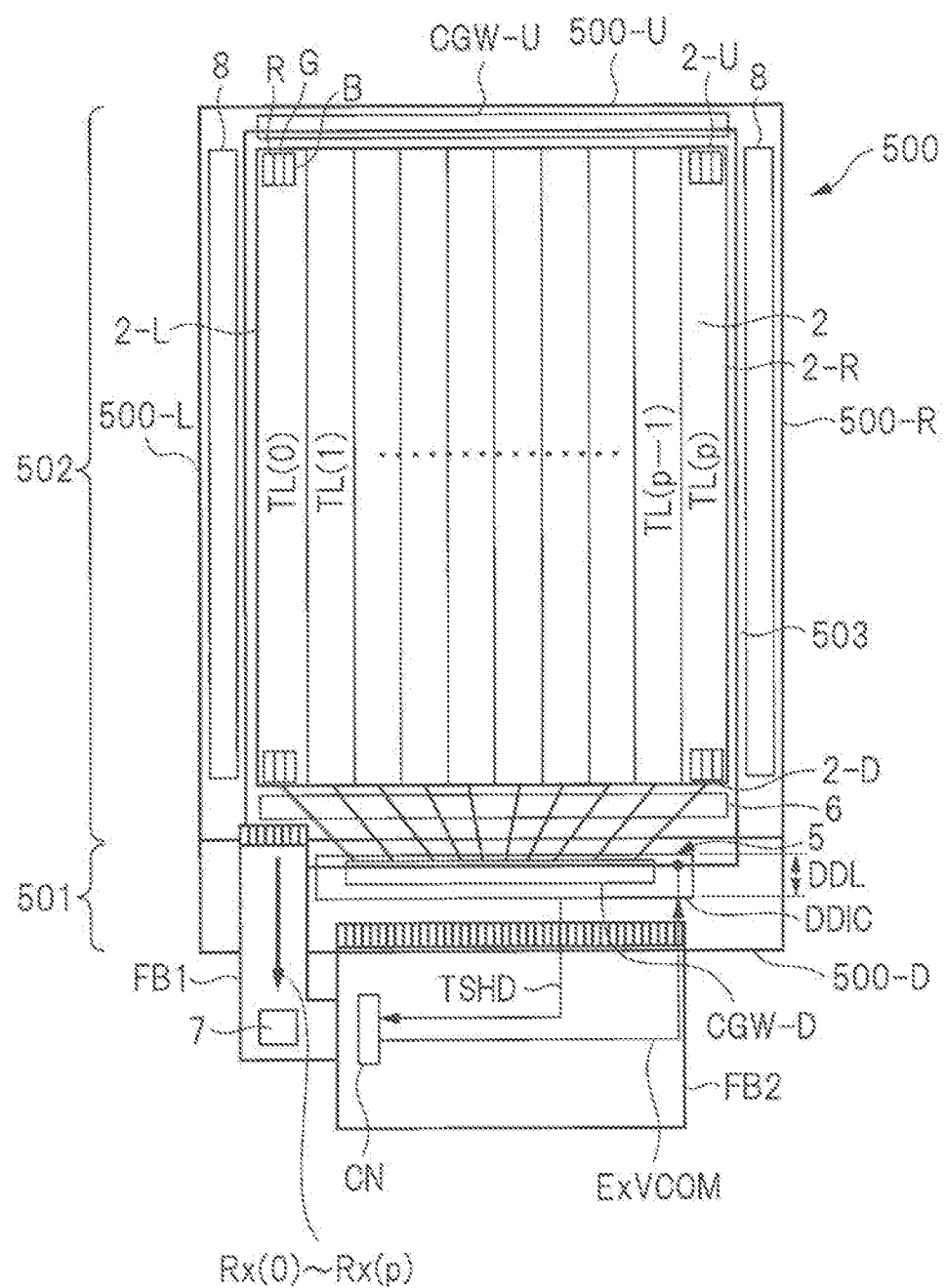
FIG. 5 is a plan view showing a configuration of the module mounted with the liquid crystal display device with a touch detection function according to the first embodiment.

FIG. 5 is a schematic plan view showing an overall configuration of a first module and shows the overall configuration of a module 500 mounted with the liquid crystal display device 1 with a touch detection function. Though schematically, FIG. 5 depicts an actual arrangement. In FIG. 5, a reference character 501 denotes an area of the TFT substrate 300 described with reference to FIG. 3 and a reference character 502 denotes an area having the TFT substrate 300 and the CF glass substrate 400 described with reference to FIG. 4. In the module 500, the TFT substrate 300 is integrated. Namely, the TFT substrate 300 is common in the area 501 and the area 502, and the CF glass substrate 400, the detection electrodes RL(0) to RL(p), the polarizing plate 401 and the like are further formed on the upper surface of the TFT substrate 300 in the area 502 as shown in FIG. 4.

In the area 502, the gate driver 8 shown in FIG. 1 is mounted along the long side direction of the module 500. In the present embodiment, the gate drivers 8 are mounted along the direction of two long sides of the module 500 in the state of sandwiching the plurality of common electrodes TL(0) to TL(p) therebetween. In this case, the scanning lines described with reference to FIG. 1 extend along the short side direction of the module and are arranged in parallel in the long side direction, and are connected to the gate driver 8. Also, the signal line selector 6 described above is mounted in the area 502. In the first embodiment, the signal line selector 6 is mounted so as to extend along the short side of the module 500.

Meanwhile, the display control device 5 is mounted in the area 501. In the first embodiment, the display control device 5 is made up of a semiconductor integrated circuit device (hereinafter, referred to also as a semiconductor device) and a plurality of electronic components. Electronic components include a field effect transistor (hereinafter, referred to as MOSFET). A plurality of MOSFETs are formed on the TFT substrate 300. In the first embodiment, the plurality of MOSFETs are formed in an area of the TFT substrate 300 covered with the semiconductor device constituting the display control device 5. Though not particularly limited, the plurality of MOSFETs covered with the semiconductor device constitute the drive electrode driver 12 (FIG. 1), and the semiconductor device includes the control unit 9 shown in FIG. 1 and the signal line driver 11 (FIG. 1).

In FIG. 5, the drive electrode driver 12 constituted of the plurality of MOSFETs is shown as an electrode drive circuit (second electrode drive circuit) CGW-D and the semiconductor device mounted so as to cover the electrode drive circuit (second electrode drive circuit) CGW-D is shown as DDIC. The semiconductor device DDIC drives the signal lines SL(0) to SL(p) and so is referred to as a semiconductor device for driver below. In the first embodiment, though not particularly limited, the number of the semiconductor devices for driver DDIC is one and the semiconductor device for driver DDIC includes the signal line driver 11 and the control unit 9 shown in FIG. 1. In the first embodiment, the display control device 5 shown in FIG. 1 is made up of one semiconductor device for driver DDIC, the electrode drive circuit CGW constituted of MOSFET formed to be sandwiched between the semiconductor device for driver DDIC and the TFT substrate 300, and an electrode drive circuit (first electrode drive circuit) CGW-U described below. However, the semiconductor device for driver DDIC may include only the signal line driver 11 shown in FIG. 1, and another semiconductor device may include the control unit 9 shown in FIG. 1.

The output of the signal line driver 11 (FIG. 1) in the semiconductor device for driver DDIC is supplied to the signal lines SL(0) to SL(p) (not shown) via the signal line selector 6. In addition, the output of the electrode drive circuit CGW-D, that is, the output of the drive electrode driver 12 is supplied to the common electrodes TL(0) to TL(p).

Though not particularly limited, the output of the electrode drive circuit CGW-D may be supplied also to the signal line selector 6 so as to supply a drive signal also to the signal line SL(i) in the touch detection period. In this case, the signal line SL(i) and the common electrode TL(i) are configured so as to be electrically connected in parallel in the touch detection period. Accordingly, the impedance of the common electrode TL(i) can be reduced and the transmission delay of a drive signal can be reduced in the touch detection period. Though omitted in FIG. 5, the semiconductor device for driver DDIC supplies a timing signal to the gate driver 8. The gate driver 8 forms the scanning signals Vs0 to Vsp in accordance with the supplied timing signal and supplies the signals to the scanning lines (not shown).

The detection electrodes RL(0) to RL(p) described with reference to FIG. 4 are connected to a flexible cable FB1 via a wire arranged between a long side of the module 500 and a long side of the display panel 2. The touch control device 7 described with reference to FIG. 1 is mounted on the flexible cable FB1 and the detection signals Rx(0) to Rx(p) in the detection electrodes RL(0) to RL(p) are supplied to the touch control device 7 via wires in the flexible cable FB1. Also, a flexible cable FB2 is connected to the area 501 and terminals of the semiconductor device for driver DDIC and the electrode drive circuit CGW-D are connected to wires in the flexible cable FB2.

Further, a connector CN is mounted to the flexible cable FB2. The flexible cables FB1 and FB2 are electrically connected via the connector CN. A plurality of signals are transmitted/received between the semiconductor device for driver DDIC and electrode drive circuit CGW-D and the touch control device 7 via the connector CN. In the first embodiment, though not particularly limited, the touch control device 7 is made up of one semiconductor device. To distinguish from the semiconductor device for driver, the semiconductor device constituting the touch control device 7 is referred to as the semiconductor device for touch 7.

In FIG. 5, among the plurality of signals transmitted/received between the semiconductor device for driver DDIC and electrode drive circuit CGW-D and the semiconductor device for touch 7, only the touch-display synchronizing signal TSHD and a drive signal ExVCOM are shown. As described with reference to FIG. 1, the touch-display synchronizing signal TSHD is a control signal that distinguishes between the display period and the touch detection period. Though not shown in FIG. 1, the drive signal ExVCOM is a pulse signal whose voltage changes periodically in the touch detection period. The drive signal ExVCOM serving as a pulse signal is supplied as the drive signal Tx(i) to the common electrode TL(i) selected to detect a touch in the touch detection period.

In the touch detection period, as described above, the drive signal Tx(i) serving as a pulse signal is supplied to the selected common electrode TL(i), and in the display period, a drive signal having a predetermined voltage is supplied to the selected common electrode or all the common electrodes TL(0) to TL(p). The drive signal at this time is a drive signal for display and may have a predetermined voltage, for example, a ground voltage Vs. Namely, unlike the touch detection period, a DC voltage may be supplied as the drive signal to the common electrodes TL(0) to TL(p) instead of a pulse signal in the display period.

In the module 500 shown in FIG. 5, an electrode drive circuit is arranged along each of two short sides 2-D and 2-U of the display panel 2. Namely, the module 500 includes the electrode drive circuit (first electrode drive circuit) CGW-U arranged along one short side 2-U of the display panel 2 and the electrode drive circuit (second electrode drive circuit) CGW-D arranged along the other short side 2-D of the display panel 2. In FIG. 5, the electrode drive circuit CGW-D arranged along one short side 2-D of the display panel 2 is covered with the semiconductor device for driver DDIC. Also, the electrode drive circuit CGW-U arranged along the other short side 2-U of the display panel 2 is formed between the other short side 2-U of the display panel 2 and a short side 500-U of the module 500. Though not particularly limited, the electrode drive circuit CGW-U is also constituted of MOSFET formed on the TFT substrate 300.

By the arrangement described above, the electrode drive circuits CGW-U and CGW-D sandwich the display panel 2 therebetween in the longitudinal direction (column direction). Accordingly, the drive signal Tx(i) from the electrode drive circuit CGW-D is supplied to one end of each of the common electrodes TL(0) to TL(p) extending in the longitudinal direction (column direction), and the drive signal Tx(i) from the electrode drive circuit CGW-U is supplied to the other end of each of the common electrodes TL(0) to TL(p). Since the drive signal Tx(i) is supplied from both ends of the common electrodes TL(i) in the touch detection period, the voltage of the common electrode TL(i) can be periodically changed within a predetermined time even if the driving ability of each of the electrode drive circuits CGW-U and CGW-D is relatively small. Since the driving ability can be made relatively small, MOSFETs constituting the electrode drive circuits CGW-U and CGW-D can be made smaller in size, and the area occupied by them can be thus made smaller.

The size of a longitudinal edge frame of the liquid crystal display device 1 depends on the size of an area between the sides of the module 500 (for example, 500-D and 500-U) and the sides of the display panel 2 (for example, 2-D and 2-U). For the reduction in width of the longitudinal edge frame, a short side DDL of the semiconductor device for driver DDIC is made shorter. Since the area occupied by the electrode drive circuit CGW-D can be made smaller, the reduction in width of the longitudinal edge frame can be achieved while maintaining the state in which the electrode drive circuit CGW-D is covered with the semiconductor device for driver DDIC. Also, since the electrode drive circuit CGW-U can be formed in a small area, the increase of the interval between the short side 500-U of the module 500 and the short side 2-U of the display panel 2 can be suppressed. Accordingly, the liquid crystal display device 1 capable of achieving the reduction in width of the longitudinal edge frame can be provided.

The size of a lateral edge frame of the liquid crystal display device 1 depends on the size of an area between the sides of the module 500 (for example, 500-L and 500-R) and the sides of the display panel 2 (for example, 2-L and 2-R). In the present embodiment, the common electrodes TL(0) to TL(p) are arranged in parallel with the signal lines SL(0) to SL(p), and the electrode drive circuits CGW-U and CGW-D that supply the drive signal to the common electrodes in the display period and the touch detection period are arranged along the sides 2-U and 2-D of the display panel 2. Namely, the electrode drive circuits CGW-U and CGW-D are arranged on an upper side and a lower side of the display panel 2 in FIG. 5. Accordingly, an area between the sides of the module 500 (for example, 500-L and 500-R) and the sides of the display panel 2 (for example, 2-L and 2-R) can be made smaller, and therefore the reduction in width of the lateral edge frame can be achieved.

Accordingly, the liquid crystal display device 1 capable of achieving the reduction in width of the edge frame can be provided.

In FIG. 5, a reference character 503 denotes a signal wire. The signal wire 503 is arranged so as to surround the display panel 2 and the drive signal ExVCOM formed by the semiconductor device for touch 7 is supplied to the signal wire 503. Each of the electrode drive circuits CGW-D and CGW-U is connected to the signal wire 503 and supplies the drive signal ExVCOM transmitting through the signal wire 503 to the common electrode TL(i) selected to detect a touch.

Though not particularly limited, each of the electrode drive circuits CGW-D and CGW-U has a switch MOSFET (not shown) corresponding to each of the common electrodes TL(0) to TL(p). Each source (or drain) of the switch MOSFET included in the electrode drive circuit CGW-D is connected to the signal wire 503 and each drain (or source) thereof is connected to one end of the corresponding common electrode TL(i). In the touch detection period, the switch MOSFET whose drain (or source) is connected to the common electrode selected so that a drive signal is supplied thereto is brought into conduction. Similarly, each source (or drain) of the switch MOSFET in the electrode drive circuit CGW-U is also connected to the signal wire 503 and each drain (or source) thereof is connected to the other end of the corresponding common electrode TL(i). Also in the electrode drive circuit CGW-U, the switch MOSFET whose drain (or source) is connected to the selected common electrode is brought into conduction in the touch detection period.

Accordingly, in the touch detection period, the common electrode TL(i) selected so that a drive signal is supplied thereto is electrically connected to the signal wire 503. As a result, the drive signal ExVCOM serving as a clock signal transmitted from the semiconductor device for touch 7 to the signal wire 503 is transmitted to both ends of the selected common electrode TL(i) via the signal wire 503. Based on the change of the voltage of the common electrode TL(i) in accordance with voltage change of the drive signal ExVCOM, whether the neighborhood of the selected common electrode TL(i) is touched can be detected as described above with reference to FIG. 2.

Though not particularly limited, the semiconductor device for driver DDIC is formed as Chip On Glass (COG). Also, each of the signal line selector 6 and the gate driver 8 may be constituted of a semiconductor device. Also in this case, such a semiconductor device may be formed as COG. In FIG. 5, R, G and B shown on four sides of the liquid crystal panel 2 indicate sub-pixels constituting one pixel.

FIG. 5 shows an example in which the drive signal ExVCOM formed by the semiconductor device for touch 7 is supplied to the signal wire 503, but the present embodiment is not limited to such an example. For example, in the semiconductor device for driver DDIC which receives the drive signal ExVCOM, a drive signal TSVCOM (not shown) synchronized with the drive signal ExVCOM may be formed and supplied to the signal wire 503 and the electrode drive circuit CGW-D. In this manner, the speed of voltage change of the drive signal TSVCOM can also be improved by using the driving ability of the semiconductor device for driver DDIC.

In addition, the drive signal ExVCOM may be formed by the electrode drive circuits CGW-D and CGW-U and a signal wire described below.

In the module 500 shown in FIG. 5, as described above, the electrode drive circuits CGW-D and CGW-U can be constituted of, for example, a plurality of switch MOSFETs. Thus, the configuration of the electrode drive circuits CGW-D and CGW-U can be simplified and the further reduction in width of the edge frame can be achieved.

Overall Configuration of Module (2)

Figure 6:
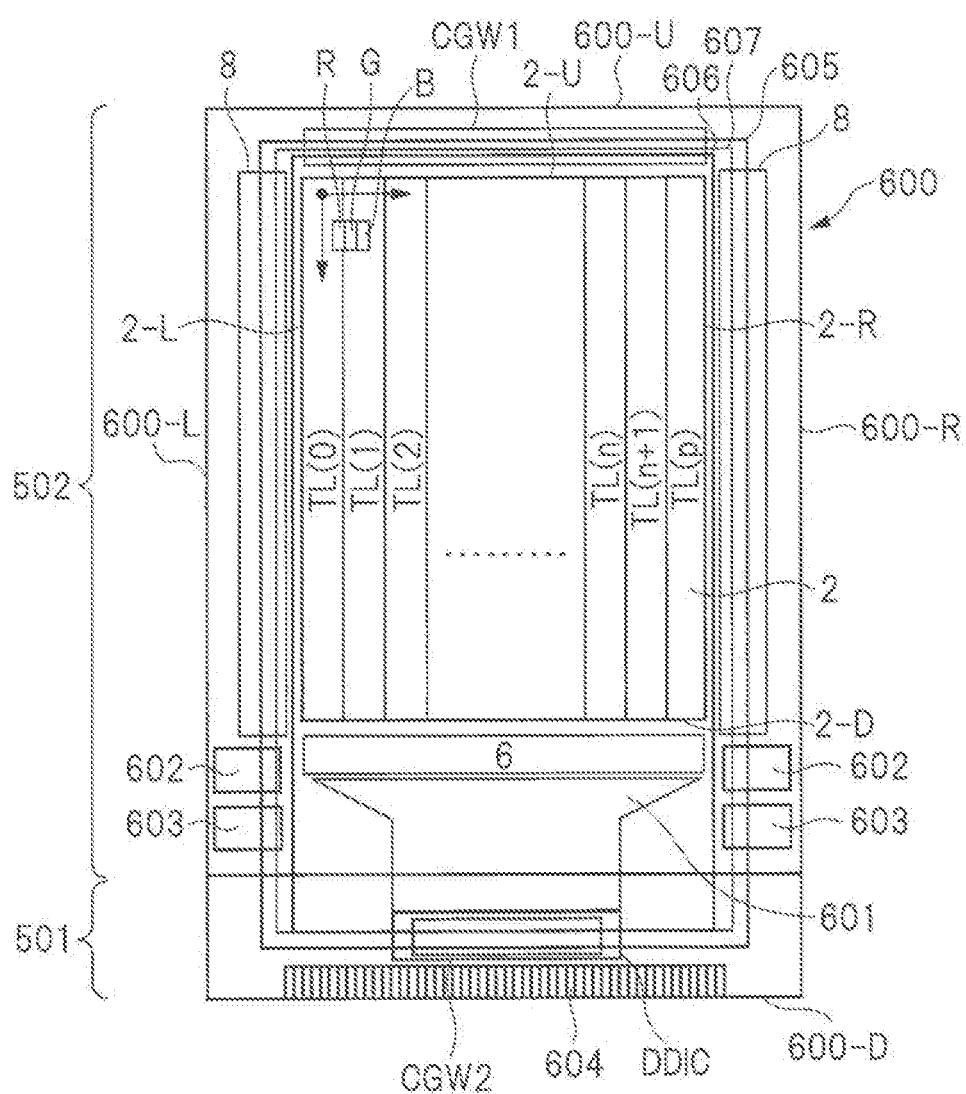
FIG. 6 is a plan view showing a configuration of the module mounted with the liquid crystal display device with a touch detection function according to the first embodiment.

FIG. 6 is a schematic plan view showing an overall configuration of a second module and shows the overall configuration of a module 600 mounted with the liquid crystal display device 1 with a touch detection function. Though schematically, FIG. 6 also depicts an actual arrangement. Also, FIG. 6 shows the configuration of a module related to the liquid crystal display device 1 described with reference to FIG. 1.

The configuration of the module 600 shown in FIG. 6 is similar to the configuration of the module 500 shown in FIG. 5. Thus, differences will mainly be described here. The module 600 also includes the flexible cables FB1 and FB2, the semiconductor device for touch 7, the connector CN and the touch-display synchronizing signal TSHD shown in FIG. 5, but these are omitted in FIG. 6. For example, the flexible cable FB1 is electrically connected to a terminal group denoted by a reference character 604 in FIG. 6. With the flexible cable FB1 being connected to the terminal group 604, signals are transmitted/received between the semiconductor device for touch 7 and the semiconductor device for driver DDIC and electrode drive circuits CGW1 and CGW2. In FIG. 6, the wire electrically connecting the semiconductor device for driver DDIC and electrode drive circuit CGW2 and the signal line selector 6 and common electrodes TL(0) to TL(p) is shown as a wire pattern 601.

In FIG. 6, the signal wire 503 shown in FIG. 5 is not provided and voltage wires 605 to 607 are arranged so as to surround the display panel 2. Here, the voltage wire 605 is a first voltage wire to which a first voltage TPH is supplied and the voltage wire 606 is a second voltage wire to which a second voltage VCOMDC1 is supplied. Also, the voltage wire 607 is a third voltage wire to which a third voltage VCOMDC2 is supplied. Though not particularly limited, for example, the first voltage TPH is a voltage exceeding 0 V and equal to or less than 6 V. Also, the second voltage VCOMDC1 and the third voltage VCOMDC2 are the same voltage, and for example, the ground voltage Vs (0 V). The first voltage TPH is formed based on a voltage Vd supplied to a specific voltage terminal in the terminal group 604. Similarly, the second voltage VCOMDC1 and the third voltage VCOMDC2 are also formed based on the ground voltage Vs supplied to a specific voltage terminal in the terminal group 604.

In FIG. 6, a reference character 602 denotes a voltage generation circuit that receives the voltage Vd supplied to a specific voltage terminal in the terminal group 604 and forms the stable first voltage TPH. Though not particularly limited, since the second voltage VCOMDC1 and the third voltage VCOMDC2 are the ground voltage Vs, the second voltage wire 606 and the third voltage wire 607 are connected to the specific voltage terminal to which the ground voltage Vs is supplied in the terminal group 604. Naturally, in order to form the stable second voltage VCOMDC1 and third voltage VCOMDC2, a voltage generation circuit may be provided so that a voltage is supplied from the voltage generation circuit to the second and third voltage wires 606 and 607. In FIG. 6, a reference character 603 denotes an overvoltage protection circuit. The overvoltage protection circuit 603 functions to protect the voltage generation circuit 602 and the like when an overvoltage, for example, is applied to the voltage generation circuit 602 from a specific voltage terminal.

In FIG. 6, a reference character 600-D denotes one side of a pair of short sides opposite to each other of the module 600 like the side 500-D of the module shown in FIG. 5 and a reference character 600-U denotes the other side of the pair of short sides of the module 600.

Like the module 500 shown in FIG. 5, the signal line selector 6 and the semiconductor device for driver DDIC are arranged between one side 600-D of short sides of the module 600 and one side 2-D of short sides of the display panel 2 when viewed in a plan view. Also, the electrode drive circuit CGW2 constituted of MOSFET formed on the TFT substrate 300 is arranged so as to be covered with the semiconductor device for driver DDIC. Also, the electrode drive circuit CGW1 is arranged between the other side 600-U of the module 600 and the other side 2-U of the display panel 2 when viewed in a plan view. The electrode drive circuit CGW1 is also constituted of MOSFET formed on the TFT substrate 300.

The electrode drive circuits CGW1 and CGW2 shown in FIG. 6 have a configuration different from that of the electrode drive circuits CGW-U and CGW-D described with reference to FIG. 5. As will be described below, the electrode drive circuits CGW1 and CGW2 may have the same configuration or different configurations. Here, in order to distinguish between the electrode drive circuit CGW1 and the electrode drive circuit CGW2, the electrode drive circuit CGW1 is referred to also as a first electrode drive circuit and the electrode drive circuit CGW2 is referred to also as a second electrode drive circuit.

Each of the first electrode drive circuit CGW1 and the second electrode drive circuit CGW2 is connected to the first voltage wire 605, the second voltage wire 606 and the third voltage wire 607, and the first voltage TPH, the second voltage VCOMDC1 and the third voltage VCOMDC2 are supplied thereto via the first to third voltage wires 605 to 607, respectively. As will be described in detail below, in the touch detection period, the second electrode drive circuit CGW2 electrically connects one end of the common electrode TL(i) selected to detect a touch (hereinafter, referred to also as a selected common electrode) alternately to the first voltage wire 605 and the second voltage wire 606. Accordingly, the first voltage TPH and the second voltage VCOMDC1 are periodically supplied to the selected common electrode TL(i). Further, the first electrode drive circuit CGW1 also electrically connects the other end of the selected common electrode TL(i) alternately to the first voltage wire 605 and the second voltage wire 606 in the touch detection period.

In this case, the first electrode drive circuit CGW1 and the second electrode drive circuit CGW2 operate in synchronization with each other. Namely, when the first electrode drive circuit CGW1 connects the selected common electrode TL(i) to the first voltage wire 605, the second electrode drive circuit CGW2 also connects the selected common electrode TL(i) to the first voltage wire 605. Also, when the first electrode drive circuit CGW1 connects the selected common electrode TL(i) to the second voltage wire 606, the second electrode drive circuit CGW2 also connects the selected common electrode TL(i) to the second voltage wire 606. Accordingly, the first voltage TPH and the second voltage VCOMDC1 are periodically supplied to the selected common electrode TL(i) from both ends thereof. As a result, as described with reference to FIG. 2, whether the neighborhood of the selected common electrode is touched can be detected.

In the module 500 shown in FIG. 5, the signal wire 503 extends along the long side of the display panel 2 in an area between a pair of the long sides 2-R and 2-L of the display panel 2 and a pair of the long sides 500-R and 500-L of the module 500. On the other hand, the detection electrodes RL(0) to RL(p) that transmit the detection signals Rx(0) to Rx(p) generated when the drive signal Tx(i) is supplied to the selected common electrode TL(i) are arranged so as to intersect with the common electrodes TL(0) to TL(p). Thus, there is the possibility that the signal wire 503 and the detection electrodes RL(0) to RL(p) intersect and the signal wire 503 and the detection electrodes RL(0) to RL(p) are coupled by a parasitic capacitance therebetween. It is conceivable that the driving ability of the drive signal ExVCOM transmitting through the signal wire 503 is improved so that the voltage of the selected common electrode TL(i) can be changed within a predetermined time. Thus, the voltage change of the drive signal ExVCOM may be transmitted to the detection electrodes RL(0) to RL(p) via the coupling due to the parasitic capacitance. Namely, there is a fear that the voltage change of the drive signal ExVCOM may appear in the detection signals Rx(0) to Rx(p) as noise and the detection accuracy is degraded.

Meanwhile, in the module 600 shown in FIG. 6, the voltage of the selected common electrode TL(i) can be changed only by alternately connecting the first voltage wire 605 and the second voltage wire 606 to the selected common electrode TL(i) by the first electrode drive circuit CGW1 and the second electrode drive circuit CGW2. Thus, there is no need to provide a signal wire that transmits a drive signal whose driving ability is improved along the long side of the display panel 2 in an area between long sides 600-R and 600-L of the module 600 and the long sides 2-R and 2-L of the display panel 2. Namely, it is only necessary to provide the first to third voltage wires 605 to 607 along the long side of the display panel 2. Accordingly, it is possible to prevent the noise from appearing on the detection signals Rx(0) to Rx(p) in the touch detection period.

Naturally, also in the module 600 shown in FIG. 6, drive signals, that is, the first voltage TPH and the second voltage VCOMDC1 changed alternately are supplied to both ends of the selected common electrode TL(i), and thus, the voltage of the selected common electrode TL(i) can be changed within a predetermined time without increasing the size of MOSFETs constituting each of the first electrode drive circuit CGW1 and the second electrode drive circuit CGW2. Accordingly, like the module 500 shown in FIG. 5, the reduction in width of the edge frame can be achieved.

Further, in the module 600 shown in FIG. 6, a predetermined voltage is supplied to a common electrode to which a drive signal whose voltage changes periodically is not supplied, that is, a common electrode that is not selected (hereinafter, referred to also as a non-selected common electrode TL(m)) from the first electrode drive circuit CGW1 and/or the second electrode drive circuit CGW2 in the touch detection period. In this case, as the predetermined voltage, the second voltage VCOMDC1 of the second voltage wire 606 or the third voltage VCOMDC2 of the third voltage wire 607 is used.

In the display period, the scanning lines GL(0) to GL(p) that transmit the scanning signals Vs0 to Vsp are arranged so as to intersect with the common electrodes TL(0) to TL(p). Thus, a parasitic capacitance is formed between the scanning lines GL(0) to GL(p) and the common electrodes TL(0) to TL(p). If the voltage of the selected common electrode TL(i) changes in the touch detection period, the voltage of the scanning line GL(i) changes via a parasitic capacitance between the selected common electrode TL(i) and the scanning line GL(i) intersecting with the selected common electrode TL(i). Namely, noise appears on the scanning line GL(i). The noise on the scanning line GL(i) is transmitted to a power supply wire of the gate driver 8 and is further transmitted to another scanning line GL(n). If the non-selected common electrode TL(m) is in a floating state, that is, no voltage is supplied to the non-selected common electrode TL(m), the noise on the other scanning line GL(n) is transmitted to the non-selected common electrode TL(m) via a parasitic capacitance between the other scanning line GL(n) and the non-selected common electrode TL(m), and the voltage of the non-selected common electrode TL(m) changes. The noise appears on the detection signals Rx(0) to Rx(p) of the detection electrodes RL(0) to RL(p) due to the change of the voltage of the non-selected common electrode TL(m), and there is a fear about the degradation of detection accuracy.

Meanwhile, by supplying the second voltage VCOMDC1 or the third voltage VCOMDC2 to the non-selected common electrode TL(m) in the touch detection period, it is possible to prevent the voltage of the non-selected common electrode TL(m) from changing due to noise in the scanning line GL(n), and the degradation of detection accuracy can be prevented.

The third voltage VCOMDC2 of the third voltage wire 607 is desirable as the voltage supplied to the non-selected common electrode TL(m) in the touch detection period. This is because the second voltage wire 606 is periodically connected to the selected common electrode TL(i) in the touch detection period and thus the second voltage VCOMDC1 of the second voltage wire 606 may vary. If the second voltage VCOMDC1 is supplied to the non-selected common electrode TL(m), the voltage of the non-selected common electrode TL(m) also changes due to the variation of the second voltage VCOMDC1 and there is a fear about the degradation of detection accuracy. Therefore, it is desirable that the third voltage VCOMDC2 of the third voltage wire 607 different from the second voltage wire 606 is supplied to the non-selected common electrode TL(m) in the touch detection period.

Liquid Crystal Element Array

Before describing the configuration of the first electrode drive circuit CGW1 and the second electrode drive circuit CGW2, the configuration of the display panel 2 will be described.

Figure 7:
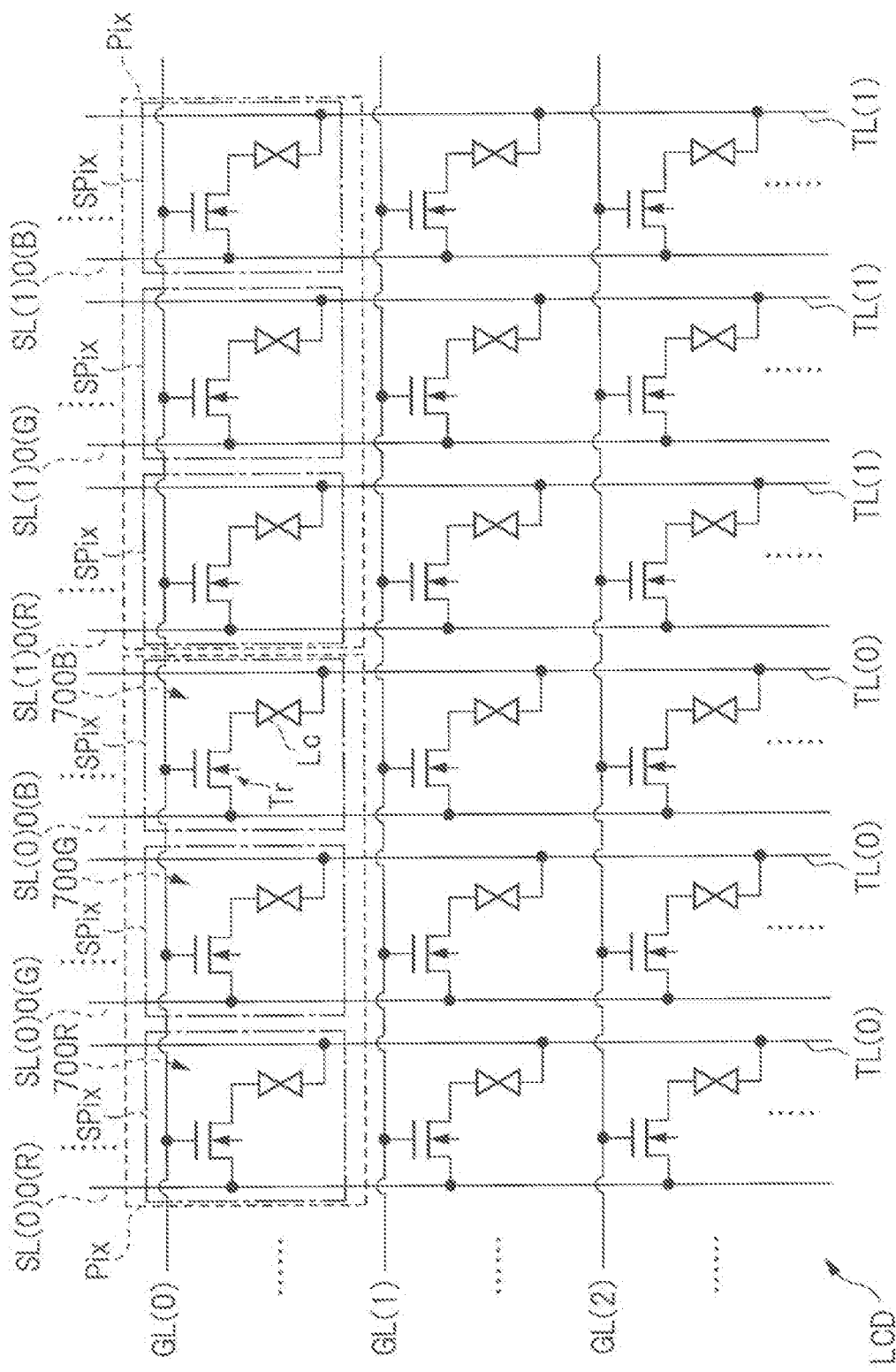
FIG. 7 is a circuit diagram showing a configuration of a liquid crystal element array according to the first embodiment.

FIG. 7 is a circuit diagram showing a circuit configuration of the display panel 2. In FIG. 7, each of a plurality of reference characters SPix indicated by a one-dot chain line denotes one liquid crystal display element. The liquid crystal display elements SPix are arranged in a matrix form in the liquid crystal panel 2 to constitute a liquid crystal element array LCD. The liquid crystal element array LCD includes a plurality of the scanning lines GL(0) to GL(p) arranged in each row and extending in the row direction and signal lines SL(0)0(R), SL(0)0(G) and SL(0)0(B) to SL(p)p(R), SL(p)p(G) and SL(p)p(B) arranged in each column and extending in the column direction. The liquid crystal element array LCD further includes the common electrodes TL(0) to TL(p) arranged in each column and extending in the column direction. FIG. 7 shows a part of the liquid crystal element array relating to the scanning lines GL(0) to GL(2), the signal lines SL(0)0(R), SL(0)0(G) and SL(0)0(B) to SL(1)0(R), SL(1)0(G) and SL(1)0(B), and the common electrodes TL(0) and TL(1).

In FIG. 7, to make the description easier, the common electrodes TL(0) and TL(1) are depicted as if they are arranged in respective columns, but it should be understood that one common electrode is arranged for a plurality of signal lines as described with reference to FIGS. 3(A) and 3(B). Naturally, the common electrodes may be arranged in respective columns of the liquid crystal element array LCD as shown in FIG. 7. In any case, each of the common electrodes TL(0) to TL(p) is arranged in a column of the liquid crystal element array LCD so as to be parallel to the signal lines.

Each liquid crystal display element SPix arranged at an intersection of a row and a column of the liquid crystal element array LCD includes a thin film transistor Tr formed on the TFT glass substrate 300 and a liquid crystal element LC whose one terminal is connected to the source of the thin film transistor Tr. In the liquid crystal element array LCD, gates of the thin film transistors Tr of the plurality of liquid crystal display elements SPix arranged in the same row are connected to the scanning line arranged in the same row, and drains of the thin film transistors Tr of the plurality of liquid crystal display elements SPix arranged in the same column are connected to the signal line arranged in the same column. In other words, the plurality of liquid crystal display elements SPix are arranged in a matrix form, a scanning line is arranged in each row, and the plurality of liquid crystal display elements SPix arranged in the corresponding row are connected to the scanning line. Also, a signal line is arranged in each column and the liquid crystal display elements SPix arranged in the corresponding column are connected to the signal line. Further, the other ends of the liquid crystal elements LC of the plurality of liquid crystal display elements SPix arranged in the same column are connected to the common electrode arranged in the column.

When described with respect to the example shown in FIG. 7, the gate of the thin film transistor Tr of each of the plurality of liquid crystal display elements SPix arranged in the uppermost row in FIG. 7 is connected to the scanning line GL(0) arranged in the uppermost row. Further, the drain of the thin film transistor Tr of each of the plurality of liquid crystal display elements SPix arranged in the leftmost column in FIG. 7 is connected to the signal line SL(0)0(R) arranged in the leftmost column. Also, the other end of the liquid crystal element of each of the plurality of liquid crystal display elements SPix arranged in the leftmost column is connected to the common electrode TL(0) arranged in the leftmost column in FIG. 7. As already described above, one common electrode corresponds to a plurality of signal lines. Thus, in the example shown in FIG. 7, the common electrode TL(0) can be regarded as a common electrode shared by three columns.

One liquid crystal display element SPix corresponds to one sub-pixel described above. Thus, sub-pixels of three primary colors of R, G and B are formed of three liquid crystal display elements SPix. In FIG. 7, one pixel Pix is formed of three liquid crystal display elements SPix arranged consecutively in the same row and colors are expressed by the pixel Pix. Namely, in FIG. 7, the liquid crystal display element SPix shown as 700R serves as a sub-pixel SPix(R) of R (red), the liquid crystal display element SPix shown as 700G serves as a sub-pixel SPix(G) of G (green), and the liquid crystal display element SPix shown as 700B serves as a sub-pixel SPix(B) of B (blue). Thus, the sub-pixel SPix(R) shown as 700R is provided with a red color filter CR as a color filter, the sub-pixel SPix(G) shown as 700G is provided with a green color filter CG as a color filter, and the sub-pixel SPix(B) shown as 700B is provided with a blue color filter CB as a color filter.

Among the signals representing one pixel, an image signal corresponding to R is supplied to the signal line SL(0)0(R) from the signal line selector 6, an image signal corresponding to G is supplied to the signal line SL(0)0(G) from the signal line selector 6, and an image signal corresponding to B is supplied to the signal line SL(0)0(B) from the signal line selector 6.

Though not particularly limited, the thin film transistor Tr in each liquid crystal display element SPix is an N-channel MOSFET. The scanning signals Vs0 to Vsp (FIG. 1) in a pulse shape which become higher in level sequentially in this order are supplied to the scanning lines GL(0) to GL(p) from the gate driver 8. Namely, in the liquid crystal element array LCD, the voltage of scanning lines becomes higher in level sequentially from the scanning line GL(0) arranged in the upper row toward the scanning line GL(p) arranged in the lower row. Accordingly, in the liquid crystal element array LCD, the thin film transistors Tr in the liquid crystal display elements SPix are sequentially brought into conduction from the liquid crystal display element SPix arranged in the upper row toward the liquid crystal display element SPix arranged in the lower row.

When the thin film transistor Tr is brought into conduction, the pixel signal being supplied to the signal line at that time is supplied to the liquid crystal element LC via the thin film transistor in conduction. The electric field of the liquid crystal element LC changes in accordance with the value of the pixel signal supplied to the liquid crystal element LC, and the modulation of light passing through the liquid crystal element LC changes. Accordingly, a color image in accordance with the image signal supplied to the signal lines SL(0)0(R), SL(0)0(G) and SL(0)0(B) to SL(p)p(R), SL(p)p(G) and SL(p)p(B) is displayed on the liquid crystal panel 2 in synchronization with the scanning signals Vs0 to Vsp supplied to the scanning lines GL(0) to GL(p).

Here, the correspondence between the arrangement of the module shown in FIGS. 5 and 6 and the circuit diagram shown in FIG. 7 will be described below.

The liquid crystal element array LCD has a pair of sides substantially parallel to the row of the array and a pair of sides substantially parallel to the column of the array. The pair of sides parallel to the row of the liquid crystal element array LCD corresponds to the short sides 2-U and 2-D of the display panel 2 shown in FIGS. 5 and 6 and the pair of sides parallel to the column of the liquid crystal element array LCD corresponds to the long sides 2-R and 2-L of the display panel 2.

In the liquid crystal element array LCD, as shown in FIGS. 5 and 6, the signal line selector 6, the semiconductor device for driver DDIC and the second electrode drive circuit CGW2 (the electrode drive circuit CGW-D in FIG. 5) are arranged along one side of the pair of sides parallel to the row, that is, the one short side 2-D of the display panel 2. In the liquid crystal element array LCD, the image signal from the signal line driver 11 in the semiconductor device for driver DDIC is supplied to the signal lines SL(0)0(R), SL(0)0(G) and SL(0)0(B) to SL(p)p(R), SL(p)p(G) and SL(p)p(B) via the signal line selector 6 on this one side (short side 2-D of the display panel 2). Also, the drive signal Tx(i) from the second electrode drive circuit CGW2 (electrode drive circuit CGW-D) is supplied to one ends of the common electrodes TL(0) to TL(p) on this one side (short side 2-D of the display panel 2).

Meanwhile, in the liquid crystal element array LCD, the first electrode drive circuit CGW1 (the electrode drive circuit CGW-U in FIG. 5) is arranged along the other side of the pair of sides parallel to the row, that is, the short side 2-U of the display panel 2. Further, the drive signal Tx(i) from the first electrode drive circuit CGW1 (electrode drive circuit CGW-U) is supplied to the other ends of the common electrodes TL(0) to TL(p) on the other side of the liquid crystal element array LCD. When described in another way with reference to FIG. 7, the drive signals Tx(0) and Tx(1) are supplied to the common electrodes TL(0) and TL(1) from both of the upper side and the lower side in the touch detection period.

Also, in the module 600 shown in FIG. 6, the third voltage VCOMDC2 is supplied to the non-selected common electrode TL(m) from the second electrode drive circuit CGW2 and/or the first electrode drive circuit CGW1 on one side of the liquid crystal element array LCD (corresponding to the side 2-D) and/or the other side thereof (corresponding to the side 2-U) in the touch detection period.

The case in which the number of sub-pixels constituting one pixel is three has been described, but the present embodiment is not limited to this. For example, one pixel may be formed from sub-pixels including one or more colors of white (W), yellow (Y) and complementary colors of RGB (cyan (C), magenta (M) and yellow (Y)) in addition to RGB described above.

Overview of Electrode Drive Circuit

Figure 8A:
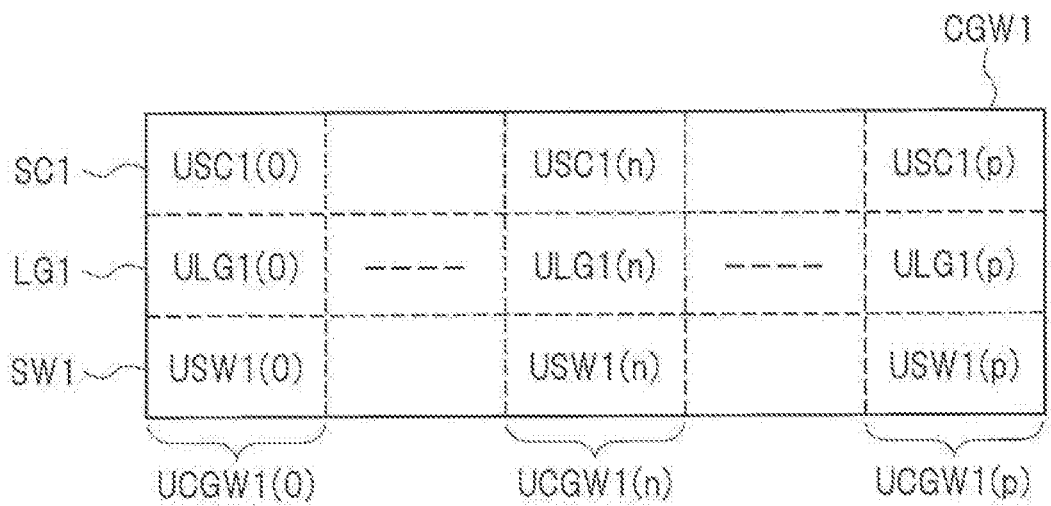
FIG. 8(A) and FIG. 8(B) are block diagrams showing a configuration of a first electrode drive circuit and a second electrode drive circuit according to the first embodiment.
Figure 8B:
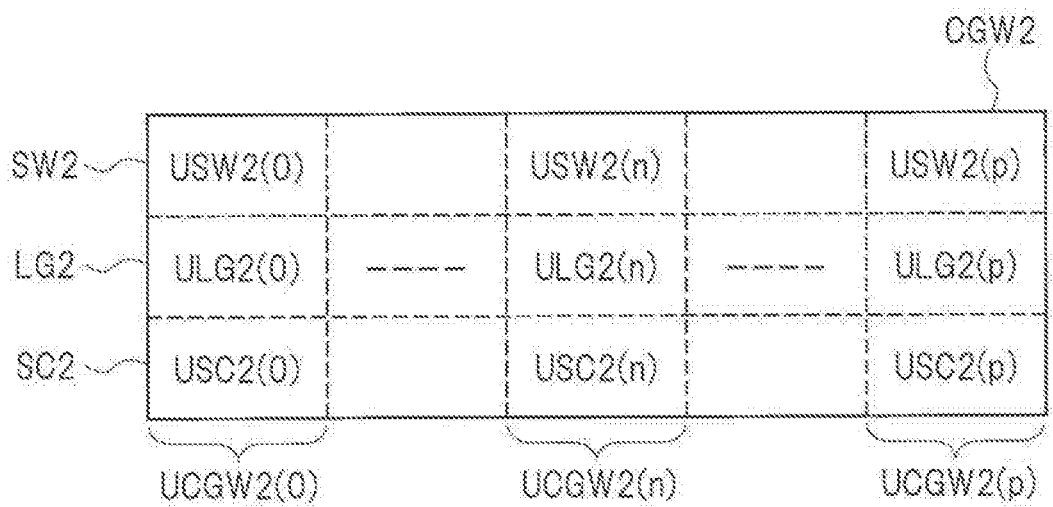

FIG. 8 is a block diagram schematically showing the configuration of the first electrode drive circuit CGW1 and the second electrode drive circuit CGW2. FIG. 8(A) shows an overview of the first electrode drive circuit CGW1 and FIG. 8(B) shows an overview of the second electrode drive circuit CGW2.

In FIG. 8(A), a reference character SC1 denotes a scanning circuit, a reference character LG1 denotes a logic circuit, and a reference character SW1 denotes a switch circuit. The first electrode drive circuit CGW1 includes the scanning circuit SC1, the logic circuit LG1 and the switch circuit SW1.

The scanning circuit SC1 in the first embodiment is constituted of a shift register. The shift register has a plurality of stages USC1(0) to USC1(p), and the stages have the same configuration and are configured of, for example, a flipflop circuit. With the change of the clock signal SDCK (FIG. 1) serving as a shift clock signal, a predetermined stage (for example, USC1(n)) fetches and stores the output of the previous stage (for example, USC1(n−1)) and forms and outputs an output signal in accordance with the fetched output of the previous stage. In the first embodiment, the stages USC1(0) to USC1(p) of the shift register correspond to the common electrodes TL(0) to TL(p), respectively. For example, the stage USC1(0) corresponds to the common electrode TL(0), the stage USC1(n) corresponds to the common electrode TL(n), and the stage USC1(p) corresponds to the common electrode TL(p).

In the touch detection period, the selection signal SDST (for example, logical value "1") specifying the selected common electrode selected so that a drive signal is supplied thereto is set to a predetermined stage of the shift register, for example, the initial stage USC1(0). The selection signal SDST (logical value "1") moves through the stages constituting the shift register by changing the clock signal SDCK. For example, the selection signal SDST (logical value "1") sequentially moves from the stage USC1(0) to the stage USC1(p) by the change of the clock signal SDCK.

The switch circuit SW1 includes a plurality of first unit switch circuits USW1(0) to USW1(p) corresponding to the common electrodes TL(0) to TL(p), respectively. The first unit switch circuits USW1(0) to USW1(p) have the same configuration, and FIG. 8(A) shows only the first unit switch circuits USW1(0), USW1(n) and USW1(p) corresponding to the common electrodes TL(0), TL(n) and TL(p). The first unit switch circuits USW1(0) to USW1(p) are connected to the corresponding common electrodes TL(0) to TL(p) on the other side (2-U in FIG. 6) of the liquid crystal element array LCD. In the first embodiment, the first unit switch circuits SW1(0) to SW1(p) are connected to the first to third voltage wires 605 to 607 (FIG. 6).

The logic circuit LG1 also includes a plurality of first unit logic circuits ULG1(0) to ULG1(p) and the first unit logic circuits ULG1(0) to ULG1(p) correspond to the stages USC1(0) to USC1(p) constituting the scanning circuit SC1 in a one-to-one manner. In addition, the first unit logic circuits ULG1(0) to ULG1(p) correspond also to the first unit switch circuits USW1(0) to USW1(p) constituting the switch circuit SW1 in a one-to-one manner. In the first embodiment, the plurality of first unit logic circuits ULG1(0) to ULG1(p) have the same configuration.

In the touch detection period, the logic circuit LG1 receives the output from the scanning circuit SC1 and controls the corresponding switch circuit SW1 based on the received output. Namely, in the touch detection period, the first unit logic circuits ULG1(0) to ULG1(p) receive the output of the stages USC1(0) to USC1(p) of the shift register in one-to-one correspondence and control the first unit switch circuits USW1(0) to USW1(p) in one-to-one correspondence. For example, the first unit logic circuit ULG1(0) receives the output of the stage USC1(0) in one-to-one correspondence and controls the first unit switch SW1(0) in one-to-one correspondence based on the output of the stage USC1(0). Similarly, the first unit logic circuit ULG1(n) receives the output of the stage USC1(n) and controls the first unit switch USW1(n), and the first unit logic circuit ULG1(p) receives the output of the stage USC1(p) and controls the first unit switch USW1(p).

As will be described in detail below with reference to FIG. 11 and the like, in the touch detection period, the first unit logic circuit which has received the output of the selection signal SDST (logical value "1") controls the corresponding first unit switch circuit to alternately supply the first voltage TPH of the first voltage wire 605 and the second voltage VCOMDC1 of the second voltage wire 606 to the corresponding common electrode. Meanwhile, in the touch detection period, the first unit logic circuit which has received a non-selection signal, that is, the output of the selection signal SDST of the logical value "0" controls the corresponding first unit switch circuit to supply the third voltage VCOMDC2 of the third voltage wire 607 to the corresponding common electrode. Accordingly, in the touch detection period, the first voltage TPH and the second voltage VCOMDC1 are periodically supplied from the first electrode drive circuit CGW1 to the selected common electrode TL(i) on the other side of the liquid crystal element array LCD. Also, the third voltage VCOMDC2 is supplied to the non-selected common electrode TL(n).

The first electrode drive circuit CGW1 can be regarded as being constituted of a plurality of first unit electrode drive circuits UCGW1(0) to UCGW1(p) corresponding to the common electrodes TL(0) to TL(p), respectively. In this case, in the touch detection period, the common electrodes TL(0) to TL(p) are electrically connected to any of the first to third voltage wires by the corresponding first unit electrode drive circuits UCGW1(0) to UCGW1(p).

FIG. 8(B) is a block diagram schematically showing the configuration of the second electrode drive circuit CGW2. Like the first electrode drive circuit CGW1 described with reference to FIG. 8(A), the second electrode drive circuit CGW2 also includes a scanning circuit, a logic circuit and a switch circuit. In FIG. 8(B), the scanning circuit constituting the second electrode drive circuit CGW2 is denoted as SC2, the logic circuit is denoted as LG2, and the switch circuit is denoted as SW2. In the first embodiment, the scanning circuit SC2 has the same configuration as the scanning circuit SC1, the logic circuit LG2 has the same configuration as the logic circuit LG1, and the switch circuit SW2 has the same configuration as the switch circuit SW1.

Namely, the scanning circuit USC2 is constituted of a shift register having a plurality of stages USC2(0) to USC2(p) like the scanning circuit SC1. When focusing on a specific stage, with the change of the clock signal CDCK, the stage fetches and stores the selection signal SDST of the previous stage and outputs an output signal in accordance with the fetched selection signal. Though not particularly limited, the stages USC2(0) to USC2(p) have the same configuration as the stages USC1(0) to USC1(p) shown in FIG. 8(A). Also, the stages USC2(0) to USC2(p) correspond to the common electrodes TL(0) to TL(p) in a one-to-one manner.

The switch circuit SW2 includes a plurality of second unit switch circuits USW2(0) to USW2(p) like the switch circuit SW1. The second unit switch circuits USW2(0) to USW2(p) correspond to the common electrodes TL(0) to TL(p) in a one-to-one manner and electrically connect any of the first to third voltage wires 605 to 607 to the corresponding common electrode on the one side (2-D in FIG. 6) of the liquid crystal element array LCD in the touch detection period. The second unit switch circuits USW2(0) to USW2(p) constituting the switch circuit SW2 also have the same configuration.

The logic circuit LG2 is also constituted of a plurality of second unit logic circuits ULG2(0) to ULG2(p) like the logic circuit LG1. Each of the second unit logic circuits ULG2(0) to ULG2(p) corresponds to each of the stages USC2(0) to USC2(p) and the second unit switch circuits USW2(0) to USW2(p) like the first unit logic circuits described with reference to FIG. 8(A). In addition, the second unit logic circuits ULG2(0) to ULG2(p) constituting the logic circuit LG2 also have the same configuration.

FIG. 8(B) shows only the stages USC2(0), USC2(n) and USC2(p), the second unit logic circuits ULG2(0), ULG2(n) and ULG2(p) and the second unit switch circuits USW2(0), USW2(n) and USW2(p) corresponding to the common electrodes TL(0), TL(n) and TL(p) of the common electrodes TL(0) to TL(p). In addition, like the first electrode drive circuit CGW1, the second electrode drive circuit CGW2 can be regarded as being constituted of a plurality of second unit electrode drive circuits UCGW2(0) to UCGW2(p) corresponding to the common electrodes TL(0) to TL(p), respectively.

The operation of the second electrode drive circuit CGW2 is similar to the operation of the first electrode drive circuit CGW1, and thus the description thereof is omitted. However, the second electrode drive circuit CGW2 supplies any of the first to third voltages to the corresponding common electrode on the one side (2-D) of the liquid crystal element array LCD in the touch detection period unlike the first electrode drive circuit CGW1.

In the first embodiment, the same clock signal SDCK is provided as a shift clock signal to the scanning circuit SC1 and the scanning circuit SC2 and the same selection signal SDST is set thereto. Accordingly, in the touch detection period, both of the first electrode drive circuit CGW1 and the second electrode drive circuit CGW2 select the same common electrode as the selected common electrode and alternately supply voltages of the first and second voltage wires 605 and 606. At this time, the third voltage VCOMDC2 of the third voltage wire 607 is supplied to the non-selected common electrode from both of the first electrode drive circuit CGW1 and the second electrode drive circuit CGW2.

Configuration of Main Part of Display Panel 2

Figure 9:
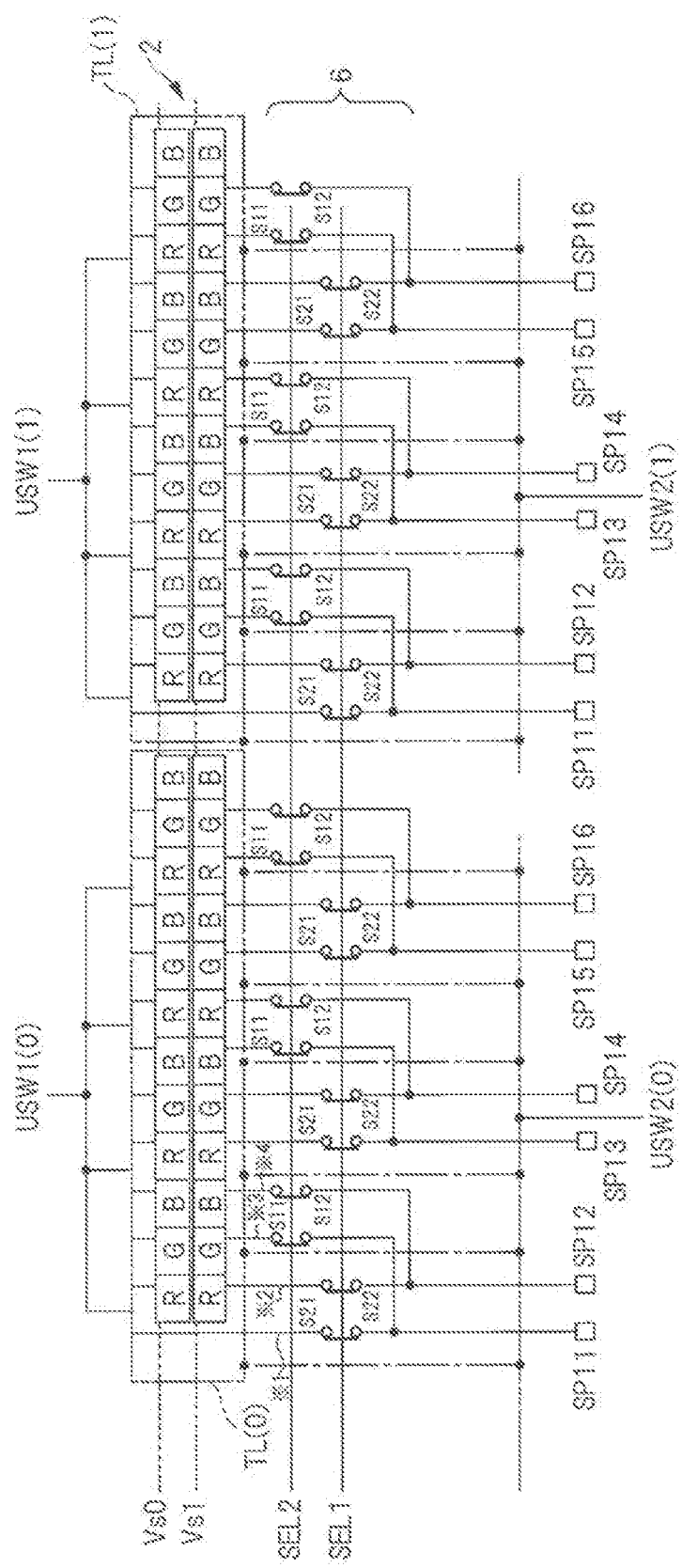
FIG. 9 is a block diagram showing a configuration of a display panel according to the first embodiment.

FIG. 9 is a block diagram schematically showing the configuration of a main part of the display panel 2. In FIG. 9, the configuration of the signal line selector 6 is also schematically shown. FIG. 9 shows the sub-pixels SPix for two rows arranged in the liquid crystal element array LCD and the two common electrodes TL(0) and TL(1) corresponding to the sub-pixels SPix. In FIG. 8, the arrangement of the sub-pixels SPix and the common electrodes TL(0) and TL(1) are depicted in accordance with the actual arrangement.

In FIG. 9, one common electrode is arranged for four pixels arranged in a lateral direction (row direction in the liquid crystal element array LCD). Each of "R", "G" and "B" shown in FIG. 9 indicates the sub-pixel SPix. Therefore, the common electrode TL(0) corresponds to four sets of "R", "G" and "B" from the left side in FIG. 9 and extends in a longitudinal direction (column direction in the liquid crystal element array). Similarly, the common electrode TL(1) corresponds to four sets of "R", "G" and "B" on the right side in FIG. 9 and extends in a longitudinal direction (column direction). One ends of the common electrodes TL(0) and TL(1) extending in the longitudinal direction are connected to the second unit switch circuit USW2(0) in the second unit electrode drive circuit UCGW2(0) and the second unit switch circuit USW2(1) in the second unit electrode drive circuit UCGW2(1) described with reference to FIG. 8(B). Also, the other ends of the common electrodes TL(0) and TL(1) are connected to the first unit switch circuit USW1(0) in the first unit electrode drive circuit UCGW1(0) and the first unit switch circuit USW1(1) in the first unit electrode drive circuit UCGW1(1) described with reference to FIG. 8(A).

In FIG. 9, reference characters SP11 to SP16 denote terminals to which external terminals of the semiconductor device for driver DDIC are connected. The external terminals of the semiconductor device for driver DDIC mentioned here indicate external terminals that output image signals. In FIG. 9, the terminals SP11 to SP16 are grouped as a set and the terminals SP11 to SP16 of one set correspond to one common electrode. Thus, two sets of the terminals SP11 to SP16 are shown in FIG. 9. Since each set of the terminals SP11 to SP16 has the same configuration, one set will be described.

The signal line selector 6 has a plurality of unit signal line selectors corresponding to the set including the terminals SP11 to SP16. Each of the unit signal line selectors has the same configuration. Here, the unit signal line selector shown on the left side of FIG. 9 is taken as an example. The unit signal line selector has a plurality of switches S11, S12, S21 and S22 and the switches S21 and S22 are controlled by a selection line SEL1 (FIG. 1) so as to be brought into/out of conduction at the same time. Also, the switches S11 and S12 are controlled by a selection line SEL2 so as to be brought into/out of conduction at the same time.

In the description using the terminals SP11 and SP12 as an example, when the selection signal SEL1 has the logical value "1" and the selection signal SEL2 has the logical value "0", the switches S21 and S22 are brought into conduction and the switches S11 and S12 are brought out of conduction. At this point, image signals supplied to the terminals SP11 and SP12 are supplied to the signal lines SL(0)0(R) and SL(0)0(G) via the switches S21 and S22 (see FIG. 7). Accordingly, image information on "R" and "G" is provided to liquid crystal elements.

Next, when the logical value of the selection signal SEL1 is set to "0" and the logical value of the selection signal SEL2 is set to "1", the switches S11 and S12 are brought into conduction and the switches S21 and S22 are brought out of conduction. At this time, image signals supplied to the terminals SP11 and SP12 are supplied to the signal lines SL(0)0(B) and SL(0)1(R) via the switches S11 and S12 (see FIG. 7). Accordingly, image information on "B" is provided to liquid crystal elements and image information on "R" is provided to liquid crystal elements in neighboring pixels. Namely, image information supplied to the terminals SP11 and SP12 can be distributed to appropriate signal lines by the selection signals SEL1 and SEL2. Similarly, at the remaining terminals SP13 to SP16, image information supplied to these terminals can be distributed to appropriate signal lines by the selection signals SEL1 and SEL2.

In FIG. 9, in order to prevent the drawing from being complicated, the signal line SL(0)0(R) is shown as *1, the signal line SL(0)0(G) is shown as *2, the signal line SL(0)0(B) is shown as *3, and the signal line SL(0)1(R) is shown as *4.

Configuration of Liquid Crystal Display Device 1 with Touch Detection Function

Figure 10:
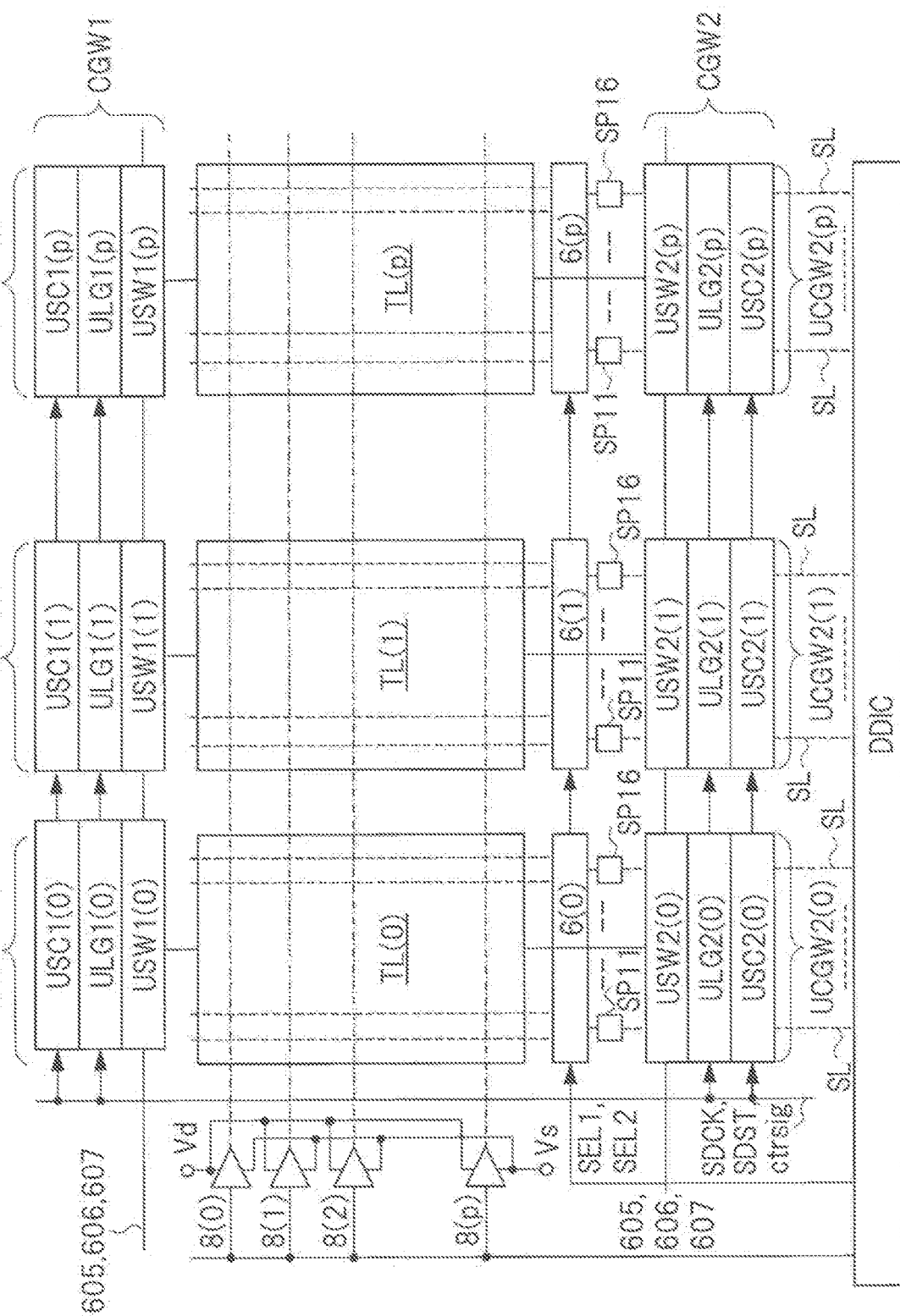
FIG. 10 is a block diagram showing the configuration of the liquid crystal display device with a touch detection function according to the first embodiment.

FIG. 10 is a block diagram showing the configuration of the liquid crystal display device 1 with a touch detection function. In FIG. 10, reference characters TL(0) to TL(p) denote common electrodes, reference characters UCGW1(0) to UCGW1(p) denote the first unit electrode drive circuits described with reference to FIG. 8(A), and reference characters UCGW2(0) to UCGW2(p) denote the second unit electrode drive circuits described with reference to FIG. 8(B). The arrangement of the common electrodes TL(0) to TL(p), the first unit electrode drive circuits UCGW1(0) to UCGW1(p), and the second unit electrode drive circuits UCGW2(0) to UCGW2(p) is depicted in accordance with the actual arrangement. Each of the first unit electrode drive circuits UCGW1(0) to UCGW1(p) and each of the second unit electrode drive circuits UCGW2(0) to UCGW2(p) are arranged so as to sandwich the corresponding common electrodes TL(0) to TL(p) in the extending direction thereof. Accordingly, in the touch detection period, the first and second voltages TPH and VCOMDC1 of the first and second voltage wires 605 and 606 can be alternately supplied from both ends of the selected common electrode.

Though not particularly limited, in the first unit electrode drive circuit (second unit electrode drive circuit), the first unit switch circuit (second unit switch circuit), the first unit logic circuit (second unit logic circuit), and the stages of the shift register are arranged in the order of increasing distance from the corresponding common electrode. In FIG. 10, reference characters 8(0) to 8(p) denote unit gate drivers constituting the gate driver 8. Though not particularly limited, the voltage Vd and the ground voltage Vs are fed to the unit gate drivers 8(0) to 8(p) via a common voltage wire, and the unit gate drivers 8(0) to 8(p) operate with using the voltage Vd as an operating voltage in the display period. Namely, in the display period, the unit gate drivers 8(0) to 8(p) form scanning signals in accordance with a timing signal supplied from the semiconductor device for driver DDIC and supply the scanning signals to scanning lines.

Note that FIG. 10 shows only the unit gate drivers 8(0) to 8(p) arranged on the left side of FIG. 10, but a plurality of unit gate drivers are arranged also on the right side of FIG. 10. Namely, FIG. 10 shows only the unit gate driver extending between the long side 2-L of the display panel 2 and the long side 600-L of the module 600 in FIG. 6, and the unit gate driver extending between the long side 2-R of the display panel 2 and the long side 600-R of the module 600 is omitted. Though not particularly limited, the unit gate driver arranged on the left side and the unit gate driver arranged on the right side supply scanning signals to scanning lines arranged alternately.

In FIG. 10, reference characters 6(0) to 6(p) denote unit signal line selectors described with reference to FIG. 9 and these unit signal line selectors 6(0) to 6(p) constitute the signal line selector 6. In FIG. 10, no reference character is attached to signal lines connected to the signal line selector in order to prevent the drawing from being complicated, but broken lines are shown so as to represent the presence of the signal lines. Similarly, no reference character is attached to scanning lines, but one-dot chain lines are shown so as to represent the presence of the scanning lines. When a touch is detected in the mutual capacitance type shown in FIG. 2, detection electrodes are arranged so as to intersect with the common electrodes TL(0) to TL(p), but these detection electrodes are also omitted in FIG. 10.

In FIG. 10, the semiconductor device for touch 7 is depicted below the second unit electrode drive circuits UCGW2(0) to UCGW2(p), and terminals of the semiconductor device for touch 7 and the terminals SP11 to SP16 are depicted to be connected by the signal wire SL. However, when the display panel 2 is viewed in a plan view, the semiconductor device for touch 7 is mounted so as to cover the second unit electrode drive circuits UCGW2(0) to UCGW2(p).

In the first embodiment, each of the first unit switch circuits USW1(0) to USW1(p) in the first unit electrode drive circuits UCGW1(0) to UCGW1(p) constituting the first electrode drive circuit CGW1 is connected to the first voltage wire 605, the second voltage wire 606 and the third voltage wire 607. Similarly, each of the second unit switch circuits USW2(0) to USW2(p) in the second unit electrode drive circuits UCGW2(0) to UCGW2(p) constituting the second electrode drive circuit CGW2 is also connected to the first voltage wire 605, the second voltage wire 606 and the third voltage wire 607. However, the voltage wires connected to the first unit switch circuits USW1(0) to USW1(p) and the second unit switch circuits USW2(0) to USW2(p) vary in a plurality of embodiments described below. Thus, the present invention is not limited to this configuration.

The clock signal SDCK and the selection signal SDST are supplied from the semiconductor device for touch 7 (FIG. 1) to the scanning circuit SC1 included in the first electrode drive circuit CGW1 and the scanning circuit SC2 included in the second electrode drive circuit CGW2. In the first embodiment, though not particularly limited, the clock signal SDCK and the selection signal SDST supplied to the scanning circuit SC1 and the scanning circuit SC2 are the same signals. Accordingly, the scanning circuit SC1 and the scanning circuit SC2 operate in synchronization.

The control signal ctrsig is supplied from the semiconductor device for touch 7 to the first unit logic circuits ULG1(0) to ULG1(p) constituting the first electrode drive circuit CGW1 and the second unit logic circuits ULG2(0) to ULG2(p) constituting the second electrode drive circuit CGW2. Configuration examples of the first electrode drive circuit CGW1 and the second electrode drive circuit CGW2 will be described in the first embodiment and a plurality of embodiments below. Since the control signal supplied from the semiconductor device for touch 7 to the first unit logic circuit and the second unit logic circuit varies depending on the embodiments, the control signal ctrsig is a generic control signal of such control signals.

First Electrode Drive Circuit and Second Electrode Drive Circuit

As described with reference to FIGS. 8 and 10, the first electrode drive circuit CGW1 is constituted of the plurality of first unit electrode drive circuits UCGW1(0) to UCGW1(p), and the second electrode drive circuit CGW2 is constituted of the plurality of second unit electrode drive circuits UCGW2(0) to UCGW2(p).

In the first embodiment, each of the first unit electrode drive circuits UCGW1(0) to UCGW1(p) and each of the second unit electrode drive circuits UCGW2(0) to UCGW2(p) have the same configuration. Thus, the configuration of the first unit electrode drive circuit UCGW1(n) will be described as a representative example.

Figure 11A:
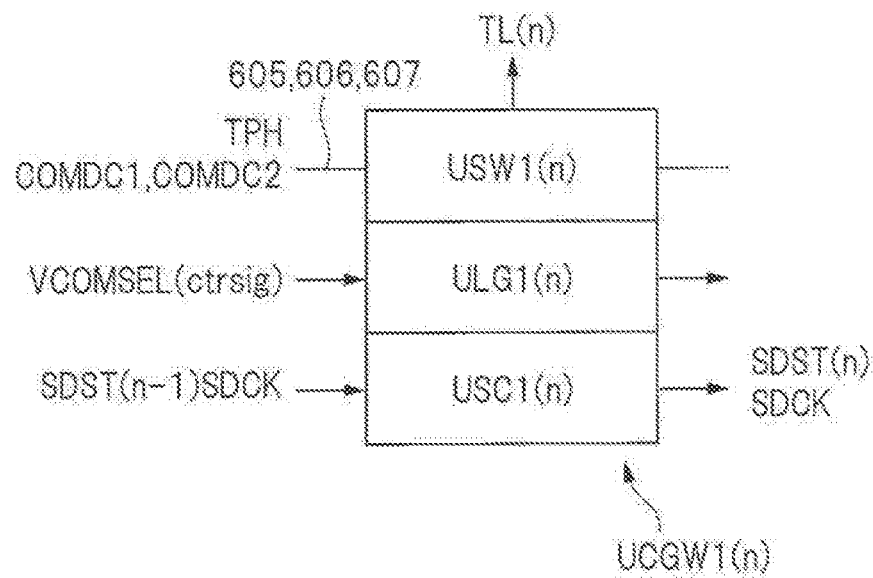
FIG. 11(A) and FIG. 11(B) are a block diagram and a circuit diagram showing a configuration of a first unit electrode drive circuit according to the first embodiment.
Figure 11B:
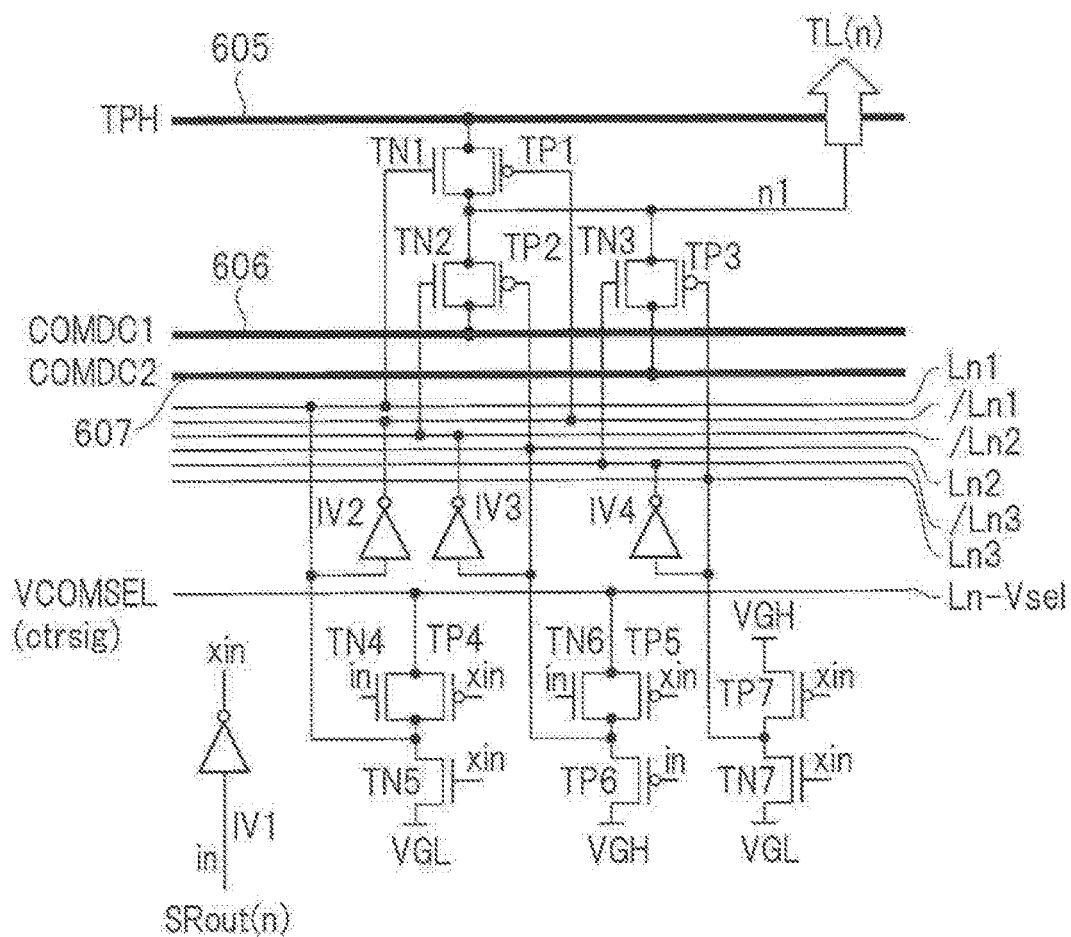

FIG. 11(A) is a block diagram showing the configuration of the first unit electrode drive circuit UCGW1(n) and FIG. 11(B) is a circuit diagram showing the configuration of the first unit electrode drive circuit UCGW1(n).

As described above, the first unit electrode drive circuit UCGW1(n) includes the first unit switch circuit USW1(n), the first unit logic circuit ULG1(n) and the stage (flip-flop circuit) USC1(n). In the first embodiment, as shown in FIG. 11(A), the first unit switch circuit USW1(n) is connected to the first to third voltage wires 605 to 607, and the first voltage TPH, the second voltage VCOMDC1 and the third voltage VCOMDC2 are supplied thereto. Also, the control signal VCOMSEL whose voltage value changes periodically in the touch detection period is supplied to the first unit logic circuit ULG1(n) as the control signal ctrsig. Further, in the display period, the voltage of the control signal VCOMSEL is at a low level.

The selection signal SDST(n−1) from the previous stage USC1(n−1) and the clock signal SDCK are supplied to the stage USC1(n). The clock signal SDCK is a shift clock signal, and when the voltage thereof changes, the stage USC1(n) fetches and holds the logical value of the selection signal SDST and forms and outputs an output signal in accordance with the fetched selection signal SDST. The output of the stage USC1(n) is supplied to the next stage USC1(n+1) as the selection signal SDST(n) and supplied also to the corresponding first unit logic circuit ULG1(n) as an output SRout(n) of the scanning circuit (stage USC1(n)). The clock signal SDCK is supplied to the stages USC1(0) to USC1(p) constituting the scanning circuit SC1 in parallel. Thus, when the clock signal SDCK changes next, the next stage USC1(n+1) fetches the logical value of the selection signal SDST(n) output previously from the stage USC1(n). In this manner, the selection signal SDSK of the logical value "1" specifying the detection of a touch sequentially moves in the shift register.

FIG. 11(B) shows the circuit configuration of the first unit logic circuit ULG1(n) and the first unit switch circuit USW1(n). The first unit switch circuit ULG1(n) includes N-channel MOSFETs (hereinafter, referred to as N-type MOSFET) TN1 to TN3 and P-channel MOSFETs (hereinafter, referred to as P-type MOSFET) TP1 to TP3. In this specification, a circle mark o is attached to a gate electrode of the P-type MOSFET so as to be distinguished from the N-type MOSFET. Further, in the description of the N-type MOSFET and the P-type MOSFET, the terms of the source and the drain are used to make the description easier, but the source and the drain are determined depending on the voltages at terminals of the MOSFET. Therefore, the source and the drain are used for convenience of description and are not limited thereto.

The drain of the N-type MOSFET TN1 and the source of the P-type MOSFET TP1 are connected to the first voltage wire 605 and the source of the N-type MOSFET TN1 and the drain of the P-type MOSFET TP1 are connected to a node n1. Namely, the N-type MOSFET TN1 and the P-type MOSFET TP1 are connected in parallel between the first voltage wire 605 and the node n1, and the conduction/non-conduction (ON/OFF) is controlled by a switch signal supplied to the gate of each of the N-type MOSFET TN1 and the P-type MOSFET TP1. In other words, the N-type MOSFET TN1 and the P-type MOSFET TP1 constitute a first switch (TN1, TP1) connected between the first voltage wire 605 and the node n1 and ON/OFF of the first switch (TN1, TP1) is controlled by a switch signal supplied to the gates of the N-type MOSFET TN1 and the P-type MOSFET TP1.

The drain of the N-type MOSFET TN2 is connected to the node n1 and the source thereof is connected to the second voltage wire 606. Also, the source of the P-type MOSFET TP2 is connected to the node n1 and the drain thereof is connected to the second voltage wire 606. Namely, the N-type MOSFET TN2 and the P-type MOSFET TP2 are connected in parallel between the second voltage wire 606 and the node n1 and the conduction/non-conduction (ON/OFF) is controlled by a switch signal supplied to the gate of each of the N-type MOSFET TN2 and the P-type MOSFET TP2. In other words, the N-type MOSFET TN2 and the P-type MOSFET TP2 constitute a second switch (TN2, TP2) connected between the second voltage wire 606 and the node n1 and ON/OFF of the second switch (TN2, TP2) is controlled by a switch signal supplied to the gates of the N-type MOSFET TN2 and the P-type MOSFET TP2.

The drain of the N-type MOSFET TN3 is connected to the node n1 and the source thereof is connected to the third voltage wire 607. Also, the source of the P-type MOSFET TP3 is connected to the node n1 and the drain thereof is connected to the third voltage wire 607. Namely, the N-type MOSFET TN3 and the P-type MOSFET TP3 are connected in parallel between the third voltage wire 607 and the node n1 and the conduction/non-conduction (ON/OFF) is controlled by a switch signal supplied to the gate of each of the N-type MOSFET TN3 and the P-type MOSFET TP3. In other words, the N-type MOSFET TN3 and the P-type MOSFET TP3 constitute a third switch (TN3, TP3) connected between the third voltage wire 607 and the node n1 and ON/OFF of the third switch (TN3, TP3) is controlled by a switch signal supplied to the gates of the N-type MOSFET TN3 and the P-type MOSFET TP3.

The node n1 is electrically connected to the other end of the corresponding common electrode TL(n) on the other short side (2-U in FIG. 6) of the liquid crystal element array LCD. Accordingly, in the touch detection period, by controlling the first switch (TN1, TP1) to the third switch (TN3, TP3) by the switch signal, the common electrode TL(n) is electrically connected to the first to third voltage wires 605 to 607 via any of the first to third switches (TN1, TP1) to (TN3, TP3). Namely, in the touch detection period, the first voltage TPH, the second voltage VCOMDC1 or the third voltage VCOMDC2 is supplied to the common electrode TL(n).

The first unit logic circuit ULG1(n) includes inverter circuits IV1 to IV4, N-type MOSFETs TN4 to TN7 and P-type MOSFETs TP4 to TP7. The inverter IV1 receives an output signal SRout(n) output from the corresponding stage USC1(n) and outputs a phase-inverted signal. The output signal SRout(n) is fetched by the corresponding stage USC1(n) and has a voltage value in accordance with the held selection signal. The selection signal SDST fetched by the stage USC1(n) has the logical value "1" when the corresponding common electrode TL(n) is set as a selected common electrode, and has the logical value "0" when the corresponding common electrode TL(n) is set as a non-selected common electrode. In the description of FIG. 11(B), it is assumed that a control signal formed by phase inversion of the output signal SRout(n) by the inverter circuit IV1 is denoted as "xin" and a control signal with the same phase as the output signal SRout(n) is denoted as "in". Naturally, since the control signal in has the same phase as the output signal SRout(n), the control signal in may be set as the control signal SRout(n).

The drain of the N-type MOSFET TN4 is connected to a signal wire Ln-Vsel that transmits the control signal VCOMSEL, the source thereof is connected to a signal wire Ln1, and the control signal in is supplied to the gate thereof. The source of the P-type MOSFET TP4 is connected to the signal wire Ln-Vsel, the drain thereof is connected to a signal wire /Ln1, and the control signal xin is supplied to the gate thereof so that the P-type MOSFET TP4 is connected in parallel with the N-type MOSFET TN4. The drain of the N-type MOSFET TN5 is connected to the signal wire Ln1, a voltage VGL is supplied to the source thereof, and the control signal xin is supplied to the gate thereof. Here, the voltage VGL is a low-level voltage and is, for example, the ground voltage Vs.

The gate of the N-type MOSFET TN1 constituting the first switch is connected to the signal wire Ln1 and the gate of the P-type MOSFET TP1 constituting the first switch is connected to the signal wire /Ln1.

When the output signal SRout(n) of the corresponding stage USC1(n) has the logical value "1" indicating that the common electrode TL(n) is set to a selected common electrode, the control signal in changes to the high level and the control signal xin changes to the low level. Accordingly, both of the N-type MOSFET TN4 and the P-type MOSFET TP4 are turned on. At this time, since the N-type MOSFET TN5 is turned off, the control signal VCOMSEL in the signal wire Ln-Vsel is transmitted to the signal wire Ln1 via the N-type MOSFET TN4 and the P-type MOSFET TP4, and the control signal VCOMSEL whose phase is inverted by the inverter circuit IV2 is transmitted to the signal wire /Ln1. Namely, in this case, the control signal VCOMSEL is transmitted to the signal wire Ln1 and the control signal obtained by inverting the phase of the control signal VCOMSEL is transmitted to the signal wire /Ln1.

The control signal VCOMSEL transmitted to the signal wire Ln1 and the control signal (control signal obtained by inverting the phase of the control signal VCOMSEL) transmitted to the signal wire /Ln1 are supplied to the respective gates of the N-type MOSFET TN1 and the P-type MOSFET TP1 as switch signals of the first switch (TN1, TP1). The control signal VCOMSEL supplied to the first electrode drive circuit CGW1 and the second electrode drive circuit CGW2 is a control signal whose voltage changes periodically in the touch detection period.

When the voltage of the control signal VCOMSEL is at a high level, the N-type MOSFET TN1 and the P-type MOSFET TP1 are turned on, and when the voltage of the control signal VCOMSEL is at a low level, the N-type MOSFET TN1 and the P-type MOSFET TP1 are turned off. Accordingly, the first switch (TN1, TP1) electrically connects the first voltage wire 605 to the corresponding common electrode TL(n) when the control signal VCOMSEL is at a high level and electrically separates the first voltage wire 605 from the corresponding common electrode TL(n) when the control signal VCOMSEL is at a low level. Namely, the first switch (TN1, TP1) supplies the first voltage TPH to the corresponding common electrode TL(n) or stops the supply in accordance with the voltage of the control signal VCOMSEL.

Meanwhile, when the output signal SRout(n) of the corresponding stage USC1(n) has the logical value "0" indicating that the common electrode TL(n) is set to a non-selected common electrode, the control signal in changes to the low level and the control signal xin changes to the high level. Accordingly, both of the N-type MOSFET TN4 and the P-type MOSFET TP4 are turned off. On the other hand, the N-type MOSFET TN5 is turned on by the control signal xin at a high level. Thus, the signal wire Ln1 changes to the voltage VGL at the low level via the N-type MOSFET TN5 and the signal wire /Ln1 changes to the high level by the inverter IV2. As a result, when the output signal SRout(n) is a voltage corresponding to the logical value "0", that is, the corresponding common electrode TL(n) is specified as a non-selected common electrode, the first switch (TN1, TP1) is turned off regardless of the voltage of the control signal VCOMSEL, and the corresponding common electrode TL(n) is electrically separated from the first voltage wire 605.

The drain of the N-type MOSFET TN6 is connected to the signal wire Ln-Vsel, the source thereof is connected to a signal wire /Ln2 via the inverter IV3, and the control signal in is supplied to the gate thereof. The source of the P-type MOSFET TP5 is connected to the signal wire Ln-Vsel, the drain thereof is connected to a signal wire Ln2, and the control signal xin is supplied to the gate thereof. Also, the drain of the P-type MOSFET TP6 is connected to the signal wire Ln2, a voltage VGH at a high level is supplied to the source thereof, and the control signal in is supplied to the gate thereof. Here, the voltage value of the voltage VGH is set to, for example, the same voltage value as that of the first voltage TPH.

When the output signal SRout(n) of the corresponding stage USC1(n) has the logical value "1" indicating that the common electrode TL(n) is set to a selected common electrode, the N-type MOSFET TN6 and the P-type MOSFET TP5 are turned on and the P-type MOSFET TP6 is turned off. Accordingly, the control signal VCOMSEL in the signal wire Ln-Vsel is transmitted to the signal wire Ln2 via the N-type MOSFET TN6 and the P-type MOSFET TP5. Also, the control signal whose phase is inverted by the inverter IV3 is transmitted to the signal wire /Ln2.

The gate of the N-type MOSFET TN2 constituting the second switch (TN2, TP2) is connected to the signal wire /Ln2 and the gate of the P-type MOSFET TP2 is connected to the signal wire Ln2. Thus, when the output signal SRout(n) has the logical value "1", the control signal VCOMSEL is supplied as a switch signal to the second switch (TN2, TP2) like the first switch (TN1, TP1). However, unlike the first switch (TN1, TP1), the control signal whose phase is inverted by the inverter IV3 (control signal whose phase is inverted with respect to the control signal VCOMSEL) is supplied to the gate of the N-type MOSFET TN2 constituting the second switch (TN2, TP2), and the control signal VCOMSEL is supplied to the gate of the P-type MOSFET TP2. Accordingly, each of the N-type MOSFET TN2 and the P-type MOSFET TP2 constituting the second switch (TN2, TP2) is turned on when the voltage of the control signal VCOMSEL is at the low level and turned off when the voltage thereof is at the high level. Namely, the second switch (TN2, TP2) electrically connects the second voltage wire 606 and the corresponding common electrode TL(n) when the control signal VCOMSEL is at the low level and electrically separates the second voltage wire 606 from the corresponding common electrode TL(n) when the control signal VCOMSEL is at the high level. In other words, the second switch (TN2, TP2) supplies the second voltage VCOMSEL1 to the corresponding common electrode TL(n) when the control signal VCOMSEL is at the low level.

Meanwhile, when the output signal SRout(n) of the corresponding stage USC1(n) has the logical value "0" indicating that the common electrode TL(n) is set to a non-selected common electrode, each of the N-type MOSFET TN6 and the P-type MOSFET TP5 is turned off and the P-type MOSFET TP6 is turned on. Accordingly, the voltage VGH at the high level is supplied to the signal wire /Ln via the P-type MOSFET TP6 regardless of the voltage of the control signal VCOMSEL. Also, a low level is supplied to the signal wire Ln2 by the inverter IV3. Accordingly, each of the N-type MOSFET TN2 and the P-type MOSFET TP2 constituting the second switch (TN2, TP2) is turned off.

Namely, the second switch (TN2, TP2) electrically separates the second voltage wire 606 from the corresponding common electrode TL(n).

Thus, in the case where the output signal SRout(n) of the corresponding stage USC1(n) has the logical value "1" indicating that the common electrode TL(n) is set to a selected common electrode, the corresponding common electrode TL(n) is connected to the first voltage wire 605 via the first switch (TN1, TP1) when the control signal VCOMSEL is at a high level, and the corresponding common electrode TL(n) is connected to the second voltage wire 606 via the second switch (TN2, TP2) when the control signal VCOMSEL is at a low level. As a result, in the touch detection period, the first voltage TPH of the first voltage wire 605 and the second voltage VCOMDC1 of the second voltage wire 606 are alternately supplied to the selected common electrode TL(n) in accordance with the voltage of the control signal VCOMSEL. Accordingly, whether the neighborhood of the selected common electrode TL(n) is touched can be detected.

On the other hand, when the output signal SRout(n) of the corresponding stage USC1(n) has the logical value "0" indicating that the common electrode TL(n) is set to a non-selected common electrode, both of the first switch (TN1, TP1) and the second switch (TN2, TP2) are turned off. Thus, the corresponding common electrode TL(n) is electrically separated from the first voltage wire 605 and the second voltage wire 606 to be in a floating state.

In order to prevent the variation of the voltage of the common electrode TL(n) in a floating state in the touch detection period caused when the corresponding common electrode TL(n) is specified as a non-selected common electrode, a third switch (TN3, TP3), N-type MOSFET TN7, P-type MOSFET TP7 and the inverter IV4 are provided in the first embodiment.

Namely, the drain of the N-type MOSFET TN7 is connected to a signal wire Ln3, the voltage VGL at the low level is supplied to the source thereof, and the control signal xin is supplied to the gate thereof. Also, the drain of the P-type MOSFET TP7 is connected to the signal wire Ln3, the voltage VGH at the high level is supplied to the source thereof, and the control signal xin is supplied to the gate thereof. Further, the signal wire Ln3 is connected to a signal wire /Ln3 via the inverter IV4. Namely, the voltage of the signal wire Ln3 is inverted by the inverter IV4 and supplied to the signal wire /Ln3. Here, the gate of the N-type MOSFET TN3 constituting the third switch (TN3, TP3) is connected to the signal wire /Ln3 and the gate of the P-type MOSFET TP3 is connected to the signal wire Ln3.

When the output signal SRout(n) of the corresponding stage USC1(n) has the logical value "0" indicating that the common electrode TL(n) is set to a non-selected common electrode, the N-type MOSFET TN7 is turned on and the P-type MOSFET TP7 is turned off. Accordingly, the voltage VGL at the low level is supplied to the signal wire Ln3 via the N-type MOSFET TN7. At this time, a high level is supplied to the signal wire /Ln3 by the inverter IV4.

The control signal VCOMSEL is not supplied to the third switch (TN3, TP3) and the voltages of the signal wires Ln3 and /Ln3 are used as switch signals of the third switch (TN3, TP3). When the output signal SRout(n) has the logical value "0", the high level of the signal wire Ln3 is supplied to the gate of the N-type MOSFET TN3 and the low level of the signal wire /Ln3 is supplied to the gate of the P-type MOSFET TP3. Thus, each of the N-type MOSFET TN3 and the P-type MOSFET TP3 constituting the third switch (TN3, TP3) is turned on. Accordingly, the corresponding common electrode TL(n) is electrically connected to the third voltage wire 607 via the third switch (TN3, TP3). As a result, when the corresponding common electrode TL(n) is specified as a non-selected common electrode, the third voltage VCOMDC2 is supplied. Namely, the non-selected common electrode is set to the third voltage VCOMDC2 instead of being put into a floating state, and the variation of the voltage thereof can be prevented in the touch detection period.

In addition, when the output signal SRout(n) of the corresponding stage USC1(n) has the logical value "1" indicating that the common electrode TL(n) is set to a selected common electrode, the P-type MOSFET TP7 is turned on and the N-type MOSFET TN7 is turned off. Accordingly, the voltage of the signal wire Ln3 changes to the voltage VGH at the high level and the voltage of the signal wire /Ln3 changes to the low level. By the voltages of the signal wires Ln3 and /Ln3, each of the N-type MOSFET TN3 and the P-type MOSFET TP3 constituting the third switch (TN3, TP3) is turned off and the common electrode TL(n) is electrically separated from the third voltage wire 607. Thus, it is possible to prevent the third voltage VCOMDC2 from being supplied to the common electrode TL(n) when the common electrode TL(n) is set to a selected common electrode.

Thus, in the touch detection period, when the corresponding common electrode TL(n) is a selected common electrode, the first switch (TN1, TP1) and the second switch (TN2, TP2) are alternately turned on in accordance with the voltage of the control signal VCOMSEL, so that the first voltage TPH of the first voltage wire 605 and the second voltage VCOMDC1 of the second voltage wire 606 can be alternately supplied to the selected common electrode. On the other hand, in the touch detection period, when the corresponding common electrode TL(n) is a non-selected common electrode, the third switch (TN3, TP3) is turned on and the third voltage VCOMDC2 of the third voltage wire 607 is supplied to the common electrode TL(n). Accordingly, when the corresponding common electrode is set to a selected common electrode, a touch can be detected, and when the corresponding common electrode is set to a non-selected common electrode, the degradation of the detection accuracy due to the variation of the voltage thereof can be reduced. When focusing on the first switch (TN1, TP1), the second switch (TN2, TP2), and the third switch (TN3, TP3), these switches are regarded as being in an ON (conduction) state alternatively in the touch detection period in the embodiment.

As is understood from the description above, the symbol "/" attached to the signal wires /Ln1 to /Ln3 means that a signal or a voltage whose phase is inverted with respect to a signal or a voltage of the signal wires Ln1 to Ln3 is supplied.

The first unit electrode drive circuit UCGW1(n) has been taken as an example in the description above, but the configuration and the operation are the same for each of the other first unit electrode drive circuits and second unit electrode drive circuits.

FIGS. 12(A) to 12(E) are waveform charts showing operations of the first electrode drive circuit CGW1 and the second electrode drive circuit CGW2. To make the description easier, FIGS. 12(A) to 12(E) show only common electrodes TL(n) and TL(n+1) of the plurality of common electrodes TL(0) to TL(p). Here, the common electrode TL(n+1) indicates a common electrode arranged next to the common electrode TL(n). The first unit electrode drive circuit corresponding to the common electrode TL(n) is denoted as UCGW1($n$) and the second unit electrode drive circuit corresponding thereto is denoted as UCGW2($n$). Also, the first unit electrode drive circuit corresponding to the common electrode TL(n+1) is denoted as UCGW1($n$+1) and the second unit electrode drive circuit corresponding thereto is denoted as UCGW2($n$+1).

Since the common electrode TL(n+1) is arranged next to the common electrode TL(n), the stage USC1($n$+1) included in the first unit electrode drive circuit UCGW1($n$+1) corresponds to the next stage that receives the selection signal SDST(n) which is the output from the stage USC1($n$) included in the first unit electrode drive circuit UCGW1($n$). Similarly, the stage USC2($n$+1) included in the second unit electrode drive circuit UCGW2($n$+1) corresponds to the next stage that receives the selection signal SDST(n) from the stage USC2($n$) included in the second unit electrode drive circuit UCGW2($n$).

In FIG. 12, the horizontal axis represents the time and the vertical axis represents the voltage. FIGS. 12(A) and 12(B) show selection signals output from the scanning circuits SC1 and SC2 in the first electrode drive circuit CGW1 and the second electrode drive circuit CGW2, respectively.

In particular, FIG. 12(A) shows the voltage waveform of SRout(n) output from the stage USC1($n$) included in the first unit electrode drive circuit UCGW1($n$) among the plurality of first unit electrode drive circuits constituting the first electrode drive circuit CGW1. The same selection signal SDST and the same clock signal SDCK are supplied to the scanning circuits SC1 and SC2 in the first electrode drive circuit CGW1 and the second electrode drive circuit CGW2 from the semiconductor device for touch 7, and the scanning circuits SC1 and SC2 operate in synchronization. Thus, FIG. 12(A) shows also the voltage waveform of SRout(n) output from the stage USC2($n$) included in the second unit electrode drive circuit UCGW2($n$) among the plurality of second unit electrode drive circuits constituting the second electrode drive circuit CGW2.

Also, FIG. 12(B) shows the voltage waveform of SRout(n+1) output from the stage USC1($n$+1) included in the first unit electrode drive circuit UCGW1($n$+1) among the plurality of first unit electrode drive circuits constituting the first electrode drive circuit CGW1. Since the scanning circuits SC1 and SC2 operate in synchronization, FIG. 12(B) shows also the voltage waveform of SRout(n+1) output from the stage USC2($n$+1) included in the second unit electrode drive circuit UCGW2($n$+1) among the plurality of second unit electrode drive circuits constituting the second electrode drive circuit CGW2. FIG. 12(C) shows the voltage waveform of the control signal VCOMSEL output from the semiconductor device for touch 7 (FIG. 1).

FIGS. 12(D) and 12(E) are voltage waveform charts showing voltage changes of the common electrodes TL(n) and TL(n+1). Here, the common electrode TL(n) is a common electrode corresponding to the first unit electrode drive circuit UCGW1($n$) and the second unit electrode drive circuit UCGW2($n$), and the common electrode TL(n+1) is a common electrode corresponding to the first unit electrode drive circuit UCGW1($n$+1) and the second unit electrode drive circuit UCGW2($n$+1).

Though not particularly limited, when the touch detection period is specified by the touch-display synchronizing signal TSHD (FIG. 1), the semiconductor device for touch 7 forms the control signal VCOMSEL whose voltage changes periodically. Also, in the period other than the touch detection period, the voltage of the control signal VCOMSEL is set to the low level. In the touch detection, the semiconductor device for touch 7 sets the selection signal SDST of the logical value "1" to both of the shift register constituting the scanning circuit SC1 and the shift register constituting the scanning circuit SC2. Then, the clock signal SDCK supplied to both of the shift registers is changed. By changing the clock signal SDCK, the selection signal SDST of the logical value "1" sequentially moves through the stages USC1(0) to USC1($p$) and USC2(0) to USC2($p$) of the respective shift registers.

In FIG. 12, the touch detection period (THP1) shows a state in which the stages USC1($n$-1) and USC2($n$-1) of the shift registers output the selection signal SDST(n-1) of the logical value "1" and then the clock signal SDCK is changed. Also, when the stages USC1($n$-1) and USC2($n$-1) of the shift registers output the selection signal SDST(n-1) of the logical value "1", the stages USC1($n$) and USC2($n$) of the shift registers output the selection signal SDST(n) of the logical value "0".

With the change of the clock signal SDCK, the stages USC1($n$) and USC2($n$) of the shift registers fetch the selection signal SDST(n-1) of the logical value "1" output from the previous stages USC1($n$-1) and USC2($n$-2) thereof and store the logical value of the fetched selection signal SDST (n-1), and then output the output signal SRout(n) and the selection signal SDST(n) in accordance with the logical value of the fetched selection signal SDST(n-1). At this time, the next stages USC1($n$+1) and USC2($n$+1) of the shift registers similarly fetch the selection signal SDST(n) of the logical value "0" output from the previous stages USC1($n$) and USC2($n$) thereof and store the logical value thereof, and then output the output signal SRout(n+1) and the selection signal SDST(n+1).

Accordingly, as shown in FIGS. 12(A) and 12(B), in the touch detection period (THP1), the output signal SRout(n) of each of the stages USC1($n$) and USC2($n$) becomes a high level corresponding to the logical value "1", and the output signal SRout(n+1) of each of the stages USC1($n$+1) and USC2($n$+1) becomes a low level corresponding to the logical value "0". Since the output signal SRout(n) of each of the stages USC1($n$) and USC2($n$) becomes a high level, as described with reference to FIG. 11, the first unit logic circuit ULG1($n$) and the second unit logic circuit ULG2($n$) control the first switch (TN1, TP1) or the second switch (TN2, TP2) in the first unit switch circuit USW1($n$) and the second unit switch circuit USW2($n$) to be in conduction in accordance with the voltage of the control signal VCOMSEL.

As shown in FIG. 12(C), the voltage of the control signal VCOMSEL changes periodically in the touch detection period THP1. Thus, in the touch detection period THP1, the common electrode TL(n) is electrically connected alternately to the first voltage wire 605 and the second voltage wire 606 in both of the first unit electrode drive circuit UCGW1($n$) and the second unit electrode drive circuit UCGW2($n$). As a result, the voltage of the common electrode TL(n) serving as a selected common electrode toggles between the first voltage TPH of the first voltage wire 605 and the second voltage VCOMDC1 of the second voltage wire 606 as shown in FIG. 12(D). Since the voltage of the common electrode TL(n) changes alternately, as described with reference to FIG. 2, the detection signals Rx(0) to Rx(p) in accordance with whether the neighborhood of the common electrode TL(n) is touched are formed.

On the other hand, since the output signal SRout(n+1) of each of the stages USC1($n$+1) and USC2($n$+1) of the shift registers is at a low level in the touch detection period THP1, the first unit logic circuit ULG1($n$+1) corresponding to the stage USC1($n$+1) controls each of the first switch (TN1, TP1) and the second switch (TN2, TP2) in the corresponding first unit switch circuit USW1($n$+1) to be turned off, and controls the third switch (TN3, TP3) to be turned on. Accordingly, the common electrode TL(n+1) corresponding to the stage USC1($n$+1) is electrically connected to the third voltage wire 607 via the third switch in the unit switch circuit USW1($n$+1), and the third voltage VCOMDC2 is supplied to the common electrode TL(n+1) serving as a non-selected common electrode. Accordingly, as shown in FIG. 12(E), the voltage of the non-selected common electrode TL(n+1) is fixed by the third voltage VCOMDC2 in the touch detection period THP1.

In the first embodiment, though not particularly limited, the second unit logic circuit ULG2($n$+1) corresponding to the stage USC2($n$+1) also controls the first switch and the second switch in the corresponding second unit switch circuit USW1($n$+1) to be turned off, and controls the third switch to be turned on. Thus, the third voltage VCOMDC2 is supplied also from the second unit electrode drive circuit UCGW2($n$+1) to the common electrode TL(n+1) serving as a non-selected common electrode.

Subsequently to the touch detection period THP1, a display period DISP in which the display is performed is specified by the touch-display synchronizing signal TSHD. When the display period DISP is specified, the signal lines SL(0) to SL(p) are precharged (precharge period).

In the precharge period and the display period DISP, the output signals SRout(0) to SRout(p) of each of the stages USC1(0) to USC1($p$) and USC2(0) to USC2($p$) of the shift registers constituting the scanning circuits SC1 and SC2 are set to the low level. Accordingly, the voltage of each of the common electrodes TL(0) to TL(p) becomes the third voltage VCOMDC2. In the display period DISP, the third voltage VCOMDC2 supplied to each of the common electrodes TL(0) to TL(p) is used as the voltage applied to each liquid crystal element LC (FIG. 7) for display. Namely, in the display period, the third voltage VCOMDC2 and a voltage in accordance with an image signal via the thin film transistor Tr (FIG. 7) are supplied to the liquid crystal element LC, and the display in accordance with the image signal is performed.

Since each stage of the shift registers constituting the scanning circuits SC1 and SC2 stores the logical value of a selection signal, when a touch detection period THP2 is specified again by the touch-display synchronizing signal TSHD, the selection signals SDST(0) to SDST(p) output by the stages USC1(0) to USC(p) and USC2(0) to USC2($p$) in the previous touch detection period THP1 are maintained. With the change of the clock signal SDCK, in the touch detection period THP2, the maintained selection signals SDST(0) to SDST(p) are sequentially fetched and held by the next stage, and the selection signals SDST(0) to SDST(p) and the output signals SRout(0) to SRout(p) in accordance with the fetched logical value are output like in the touch detection period THP1.

The operation in the touch detection period THP2 will be described below while taking the first unit electrode drive circuits UCGW1($n$) and UCGW1($n$+1) and the second unit electrode drive circuits UCGW2($n$) and UCGW2($n$+1) as an example. Namely, the stages USC1($n$+1) and USC2($n$+1) of the shift registers fetch and store the selection signal SDST(n) output after being stored in the previous stages USC1($n$) and USC2($n$). Also, the stages USC1($n$+1) and USC2($n$+1) output the selection signal SDST(n+1) of the logical value and the output signal SRout(n+1) having the voltage value in accordance with the logical value of the fetched selection signal SDST(n). Since the logical value of the selection signal SDST(n) is "1" in the touch detection period THP1, the stages USC1($n$+1) and USC2($n$+1) output the selection signal SDST(n+1) of the logical value "1" and also the high-level output signal SRout(n+1) in the touch detection period THP2.

In the touch detection period THP2, in accordance with the high-level output signal SRout(n+1), the first unit electrode drive circuit UCGW1($n$+1) and the second unit electrode drive circuit UCGW2($n$+1) perform the same operation as that of the first unit electrode drive circuit UCGW1($n$) and the second unit electrode drive circuit UCGW2($n$) in the touch detection period THP1. As a result, the common electrode TL(n+1) to be the selected common electrode is electrically connected alternately to the first voltage wire 605 and the second voltage wire 606 in both of the first unit electrode drive circuit UCGW1($n$+1) and the second unit electrode drive circuit UCGW2($n$+1). Accordingly, as shown in FIG. 12(E), the voltage of the common electrode TL(n+1) toggles between the first voltage TPH and the second voltage VCOMDC1.

On the other hand, with the change of the clock signal SDCK in the touch detection period THP2, the stages USC1($n$) and USC2($n$) of the shift registers fetch and store the selection signal SDST(n−1) of the logical value "0" output after being stored in the previous stages USC1($n$−1) and USC2($n$−1). Since the logical value of the fetched selection signal SDST(n−1) is "0", the selection signal SDST(n) of the logical value "0" is output and also the low-level output signal SRout(n) is output.

Since the low-level output signal SRout(n) is output, in the touch detection period THP2, the first unit electrode drive circuit UCGW1($n$) and the second unit electrode drive circuit UCGW2($n$) perform the same operation as that of the first unit electrode drive circuit UCGW1($n$+1) and the second unit electrode drive circuit UCGW2($n$+1) in the touch detection period THP1. As a result, as shown in FIG. 12(D), the voltage of the non-selected common electrode TL(n) is fixed to the third voltage VCOMDC2.

Hereinafter, each time when the display period and the touch detection period are specified by the touch-display synchronizing signal TSHD, the above-described operation is performed.

The selection signal SDST of the logical value "0" indicating non-selection is first set to the shift registers constituting the scanning circuits SC1 and SC2 as many times as necessary, and then the selection signal SDST of the logical value "1" indicating selection is set. In this manner, any common electrode can be specified as a selected common electrode and any area can be selected as an area where a touch is detected. Also, the selection signal SDST of the logical value "1" indicating selection may consecutively be set to the shift register multiple times. In this manner, a plurality of common electrodes adjacent to each other can be selected as selected common electrodes, and the so-called bundled driving is enabled. In addition, the selection signal SDST(p) output from the final stages USC1($p$) and USC2($p$) of the shift registers may be input into the initial stages USC1(0) and USC2(0) of the shift registers.

The electrode drive circuit CGW-U or CGW1 is arranged on the opposite side of the semiconductor device for driver DDIC across the display panel 2, in other words, the liquid crystal element array LCD. Namely, while the semiconductor device for driver DDIC is arranged along one side of the liquid crystal element array LCD, the electrode drive circuit CGW-U or CGW1 is arranged along the other side of the liquid crystal element array and the electrode drive circuit supplies a drive signal to the common electrode on the other side of the liquid crystal element array. Accordingly, an area on one side of the liquid crystal element array can be made small while suppressing the reduction in the change speed of the voltage in the selected common electrode in the touch detection period, and the reduction in width of the edge frame of the liquid crystal display device can be achieved.

Further, the electrode drive circuit CGW1 supplies a drive signal changing between the voltage based on the first voltage TPH of the first voltage wire 605 and the voltage based on the second voltage VCOMDC1 of the second voltage wire 606 to the selected common electrode. Accordingly, it is possible to prevent the signal wire that transmits a drive signal whose driving ability is high from being arranged near the liquid crystal element array, so that the degradation of detection accuracy of touch detection can be suppressed.

Further, the electrode drive circuit CGW1 supplies the third voltage VCOMDC2 to the non-selected common electrode in the touch detection period. Accordingly, it is possible to suppress the change of the voltage of the non-selected common electrode in the touch detection period, and the degradation of detection accuracy of touch detection can be suppressed.

Note that FIG. 12(B) shows the signal wires Ln1 to Ln3 and /Ln1 to /Ln3 for convenience of description, but these signal wires are not connected to signal wires of other unit logic circuits.

Second Embodiment

In the second embodiment, the configuration of each of the first unit electrode drive circuits UCGW1(0) to UCGW1(p) and the second unit electrode drive circuits UCGW2(0) to UCGW2(p) shown in FIGS. 8 and 10 is changed. Even after being changed, each of the first unit electrode drive circuits UCGW1(0) to UCGW1(p) and the second unit electrode drive circuits UCGW2(0) to UCGW2(p) has the same configuration, and thus the first unit electrode drive circuit UCGW1(n) will be described here as a representative example.

Figure 13A:
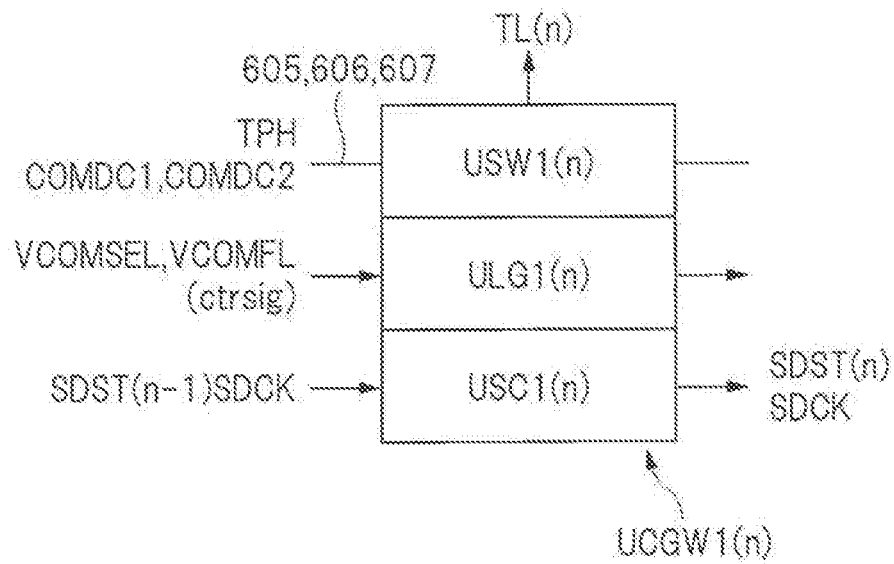
FIG. 13(A) and FIG. 13(B) are a block diagram and a circuit diagram showing a configuration of a first unit electrode drive circuit according to the second embodiment.
Figure 13B:
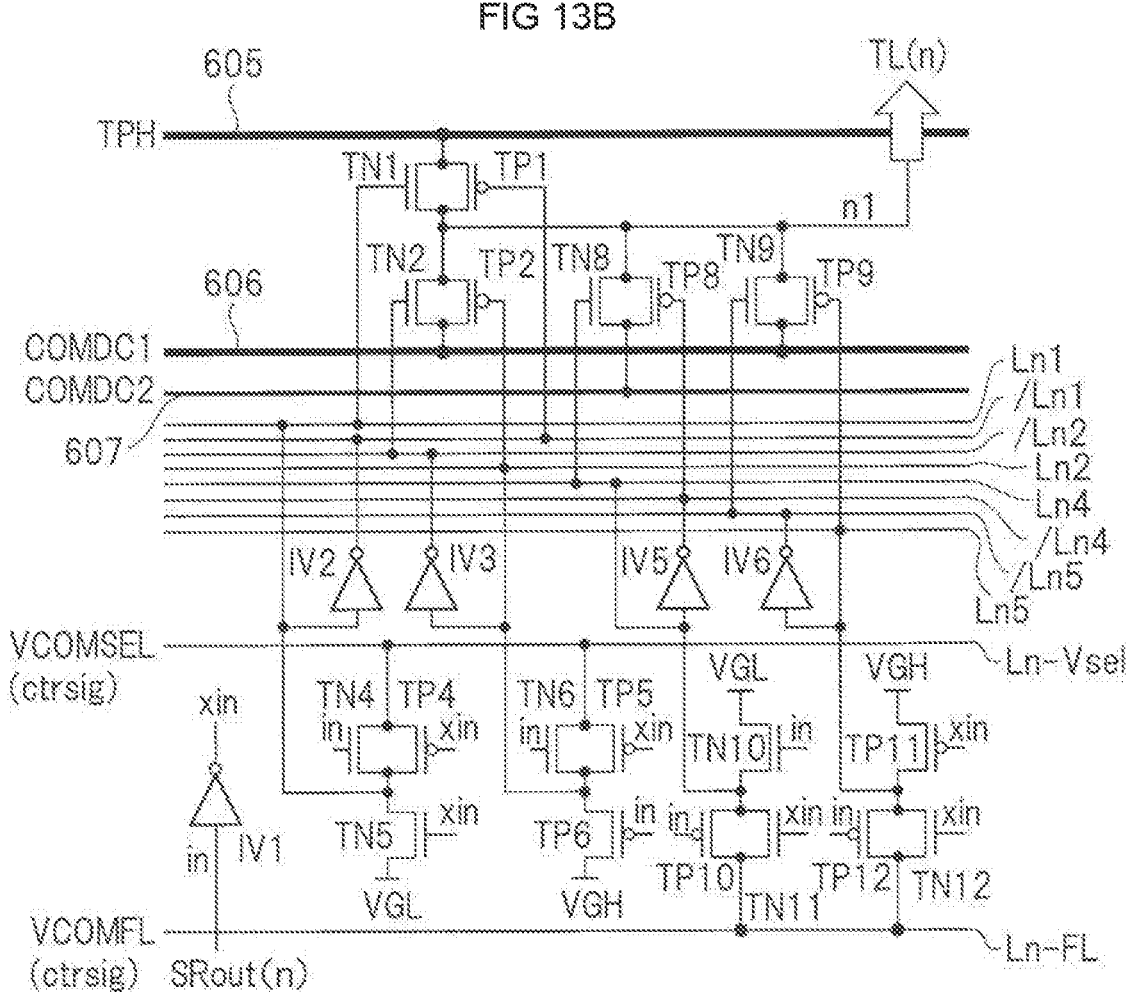

FIG. 13(A) is a block diagram showing the configuration of the first unit electrode drive circuit UCGW1(n) according to the second embodiment and FIG. 13(B) is a circuit diagram showing the configuration of the first unit electrode drive circuit UCGW1(n) according to the second embodiment.

Also in the second embodiment, as shown in FIG. 13(A), the first unit electrode drive circuit UCGW1(n) includes the stage USC1(n) of the shift register constituting the scanning circuit SC1, the first unit logic circuit ULG1(n) and the first unit switch circuit USW1(n) like in the first embodiment. Here, the configuration and operation of the stage USC1(n) of the shift register are the same as those in the first embodiment, and the configuration of the first unit logic circuit ULG1(n) and the first unit switch circuit USW1(n) is different from that in the first embodiment. In particular, the line width of the third voltage wire 607 is made smaller than those of the first voltage wire 605 and the second voltage wire 606 in the second embodiment. Note that the three-dimensional thickness of each of the first to third voltage wires is substantially the same.

Also, the control signal VCOMSEL and a control signal VCOMFL are supplied as the control signals ctrsig to the first logic circuit LG1 and the second logic circuit LG2 according to the second embodiment. Here, the control signal VCOMSEL is the same as the control signal VCOMSEL described in the first embodiment. On the other hand, the control signal VCOMFL is a control signal that distinguishes between the display period and the touch detection period. The control signal VCOMFL is formed by the semiconductor device for touch 7 based on, for example, the touch-display synchronizing signal TSHD.

Next, the configuration of the first unit electrode drive circuit UCGW1(n) according to the second embodiment will be described with reference to FIG. 13(B).

In FIG. 13(B), the first unit switch circuit USW1(n) is constituted of N-type MOSFETs TN1, TN2, TN8 and TN9 and P-type MOSFETs TP1, TP2, TP8 and TP9. Also, the first unit logic circuit ULG1(n) is constituted of inverters IV1 to IV3, IV5 and IV6, N-type MOSFETs TN4 to TN6 and TN10 to TN12, and P-type MOSFETs TP4 to TP6 and TP10 to TP12.

The first voltage TPH, the second voltage VCOMDC1 and the third voltage VCOMDC2 are supplied to the first unit switch circuit USW1(n) via the first voltage wire 605, the second voltage wire 606 and the third voltage wire 607. As described above, the line width of the third voltage wire 607 is made smaller than those of the first voltage wire 605 and the second voltage wire 607. To clearly show this, the third voltage wire 607 is depicted with a thinner line than the lines of the first voltage wire 605 and the second voltage wire 606 in FIG. 13(B).

The N-type MOSFET TN1 and the P-type MOSFET TP1 constitute the first switch (TN1, TP1) as described with reference to FIG. 11(B), and the N-type MOSFET TN2 and the P-type MOSFET TP2 constitute the second switch (TN2, TP2) as described with reference to FIG. 11(B). In the second embodiment, two switches are provided instead of the third switch (TN3, TP3) described with reference to FIG. 12(B). Namely, the first unit switch circuit USW1(n) includes a fourth switch (TN8, TP8) constituted of the N-type MOSFET TN8 and the P-type MOSFET TP8 and a fifth switch (TN9, TP9) constituted of the N-type MOSFET TN9 and the P-type MOSFET TP9.

In the fourth switch (TN8, TP8), the source of the N-type MOSFET TN8 and the drain of the P-type MOSFET TP8 are connected to the third voltage wire 607 and the drain of the N-type MOSFET TN8 and the source of the P-type MOSFET TP8 are connected to the node n1. Also, in the fifth switch (TN9, TP9), the source of the N-type MOSFET TN9 and the drain of the P-type MOSFET TP9 are connected to the second voltage wire 607 and the drain of the N-type MO SFET TN9 and the source of the P-type MO SFET TP9 are connected to the node n1.

In FIG. 13(B), like the inverter IV1 described with reference to FIG. 11(B), the inverter IV1 inverts the phase of the output signal SRout(n) from the corresponding stage USC1(n) to form a phase-inverted control signal xin. Also in FIG. 13(B), a control signal obtained by inverting the phase of the output signal SRout(n) is denoted as "xin" and a control signal with the same phase as the output signal SRout(n) is denoted as "in" like in FIG. 11(B).

The first switch (TN1, TP1) and the second switch (TN2, TP2) in the first unit switch circuit USW1(n) are controlled by the N-type MOSFETs TN4 to TN6, the P-type MOSFETs TP4 to TP6 and the inverters IV2 and IV3 in the first unit logic circuit ULG1(n). The control of the first switch (TN1, TP1) and the second switch (TN2, TP2) by these MOSFETs and inverters has already been described with reference to FIG. 12(B), and the description thereof is thus omitted.

The drain of the N-type MOSFET TN10 is connected to a signal wire Ln4, the low-level voltage VGL is supplied to the source thereof, and the control signal in is supplied to the gate thereof. The drain of the P-type MOSFET TP10 is connected to the signal wire Ln4, the source thereof is connected to a signal wire Ln-FL, and the control signal in is supplied to the gate thereof. Also, the source of the N-type MOSFET TN11 is connected to the signal wire Ln4, the drain thereof is connected to the signal wire Ln-FL, and the control signal xin is supplied to the gate thereof. A signal in the signal wire Ln4 is inverted in phase by the inverter IV5 and supplied to a signal wire /Ln4. The gate of the N-type MOSFET TN8 constituting the fourth switch (TN8, TP8) is connected to the signal wire Ln4 and the gate of the P-type MOSFET TP8 is connected to the signal wire /Ln4.

The control signal VCOMFL is supplied to the signal wire Ln-FL. The control signal is formed by the semiconductor device for touch 7 so as to be at a high level in the touch detection period and at a low level in the display period.

Like in FIG. 11(B), the output signal SRout(n) output from the stage USC1(n) of the shift register is at a high level when the corresponding common electrode TL(n) is specified as a selected common electrode and is at a low level when the corresponding common electrode TL(n) is specified as a non-selected common electrode.

When the output signal SRout(n) of the stage USC1(n) of the shift register is at a low level in the touch detection period, the N-type MOSFET TN11 and the P-type MOSFET TP10 are turned on and the N-type MOSFET TN10 is turned off. Accordingly, the control signal VCOMFL supplied to the signal wire Ln-FL is supplied to the signal wire Ln4 and the inverter IV5 via the N-type MOSFET TN11 and the P-type MOSFET TP10, respectively. Thus, the control signal VCOMFL is supplied to the signal wire Ln4 and the control signal obtained by inverting the phase of the control signal VCOMFL is supplied to the signal wire /Ln4. On the other hand, since it is in the touch detection period at this time, the control signal VCOMFL is at a high level. As a result, a high level is supplied to the gate of the N-type MOSFET TN8 constituting the fourth switch (TN8, TP8), a low level is supplied to the gate of the P-type MOSFET TP8, and each of the N-type MOSFET TN8 and the P-type MOSFET TP8 is turned on. Accordingly, when the common electrode TL(n) is specified as a non-selected common electrode in the touch detection period, the common electrode TL(n) is electrically connected to the third voltage wire 607 via the fourth switch (TN8, TP8), so that the variation of the voltage of the non-selected common electrode can be prevented like in the case of FIG. 11(B).

On the other hand, when the output signal SRout(n) is at a high level in the touch detection period, the N-type MOSFET TN10 is turned on and the N-type MOSFET TN11 and the P-type MOSFET TP10 are turned off, and thus the low-level voltage VGL is supplied to the gate of the N-type MOSFET TN8 and a high level is supplied to the gate of the P-type MOSFET TP8 from the inverter IV5. Accordingly, the fourth switch (TN8, TP8) is turned off and the corresponding common electrode TL(n) and the third voltage wire 607 are electrically separated. At this time, as described with reference to FIG. 11, the first switch (TN1, TP1) and the second switch (TN2, TP2) are turned on (conduction)/off (non-conduction) in accordance with the voltage of the output signal SRout(n). Accordingly, the common electrode TL(n) specified as the selected common electrode is electrically connected to the first voltage wire 605 or the second voltage wire 606 via the first switch (TN1, TP1) or the second switch (TN2, TP2).

Namely, in the second embodiment, when the common electrode is specified as a selected common electrode in the touch detection period, the first voltage wire 605 and the second voltage wire 606 having a large line width are connected to the selected common electrode and the first voltage TPH and the second voltage VCOMDC1 to change the voltage of the common electrode are periodically supplied thereto. Meanwhile, in the touch detection period, the third voltage wire having a smaller line width than the first and second voltage wires 605 and 606 is connected to the common electrode specified as a non-selected common electrode and the third voltage VCOMDC2 is supplied thereto.

Also, since the control signal VCOMFL changes to the low level in the display period, even if the output signal SRout(n) changes to the high level, a low level is supplied to the gate of the N-type MOSFET TN8 and a high level is supplied to the gate of the P-type MOSFET TP8. More specifically, the fourth switch (TN8, TP8) is turned off and the third voltage wire 607 and the corresponding common electrode TL(n) are electrically separated.

The source of the N-type MOSFET TN12 is connected to a signal wire Ln5, the drain thereof is connected to the signal wire Ln-FL, and the control signal xin is supplied to the gate thereof. The drain of the P-type MOSFET TP12 is connected to the signal wire Ln5, the source thereof is connected to the signal wire Ln-FL, and the control signal in is supplied to the gate thereof. Also, the drain of the P-type MOSFET TP11 is connected to the signal wire Ln5, the high-level voltage VGH is supplied to the source thereof, and the control signal xin is supplied to the gate thereof. A signal in the signal wire Ln5 is inverted in phase by the inverter IV6 and supplied to a signal wire /Ln5. In the fifth switch (TN9, TP9), the gate of the N-type MOSFET TN9 is connected to the signal wire /Ln5 and the gate of the P-type MOSFET TP9 is connected to the signal wire Ln5.

When the output signal SRout(n) of the stage USC1(n) is set to the low level in the display period, the N-type MOSFET TN12 and the P-type MOSFET TP12 are turned on and the P-type MOSFET TP11 is turned off. At this time, the control signal VCOMFL changes to the low level because of the display period. Accordingly, a low level is transmitted to the signal wire Ln5 and the inverter IV6 via the N-type MOSFET TN12 and the P-type MOSFET TP12 that are turned on, respectively. As a result, the P-type MOSFET TP9 and the N-type MOSFET TN9 are turned on and the corresponding common electrode TL(n) and the second voltage wire 606 are electrically connected via the fifth switch (TN9, TP9). Note that, when the output signal SRout(n) is set to the high level in the display period, the P-type MOSFET TP11 is turned on and the N-type MOSFET TN12 and the P-type MOSFET TP12 are turned off. Thus, the fifth switch (TN9, TP9) is turned off.

Incidentally, even if the output signal SRout(n) changes to the low level in the touch detection period, a high level of the control signal VCOMFL is transmitted to the signal wire Ln5 and a low level obtained by inverting a signal in the signal wire Ln5 is transmitted to the signal wire /Ln5. Accordingly, the fifth switch (TN9, TP9) is turned off.

Accordingly, in the display period, by setting the output signal SRout(n) to the low level, the second voltage wire 606 having a large line width is be electrically connected to the corresponding common electrode and the second voltage VCOMDC2 can be supplied thereto.

In the second embodiment, the voltage is supplied to the non-selected common electrode via the third voltage wire 607 having a small line width so that the voltage of the non-selected common electrode does not vary in the touch detection period, and the voltage can be supplied to the corresponding common electrode TL(n) via the second voltage wire 606 having a large line width by setting the output signal SRout(n) to the low level in the display period. Accordingly, the degradation of accuracy due to noise can be reduced while suppressing the increase in area caused by providing the third voltage wire 607, and the reduction in width of the edge frame can be achieved.

FIGS. 14(A) to 14(F) show voltage waveforms in the case where the first unit electrode drive circuit UCGW1(n) shown in FIG. 13(B) is used for the liquid crystal display device 1 shown in FIGS. 8 and 10. Namely, these are voltage waveforms in the case where the configuration of the first unit electrode drive circuit UCGW1(n) shown in FIG. 13(B) is adopted for each of the first unit electrode drive circuits UCGW1(0) to UCGW1(p) constituting the first electrode drive circuit CGW1 and the second unit electrode drive circuits UCGW2(0) to UCGW2(p) constituting the second electrode drive circuit CGW2 shown in FIG. 10.

In FIG. 14, like in FIG. 12, only voltage waveforms of the common electrodes TL(n) and TL(n+1) corresponding to the first unit electrode drive circuits UCGW1(n) and UCGW1(n+1) and the second unit electrode drive circuits UCGW2(n) and UCGW2(n+1) among the first unit electrode drive circuits UCGW1(0) to UCGW1(p) and the second unit electrode drive circuits UCGW2(0) to UCGW2(p) are shown in FIGS. 14(E) and 14(F). In conjunction with this, only voltage waveforms of the output signals SRout(n) and SRout(n+1) of the stages USC1(n) and USC1(n+1) of the shift register SC1 and the stages USC2(n) and USC2(n+1) of the shift register SC2 are shown in FIGS. 14(A) and 14(B).

As described above, the semiconductor device for touch 7 forms the control signal VCOMFL that is at a high level in the touch detection periods THP1 and THP2 and at a low level in the display period DISP. Note that the control signal VCOMFL is at a low level also in a signal line precharge period. Like in the first embodiment, the voltage of the control signal VCOMSEL changes periodically in the touch detection period and is at a low level in the display period.

Further, in the display period, the voltage of each of the output signals SRout(0) to SRout(p) of the stages USC1(0) to USC1(p) and USC2(0) to USC2(p) of the shift registers SC1 and SC2 is at a low level. This can be achieved by, for example, providing a circuit, which sets the output signals SRout(0) to SRout(p) of the shift registers SC1 and SC2 to the low level in response to the low level of the control signal VCOMFL, in the shift register. Also in this case, each of the stages USC1(0) to USC1(p) and USC2(0) to USC2(p) of the shift registers SC1 and SC2 holds a stored logical value.

Next, the operation of the liquid crystal display device 1 according to the second embodiment will be described with reference to FIGS. 10, 13(B) and 14(A) to 14(F).

When the touch-display synchronizing signal TSHD (FIG. 1) changes to the high level and the touch detection period is specified, the control signal VCOMFL is set to the high level and the voltage of the control signal VCOMSEL changes periodically. The output signal SRout(n) of the stages USC1(n) and USC2(n) of the shift registers outputs the logical value "1" (high level) specifying the corresponding common electrode TL(n) as a selected common electrode. At this time, it is assumed that the output signal SRout(n+1) of the low level corresponding to the logical value "0" specifying a non-selected common electrode is output from the corresponding stages USC1(n+1) and USC2(n+1) for the common electrode TL(n+1) next to the common electrode TL(n).

As described with reference to FIGS. 11(B) and 13(B), when the control signal VCOMSEL changes periodically and the output signal SRout(n) changes to the high level, the first voltage wire 605 or the second voltage wire 606 is electrically connected to the common electrode TL(n) via the first switch (TN1, TP1) or the second switch (TN2, TP2) in the touch detection period THP1. Thus, as shown in FIG. 14(E), the voltage toggles between the first voltage TPH and the second voltage VCOMDC1 in the common electrode TL(n). At this time, since the fourth switch (TN8, TP8) is turned on, the third voltage wire 607 is electrically connected to the common electrode TL(n+1) specified as a non-selected common electrode in the display period THP1. As a result, as shown in FIG. 14(F), the common electrode TL(n+1) specified as the non-selected common electrode is fixed to the third voltage VCOMDC2.

Next, in the display period DISP, the control signal VCOMSEL changes to the low level, and thus each of the first switch (TN1, TP1) and the second switch (TN2, TP2) is turned off. Also, in the display period DISP, the output signals SRout(0) to SRout(p) change to the low level and the fourth switch (TN8, TP8) is also turned off. Thus, the common electrodes TL(0) to TL(p) are about to change to the floating state, but the fifth switch (TN9, TP9) is turned on in the display period DISP. Therefore, each of the common electrodes TL(0) to TL(p) is connected to the second voltage wire 606 via the fifth switch (TN9, TP9) and fixed to the second voltage VCOMDC1 (see FIGS. 14(E) and 14(F)). As a result, by supplying an image signal to the signal line, the second voltage VCOMDC1 and a voltage in accordance with the image signal are supplied to the liquid crystal element LC (FIG. 7) via the thin film transistor Tr (FIG. 7) turned on by a scanning signal, and a display in accordance with the image signal is performed.

When the clock SDCK changes, the selection signal SDST(n) of each of the stages USC1(n) and USC2(n) is fetched and stored in the next stages USC1(n+1) and USC2(n+1). Also, each of the stages USC1(n+1) and USC2(n+1) outputs the output signal SRout(n+1) having the voltage value in accordance with the logical value of the fetched selection signal SDST(n). Similarly, each of the stages USC1(n) and USC2(n) fetches and stores the selection signal SDST(n−1) of the previous stages USC1(n−1) and USC2(n−1) and outputs the output signal SRout(n) corresponding to the selection signal SDST(n−1). In FIG. 14, the stages USC1(n+1) and USC2(n+1) fetch the selection signal SDST(n) of the logical value "1" and the stages USC1(n) and USC2(n) fetch the selection signal SDST(n−1) of the logical value "0". Thus, the output signal SRout(n) changes to a low level and the output signal SRout(n+1) changes to a high level. Accordingly, as shown in FIG. 14(F), the voltage of the common electrode TL(n+1) specified as a selected common electrode toggles between the first voltage TPH and the second voltage VCOMDC1 in the touch detection period THP2. On the other hand, the voltage of the common electrode TL(n) specified as a non-selected common electrode is fixed to the third voltage VCOMDC2. The same is true for the next and subsequent display periods DISP. The above-described operation is performed also for other common electrodes.

In the second embodiment, by using the third voltage wire 607 having a small line width, the degradation of detection accuracy due to noise is suppressed while preventing an increase in area, and the reduction in width of the edge frame can be achieved. Further, in the display period, a predetermined voltage (second voltage VCOMDC1) is supplied to the liquid crystal element LC via the second voltage wire 606 having a large line width. Thus, the variation of the voltage supplied to the liquid crystal element LC can be prevented in the display period.

FIRST MODIFICATION EXAMPLE

The case where the first unit electrode drive circuit UCGW1(n) shown in FIG. 13 is used for each of the first electrode drive circuit CGW1 and the second electrode drive circuit CGW2 shown in FIG. 10 has been described. In this first modification example, the first unit electrode drive circuit UCGW1(n) shown in FIG. 13 is used for each of the first unit electrode drive circuits UCGW1(0) to UCGW1(p) constituting the first electrode drive circuit CGW1 shown in FIG. 10 and the first unit electrode drive circuit UCGW1(n) shown in FIG. 11 is used for each of the second unit electrode drive circuits UCGW2(0) to UCGW2(p) constituting the second electrode drive circuit CGW2.

SECOND MODIFICATION EXAMPLE

In this second modification example, the first unit electrode drive circuit UCGW1(n) shown in FIG. 11 is used for each of the first unit electrode drive circuits UCGW1(0) to UCGW1(p) constituting the first electrode drive circuit CGW1 shown in FIG. 10 and the first unit electrode drive circuit UCGW1(n) shown in FIG. 13(B) is used for each of the second unit electrode drive circuits UCGW2(0) to UCGW2(p) constituting the second electrode drive circuit CGW2.

According to the first modification example and the second modification example, the line width of the third voltage wire 607 supplying the third voltage VCOMDC2 to the first electrode drive circuit CGW1 or the second electrode drive circuit CGW2 can be made smaller, and the increase in area can be suppressed.

It is also possible to regard the first to third voltage wires 605 to 607 supplying the first to third voltages to the first electrode drive circuit CGW1 as a first voltage wire, a third voltage wire and a fifth voltage wire, and regard the first to third voltage wires 605 to 607 supplying the first to third voltages to the second electrode drive circuit CGW2 as a second voltage wire, a fourth voltage wire and a sixth voltage wire, respectively. In this case, the first, third and fifth voltage wires extend between the short side 2-U of the display panel 2 and the module 600-U (FIG. 6), and the second, fourth and sixth voltage wires extend between the short side 2-D of the display panel 2 and the module 600-D (FIG. 6). Also in this case, the line width of each of the fifth and sixth voltage wires is made smaller than those of the first to fourth voltage wires.

Third Embodiment

In the liquid crystal display device 1 with a touch detection function according to the third embodiment, it is possible to select and adopt a desired touch detection method from a plurality of touch detection methods. Specifically, the liquid crystal display device 1 is configured so as to be able to adopt not only the mutual capacitance type touch detection method adopted in the first and second embodiments but also other touch detection methods different from the mutual capacitance type touch detection method. First, the principle of the touch detection method added in the third embodiment will be described.

Basic Principle of Capacitance Type Touch Detection (Self-Capacitance Type)

Figure 15A:
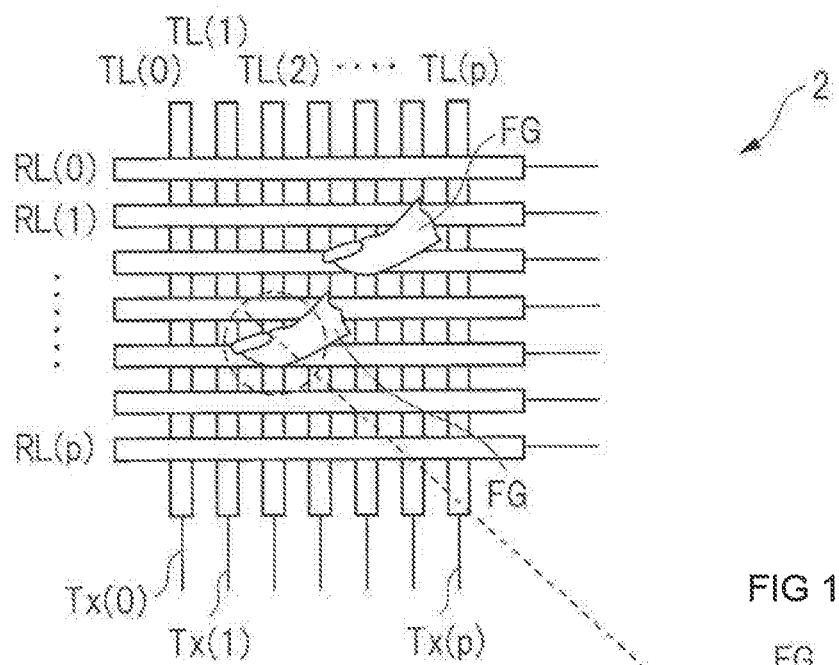
FIG. 15(A) to FIG. 15(C) are explanatory views illustrating the basic principle of capacitance type touch detection (self-capacitance type)
Figure 15B:
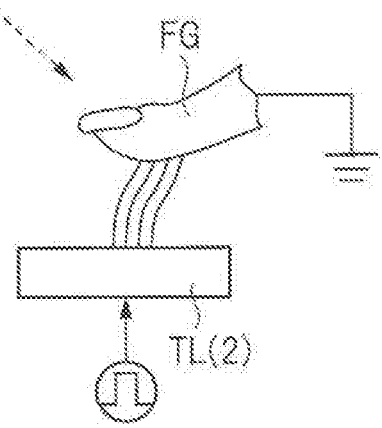
Figure 15C:
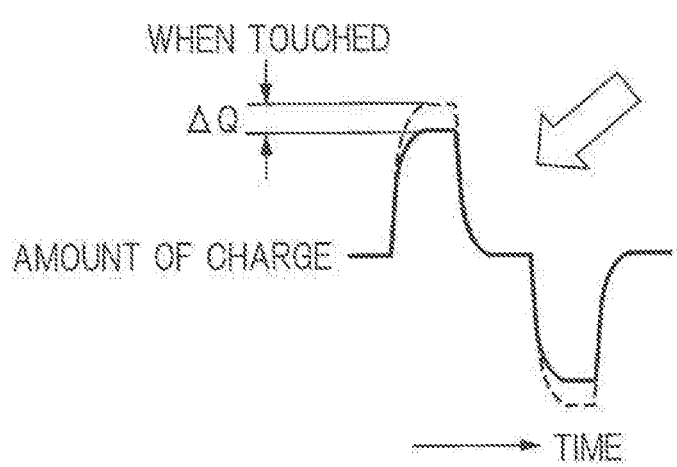

FIGS. 15(A) to 15(C) are explanatory views illustrating the basic principle of self-capacitance type touch detection. In FIG. 15(A), each of TL(0) to TL(p) is a common electrode extending in the column direction and arranged in parallel in the row direction and each of RL(0) to RL(p) is a detection electrode arranged so as to intersect with the common electrodes TL(0) to TL(p). Each of the detection electrodes RL(0) to RL(p) extends in the row direction so as to intersect with the common electrodes TL(0) to TL(p) and is arranged in parallel in the column direction. Although the common electrodes TL(0) to TL(p) and the detection electrodes RL(0) to RL(p) seem to intersect with each other when viewed in a plan view, an insulating layer is interposed between the common electrodes TL(0) to TL(p) and the detection electrodes RL(0) to RL(p) so as to prevent electric contact therebetween.

For convenience of description, TL(0) to TL(p) are assumed to be common electrodes and RL(0) to RL(p) are assumed to be detection electrodes, but a drive signal is supplied to each of the common electrodes TL(0) to TL(p) and the detection electrodes RL(0) to RL(p) and a detection signal is output from each of the common electrodes TL(0) to TL(p) and the detection electrodes RL(0) to RL(p). Thus, from the viewpoint of the detection of a touch of an external object, the common electrodes TL(0) to TL(p) and the detection electrodes RL(0) to RL(p) can both be regarded as detection electrodes.

In the self-capacitance type touch detection, the detection principle using the common electrodes TL(0) to TL(p) and the detection principle using the detection electrodes RL(0) to RL(p) are the same. Hereinafter, in the description of FIGS. 15(B) and 15(C), the common electrodes TL(0) to TL(p) and the detection electrodes RL(0) to RL(p) are collectively regarded as detection electrodes.

A parasitic capacitance is present between each of detection electrodes (the common electrodes TL(0) to TL(p) and the detection electrodes RL(0) to RL(p)) and the ground voltage. When an external object, for example, a finger FG touches the neighborhood of a detection electrode, an electric field is generated between the detection electrode and the finger FG as shown in FIG. 15(B). In other words, when the finger FG approaches, the capacitance connected between the detection electrode and ground voltage increases. Thus, when a drive signal whose voltage changes like a pulse as indicated within a circle in FIG. 15(B) is supplied to the detection electrode, the amount of charge accumulated between the detection electrode and the ground voltage changes depending on whether the neighborhood of the detection electrode is touched.

FIG. 15(C) shows the change of the amount of charge accumulated in the detection electrode depending on whether the finger FG touches the neighborhood of the detection electrode. Since the capacitance connected to the detection electrode increases when the finger FG touches the neighborhood of the detection electrode, when a drive signal in a pulse shape is supplied to the detection electrode, the amount of charge accumulated in the detection electrode increases by $\Delta Q$ compared with the case in which the finger does not touch. In FIG. 15(C), the horizontal axis represents the time and the vertical axis represents the amount of charge. Also, a broken line in FIG. 15(C) indicates a change of the amount of charge when touched. By detecting the difference $\Delta Q$ in the amount of charge accumulated in the detection electrode when the drive signal is supplied to the detection electrode, whether the neighborhood of the detection electrode is touched can be detected.

Configuration of Semiconductor Device for Touch 1600

Figure 16:
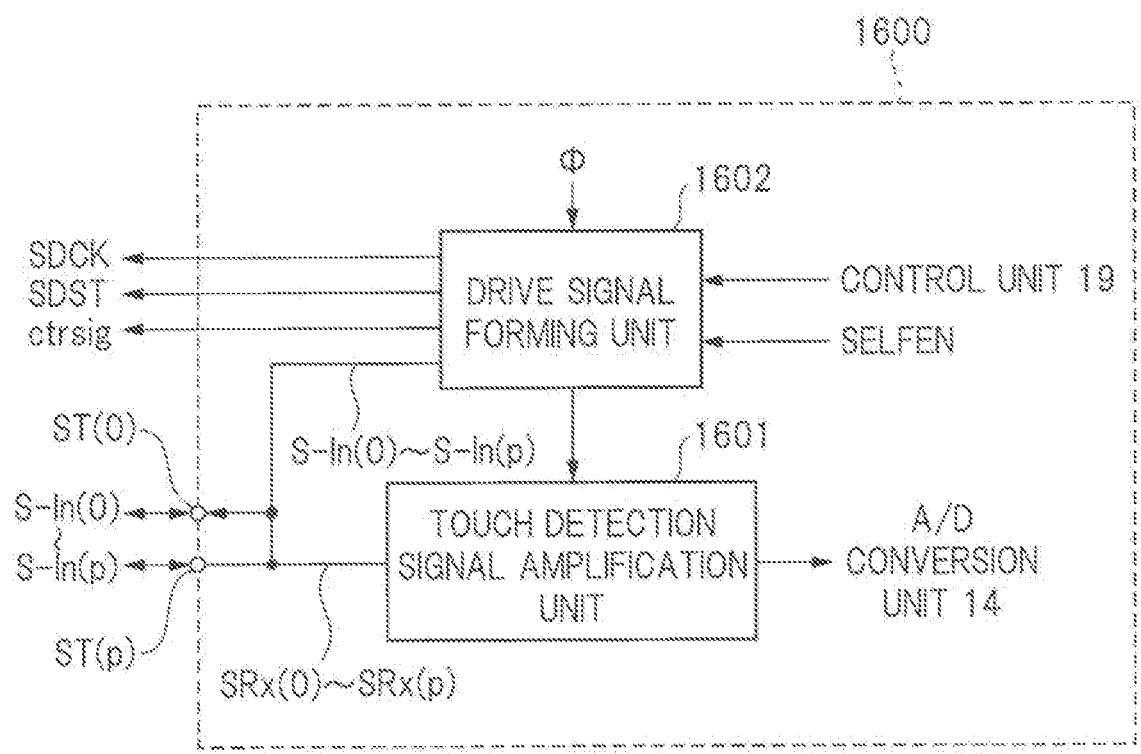
FIG. 16 is a block diagram showing a configuration of a semiconductor device for touch according to the third embodiment.

FIG. 16 is a block diagram showing the configuration of the semiconductor device for touch 1600. FIG. 16 shows only differences from the semiconductor device for touch 7 shown in FIG. 1. In the semiconductor device for touch 1600 according to the third embodiment, a touch detection signal amplification unit 1601 is provided in addition to the touch detection signal amplification unit 13 shown in FIG. 1. The A/D conversion unit 14, the signal processing unit 15, the coordinate extraction unit 16 and a detection timing control unit 19 shown in FIG. 1 are provided also in the semiconductor device for touch 1600 according to the third embodiment, but these units are the same as those in the first embodiment and are thus omitted in FIG. 16. Also, FIG. 16 shows a drive signal forming unit 1602 similar to the drive signal forming unit 17 shown in FIG. 1.

When a detection method specifying signal SELFEN specifying the touch detection method specifies the mutual capacitance type, the drive signal forming unit 1602 forms the clock signal SDCK, the selection signal SDST and the control signal ctrsig based on the control signal from the control unit 18 like the drive signal forming unit 17 shown in FIG. 1. Though not particularly limited, the drive signal forming unit 1602 receives a clock signal φ and forms, based on the clock signal φ, the clock signal SDCK whose voltage changes in synchronization with the clock signal φ.

On the other hand, when the detection method specifying signal SELFEN specifies the self-capacitance type described with reference to FIG. 15, the drive signal forming unit 1602 forms drive signals S-In(0) to S-In(p) in synchronization with the clock signal φ and outputs the drive signals via terminals ST(0) to ST(p). Though not particularly limited, the drive signal forming unit 1602 does not change the clock signal SDCK when the detection method specifying signal SELFEN specifies the self-capacitance type. Further, the output signals SRout(0) to SRout(p) of the stages USC1(0) to USC1($p$) and USC2(0) to USC2($p$) of the shift registers SC1 and SC2 are made to be at the low level.

The touch detection signal amplification unit 1601 receives the detection signals SRx(0) to SRx(p) from the common electrodes TL(0) to TL(p), amplifies a difference in the amount of charge generated depending on whether the neighborhood of a common electrode is touched as a difference of voltage, and outputs it to the A/D conversion unit 14 shown in FIG. 1. In the third embodiment, though not particularly limited, the terminals ST(0) to ST(p) are used as terminals for both of input and output. Namely, the terminals function as output terminals when supplying the drive signals S-In(0) to S-In(p) to the common electrodes TL(0) to TL(p) and function as input terminals when receiving the detection signals SRx(0) to SRx(p) from the common electrodes TL(0) to TL(p).

When the detection method specifying signal SELFEN specifies the self-capacitance type, the drive signal forming unit 1602 notifies the touch detection signal amplification unit 1601 of the timing when the drive signals S-In(0) to S-In(p) are formed as a timing signal. Based on the timing signal supplied from the drive signal forming unit 1602, the touch detection signal amplification unit 1602 amplifies signals in the terminals ST(0) to ST(p) as the detection signals SRx(0) to SRx(p). Accordingly, the voltages of the common electrodes TL(0) to TL(p) change based on the drive signals S-In(0) to S-In(p) and the changes in voltage generated in the common electrodes TL(0) to TL(p) depending on the presence or absence of a touch can be amplified by the touch detection signal amplification unit 1602.

As will be described below, the terminals ST(0) to ST(p) are electrically connected to the common electrodes TL(0) to TL(p) via the first electrode drive circuit CGW1 and/or the second electrode drive circuit CGW2. After the A/D conversion operation by the A/D conversion unit 14, the operation is the same as that in FIG. 1 and the description thereof is thus omitted.

Though not particularly limited, the detection method specifying signal SELFEN is formed based on user settings in the control unit 18 and supplied to the first electrode drive circuit CGW1 and/or the second electrode drive circuit CGW2. For example, the detection method specifying signal SELFEN specifies the self-capacitance type as the detection method when the voltage thereof is at a high level and specifies the mutual capacitance type as the detection method when the voltage thereof is at a low level. Also, the detection method specifying signal SELFEN is set to the low level in the display period. Thus, the detection method specifying signal SELFEN can be regarded as a self-capacitance type enable signal.

Configuration of Liquid Crystal Display Device

A liquid crystal display device according to the third embodiment has a configuration similar to that shown in FIG. 10, and thus the description here is based on the liquid crystal display device shown in FIG. 10. First, differences will be described. In this third embodiment, the self-capacitance type described with reference to FIG. 15 is added as a touch detection method. Thus, the drive signal for touch detection is supplied also to the detection electrodes Rx(0) to Rx(p) like the common electrodes TL(0) to TL(p), and the presence or absence of a touch is detected based on the detection signal in each of the detection electrodes Rx(0) to Rx(p). The supply of the drive signal for touch detection to the detection electrodes Rx(0) to Rx(p) and the detection of the presence or absence of a touch based thereon are substantially the same as the supply of the drive signal for touch detection to the common electrodes TL(0) to TL(p) and the detection of the presence or absence of a touch based thereon, and thus the description of the detection of the presence or absence of a touch using the detection electrodes Rx(0) to Rx(p) is omitted.

Also in the third embodiment, like in the first and second embodiments, the first electrode drive circuit CGW1 is constituted of the plurality of first unit electrode drive circuits UCGW1(0) to UCGW1(p). In addition, like in the first and second embodiments, the second electrode drive circuit CGW2 is also constituted of the plurality of second unit electrode drive circuits UCGW2(0) to UCGW2($p$). Further, in the third embodiment, though not particularly limited, the first unit electrode drive circuits UCGW1(0) to UCGW1($p$) and the second unit electrode drive circuits UCGW2(0) to UCGW2($p$) have the same configuration.

Figure 17:
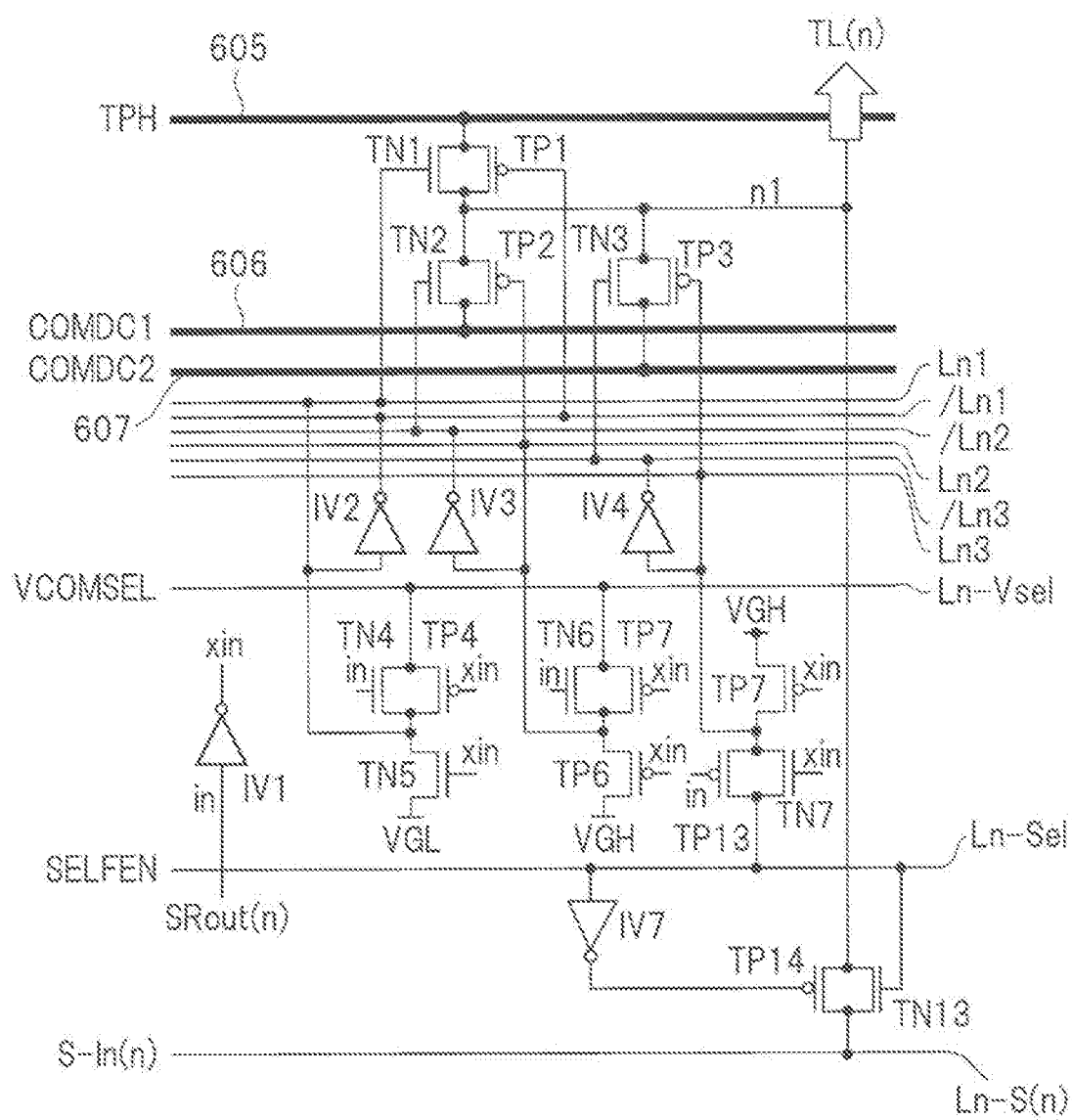
FIG. 17 is a circuit diagram showing a configuration of the first unit electrode drive circuit according to the third embodiment.

FIG. 17 shows the configuration of the first unit electrode drive circuit UCGW1($n$) as a representative of the first unit electrode drive circuits UCGW1(0) to UCGW1($p$) and the second unit electrode drive circuits UCGW2(0) to UCGW2($p$). The configuration shown in FIG. 17 is similar to the configuration shown in FIG. 11(B), and thus only differences will be mainly described here. In the first unit electrode drive circuit UCGW1($n$) shown in FIG. 17, the configuration of the stage USC1($n$) of the shift register and the first unit switch circuit USW1($n$) is the same as that in FIG. 11(B).

A circuit used when the self-capacitance type is adopted is added to the first unit logic circuit ULG1($n$) compared with the first unit logic circuit ULG1($n$) shown in FIG. 11(B). Namely, in FIG. 17, an inverter IV7, N-type MOSFET TN13 and P-type MOSFETs TP13 and TP14 are added to the first unit logic circuit ULG1($n$). Here, the drain of the P-type MOSFET TP13 is connected to the signal wire Ln3 and the control signal in is supplied to the gate thereof. Also, in FIG. 17, the drain of the N-type MOSFET TN7 and the source of the P-type MOSFET TP13 are connected to a signal wire Ln-Sel to which the detection method specifying signal SELFEN is supplied. Further, the detection method specifying signal SELFEN in the signal wire Ln-Sel is inverted in phase by the inverter IV and supplied to the gate of the P-type MOSFET TP14, and the detection method specifying signal SELFEN in the signal wire Ln-Sel is supplied to the gate of the N-type MOSFET TN13. The P-type MOSFET TP14 and the N-type MOSFET TN13 are connected to the node n1, that is, between the corresponding common electrode TL(n) and a signal wire Ln-S(n) and constitute a switch. The signal wire Ln-S(n) corresponds to an input/output terminal ST(n) of the semiconductor device for touch shown in FIG. 16 in a one-to-one manner.

The P-type MOSFET TP13 is turned on/off in synchronization with the N-type MOSFET TN7. Namely, when the N-type MOSFET TN7 is turned on, the P-type MOSFET TP13 is also turned on, and when the N-type MOSFET TN7 is turned off, the P-type MOSFET TP13 is also turned off. As is understood from the description of FIG. 11(B), the N-type MOSFET TN7 is turned on in the display period and when the corresponding common electrode TL(n) is specified as a non-selected common electrode. In conjunction with this, the P-type MOSFET TP13 is also turned on in the display period and when the corresponding common electrode TL(n) is specified as a non-selected common electrode. In the display period and when the mutual capacitance type is adopted, the detection method specifying signal SELFEN changes to the low level, and thus the low level is transmitted to the signal wire Ln3 and the signal wire /Ln3 is set to the high level by the inverter IV4. Thus, in the display period and when the mutual capacitance type is adopted, the third switch (TN3, TP3) is brought into conduction and the corresponding common electrode TL(n) is connected to the third voltage wire 607. Namely, in such periods, the third voltage VCOMDC2 is supplied to the corresponding common electrode TL(n) like in the first embodiment.

Meanwhile, when the detection method specifying signal SELFEN changes to the high level, the N-type MOSFET TN13 and the P-type MOSFET TP14 are turned on. Accordingly, the corresponding common electrode TL(n) and the terminal ST(n) of the semiconductor device for touch 7 are electrically connected. In this state, a drive signal S-In(n) whose voltage changes periodically is supplied from the drive signal forming unit 1602 shown in FIG. 16 to the input/output terminal ST(n). Accordingly, the voltage in the corresponding common electrode TL(n) changes and the voltage in the common electrode TL(n) changes depending on whether the neighborhood of the common electrode TL(n) is touched as described with reference to FIG. 15. The change of the voltage in the common electrode TL(n) is transmitted to the input/output terminal ST(n) via each of the N-type MOSFET TN13 and the P-type MOSFET TP14, amplified by the touch detection signal amplification unit 1601, and then subjected to A/D conversion by the A/D conversion unit 14. At this time, the detection method specifying signal SELFEN is at a high level, and thus the third switch (TN3, TP3) is turned off.

In FIG. 17, the signal wire Ln-Sel is shared by the first unit electrode drive circuits UCGW1(0) to UCGW1($p$) and the second unit electrode drive circuits UCGW2(0) to UCGW2($p$). On the other hand, the signal wires Ln-S(0) to Ln-S(p) correspond to the first unit electrode drive circuits UCGW1(0) to UCGW1($p$) and the second unit electrode drive circuits UCGW2(0) to UCGW2($p$) in a one-to-one manner. Namely, the signal wires Ln-S(0) to Ln-S(p) in the first unit electrode drive circuits UCGW1(0) to UCGW1($p$) are electrically separated from each other and are connected to the corresponding input/output terminals ST(0) to ST(p). Similarly, the signal wires Ln-S(0) to Ln-S(p) in the second unit electrode drive circuits UCGW2(0) to UCGW2($p$) are also electrically separated from each other and are connected to the corresponding input/output terminals ST(0) to ST(p).

FIGS. 19(A) to 19(G) are voltage waveform charts showing the operation of the liquid crystal display device 1 according to the third embodiment. In FIG. 19, touch detection periods THPM1 and THPM2 indicate voltage waveforms when the mutual capacitance type is adopted as the touch detection method, and a touch detection period THPS indicates voltage waveforms when the self-capacitance type is adopted as the touch detection method. Also, DISP indicates voltage waveforms in the display period.

Figure 19:
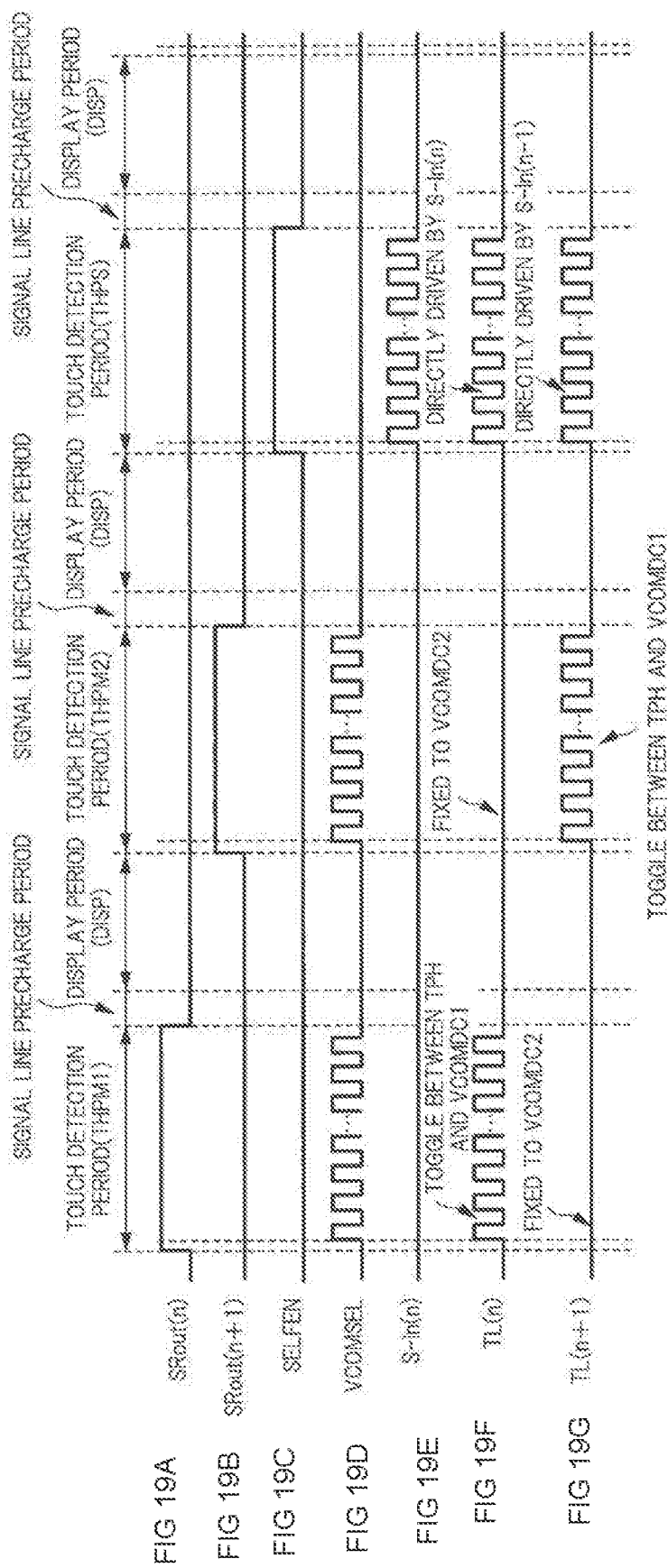
FIG. 19(A) to FIG. 19(G) are waveform charts showing operations of the first electrode drive circuit and the second electrode drive circuit according to the third embodiment.

As shown in FIG. 19(C), the mutual capacitance type is adopted when the detection method specifying signal SELFEN is set to the low level and the self-capacitance type is adopted when the signal is set to the high level. Since voltage waveforms when the detection method specifying signal SELFEN is set to the low level (FIGS. 19(A), 19(B), 19(D), 19(F) and 19(G)) are the same as the voltage waveforms shown in FIG. 12 (FIGS. 12(A), 12(B), 12(C), 12(D) and 12(E)), the description thereof is omitted. Here, the waveforms of FIGS. 12(A) and 12(B) correspond to those of FIGS. 19(A) and 19(B), the waveform of FIG. 12(C) corresponds to that of FIG. 19(D), and the waveforms of FIGS. 12(D) and 12(E) correspond to those of FIGS. 19(F) and 19(G). Since these voltage waveforms are the same also in the display period DISP between FIG. 12 and FIG. 19, the description thereof is omitted.

By changing the detection method specifying signal SELFEN to the high level as shown in FIG. 19(C), the touch detection method is switched from the mutual capacitance type to the self-capacitance type. By setting the detection method specifying signal SELFEN to the high level, the N-type MOSFET TN13 and the P-type MOSFET TP14 shown in FIG. 17 are turned on. At this time, the drive signal forming unit 1602 shown in FIG. 16 forms the drive signals S-In(0) to S-In(p) whose voltages change periodically and supplies them to the input/output terminals ST(0) to ST(p). The waveform of the drive signal S-In(n) is shown in FIG. 19(E) as an example.

The drive signals S-In(0) to S-In(p) supplied to the input/output terminals ST(0) to ST(p) are supplied to the corresponding common electrodes TL(0) to TL(p) via the N-type MOSFET TN13 and the P-type MOSFET TP14 in each of the first unit electrode drive circuits UCGW1(0) to UCGW1($p$) and the second unit electrode drive circuits UCGW2(0) to UCGW2($p$), and the voltage of each of the common electrodes TL(0) to TL(p) changes in accordance with voltage changes of the drive signals S-In(0) to S-In(p). The voltage changes of the common electrodes TL(n) and TL(n+1) are shown in FIGS. 19(F) and 19(G) as an example.

In accordance with voltage changes of the drive signals S-In(0) to S-In(p), voltage changes in the common electrodes TL(0) to TL(p) caused by touching the neighborhood of the common electrodes TL(0) to TL(p) are transmitted to the input/output terminals ST(0) to ST(p), amplified by the touch detection signal amplification unit 1601 as the detection signals SRx(0) to SRx(p), and then subjected to A/D conversion.

The example of using the common electrodes TL(0) to TL(p) as detection electrodes has been described above. Also in the case of using the detection electrodes RL(0) to RL(p), however, drive signals are similarly supplied and voltage changes in the detection electrodes RL(0) to RL(p)

are amplified as the detection signals SRx(0) to SRx(p). After the detection using the common electrodes TL(0) to TL(p) and the detection using the detection electrodes RL(0) to RL(p) are performed, coordinates of the touched position are extracted.

In this third embodiment, it is possible to switch the mutual capacitance type and the self-capacitance type to be adopted as the touch detection method.

Fourth Embodiment

Also in the liquid crystal display device 1 with a touch detection function according to the fourth embodiment, it is possible to select and adopt a desired touch detection method from a plurality of touch detection methods like in the third embodiment. Namely, the user can select the mutual capacitance type touch detection method or the self-capacitance type touch detection method and adopt the selected touch detection method.

Configuration of Liquid Crystal Display Device

The liquid crystal display device 1 according to the fourth embodiment is similar to the liquid crystal display device 1 according to the third embodiment. Here, the configuration of the liquid crystal display device according to the fourth embodiment will be described based on the configuration shown in FIG. 10. First, differences from the first to third embodiments will be described.

Also in the fourth embodiment, like in the first to third embodiments, the first electrode drive circuit CGW1 is constituted of the plurality of first unit electrode drive circuits UCGW1(0) to UCGW1(p). Further, the second electrode drive circuit CGW2 is similarly constituted of the plurality of second unit electrode drive circuits UCGW2(0) to UCGW2(p). Also, though not particularly limited, the first unit electrode drive circuits UCGW1(0) to UCGW1(p) and the second unit electrode drive circuits UCGW2(0) to UCGW2(p) have the same configuration in the fourth embodiment.

Figure 18:
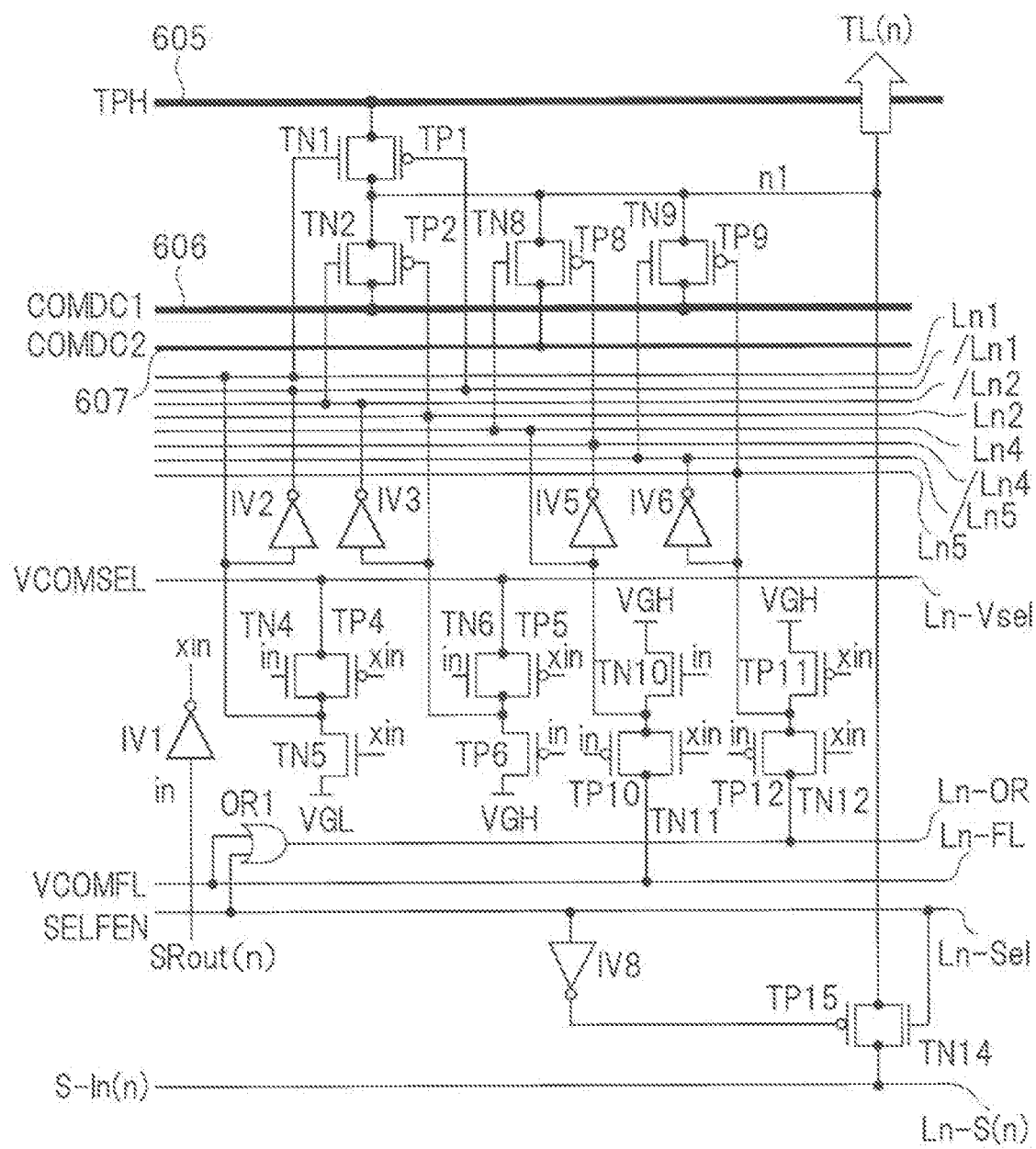
FIG. 18 is a circuit diagram showing a configuration of the first unit electrode drive circuit according to the fourth embodiment.

FIG. 18 shows the configuration of the first unit electrode drive circuit UCGW1(n) as a representative example of the first unit electrode drive circuits UCGW1(0) to UCGW1(p) and the second unit electrode drive circuits UCGW2(0) to UCGW2(p). Since the configuration shown in FIG. 18 is similar to the configuration shown in FIG. 13, only differences will be mainly described here. In the first unit electrode drive circuit UCGW1(n) shown in FIG. 18, the configuration of the stage USC1(n) of the shift register and the first unit switch circuit USW1(n) is the same as that in FIG. 13.

A circuit used when the self-capacitance type is adopted is added to the first unit logic circuit ULG1(n) compared with the first unit logic circuit ULG1(n) shown in FIG. 13. Namely, in FIG. 18, an inverter IV8, N-type MOSFET TN14 and P-type MOSFET TP15 are added to the first unit logic circuit ULG1(n).

Here, the gate of the N-type MOSFET TN14 is connected to the signal wire Ln-Sel and the gate of the P-type MOSFET TP15 is connected to the signal wire Ln-Sel via the inverter IV8. Like in the third embodiment, the detection method specifying signal SELFEN is supplied to the signal wire Ln-Sel. Thus, the detection method specifying signal SELFEN is supplied to the gate of the N-type MOSFET TN14 and the detection method specifying signal SELFEN whose phase is inverted by the inverter IV8 is supplied to the gate of the P-type MOSFET TP15. The P-type MOSFET TP15 and the N-type MOSFET TN14 are connected in parallel between the corresponding common electrode TL(n) and the corresponding signal wire Ln-S(n) to constitute a switch controlled by the detection method specifying signal SELFEN.

In FIG. 18, the drain of the N-type MOSFET TN12 and the source of the P-type MOSFET TP12 are connected to a signal wire Ln-OR unlike in FIG. 13. The output of a two-input OR circuit OR1 that receives the detection method specifying signal SELFEN and the control signal VCOMFL is supplied to the signal wire Ln-OR. For convenience of description, the OR circuit OR1 is shown in FIG. 18, but a control signal which is the output of the OR circuit OR1 is supplied commonly to each of the first unit electrode drive circuits UCGW1(0) to UCGW1(p) and the second unit electrode drive circuits UCGW2(0) to UCGW2(p). Thus, it should be understood that the OR circuit OR1 is included in the drive signal forming unit 1602 shown in FIG. 16.

The drive signal forming unit 1602 sets the control signal VCOMFL to the high level when the mutual capacitance type is specified as the touch detection method, and sets the control signal VCOMFL to the low level in the display period and when the self-capacitance type is specified as the touch detection method. Also, like in the third embodiment, the drive signal forming unit 1602 sets the detection method specifying signal SELFEN to the high level when the self-capacitance type is specified. When the detection method specifying signal SELFEN is regarded as a self-capacitance type enable signal, the control signal VCOMFL can be regarded as a mutual capacitance type enable signal. The OR circuit OR1 is set to the high level when the mutual capacitance type or the self-capacitance type is specified. In other words, an output signal of the OR circuit OR1 is set to the high level when touch detection is specified.

When the self-capacitance type is specified by the detection method specifying signal SELFEN, a switch (TN14, TP15) between the signal wire Ln-S(n) and the corresponding common electrode TL(n) is brought into conduction like in the third embodiment. Accordingly, the drive signal S-In(n) from the corresponding input/output terminal ST(n) shown in FIG. 16 is supplied to the corresponding common electrode TL(n). Also, voltage change caused by a touch of the corresponding common electrode TL(n) is transmitted to the corresponding input/output terminal ST(n) via the switch (TN14, TP15) and amplified as the detection signal SRx(n).

In FIG. 18, an output signal of the OR circuit OR1 is supplied to the drain of the N-type MOSFET TN12 and the source of the P-type MOSFET TP12 unlike in FIG. 13. Thus, in both of the case where the self-capacitance type is specified as the detection method and the case where the mutual capacitance type is specified as the detection method, the fifth switch (TN9, TP9) is turned off when the MOSFETs TN12 and TP12 are turned on. On the other hand, when the touch detection is not specified, the output signal of the OR circuit OR1 is set to the low level. Accordingly, in the period when the touch detection is not specified, that is, in the display period, the fifth switch (TN9, TP9) is turned on and the second voltage wire 606 having a large line width is connected to the common electrode.

Figure 20:
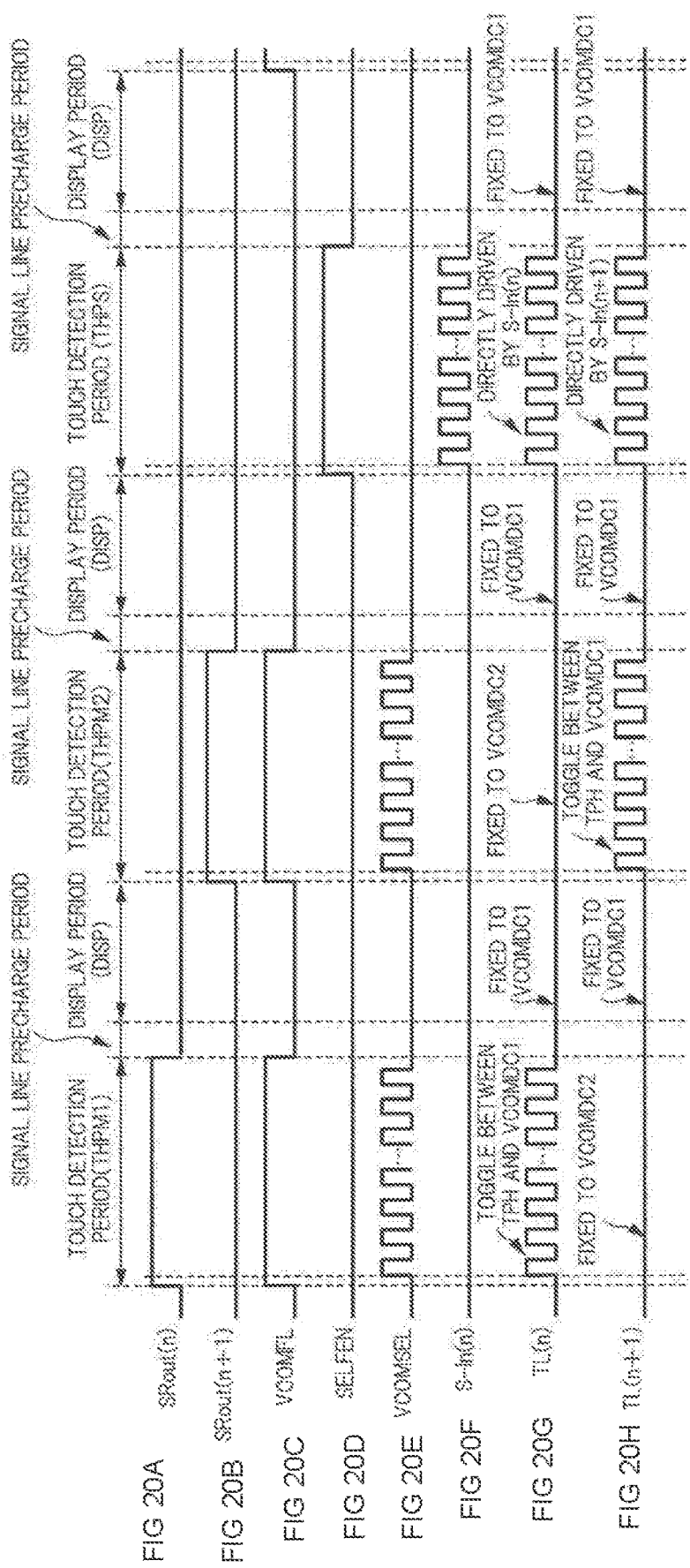
FIG. 20(A) to FIG. 20(H) are waveform charts showing operations of the first electrode drive circuit and the second electrode drive circuit according to the fourth embodiment.

Next, the operation of the liquid crystal display device 1 according to the fourth embodiment will be described with reference to FIGS. 20(A) to 20(H). In FIG. 20, the touch detection periods THPM1 and THPM2 indicate waveforms when the mutual capacitance type is adopted as the touch detection method, and the touch detection period THPS indicates waveforms when the self-capacitance type is adopted as the touch detection method. Also, DISP indicates waveforms in the display period.

As shown in FIG. 20(D), when the detection method specifying signal SELFEN is set to the low level, the mutual capacitance type is adopted, and when the signal is set to the high level, the self-capacitance type is adopted. Also, as shown in FIG. 20(C), the control signal VCOMFL is set to the high level in the touch detection periods THPM1 and THPM2 when the mutual capacitance type is adopted. Since the waveform when the detection method specifying signal SELFEN is set to the low level is the same as that shown in FIG. 14, the description thereof is omitted here. Note that the waveforms of FIGS. 14(A), 14(B) and 14(C) correspond to those of FIGS. 20(A), 20(B) and 20(C), the waveform of FIG. 14(D) corresponds to that of FIG. 20(E), and the waveforms of FIGS. 14(E) and 14(F) correspond to those of FIGS. 20(G) and 20(H). Since these voltage waveforms are the same also in the display period DISP between FIG. 14 and FIG. 20, the description thereof is omitted.

As shown in FIG. 20(D), by changing the detection method specifying signal SELFEN to the high level, the touch detection method is switched from the mutual capacitance type to the self-capacitance type. Namely, the N-type MOSFET TN14 and the P-type MOSFET TP15 shown in FIG. 18 are turned on. At this time, the drive signal forming unit 1602 shown in FIG. 16 forms the drive signals S-In(0) to S-In(p) whose voltages change periodically, and supplies them to the input/output terminals ST(0) to ST(p). The waveform of the drive signal S-In(n) is shown in FIG. 20(F) as an example.

The drive signals S-In(0) to S-In(p) supplied to the input/output terminals ST(0) to ST(p) via the N-type MOSFET TN14 and the P-type MOSFET TP15 in each of the first unit electrode drive circuits UCGW1(0) to UCGW1(p) and the second unit electrode drive circuits UCGW2(0) to UCGW2(p), and the voltage of each of the common electrodes TL(0) to TL(p) changes in accordance with voltage changes of the drive signals S-In(0) to S-In(p). The voltage changes of the common electrodes TL(n) and TL(n+1) are shown in FIGS. 20(G) and 20(H) as an example.

In accordance with voltage changes of the drive signals S-In(0) to S-In(p), voltage changes in the common electrodes TL(0) to TL(p) caused by touching the neighborhood of the common electrodes TL(0) to TL(p) are transmitted to the input/output terminals ST(0) to ST(p), amplified by the touch detection signal amplification unit 1601 as the detection signals SRx(0) to SRx(p), and then subjected to A/D conversion.

The example of using the common electrodes TL(0) to TL(p) as detection electrodes has been described above. Also in the case of using the detection electrodes RL(0) to RL(p), however, drive signals are similarly supplied and voltage changes in the detection electrodes RL(0) to RL(p) are amplified as the detection signals SRx(0) to SRx(p). After the detection using the common electrodes TL(0) to TL(p) and the detection using the detection electrodes RL(0) to RL(p) are performed, coordinates of the touched position are extracted.

In this fourth embodiment, it is possible to switch the mutual capacitance type and the self-capacitance type to be adopted as the touch detection method.

FIRST MODIFICATION EXAMPLE

In the fourth embodiment described with reference to FIG. 18, the first unit electrode drive circuit UCGW1(n) shown in FIG. 18 is used for each of the first unit electrode drive circuits UCGW1(0) to UCGW1(p) and the second unit electrode drive circuits UCGW2(0) to UCGW2(p) shown in FIG. 10. In the first modification example, the first unit electrode drive circuit UCGW1(n) shown in FIG. 17 is used for each of the first unit electrode drive circuits UCGW1(0) to UCGW1(p) shown in FIG. 10, and the first unit electrode drive circuit UCGW1(n) shown in FIG. 18 is used for each of the second unit electrode drive circuits UCGW2(0) to UCGW2(p) shown in FIG. 10.

SECOND MODIFICATION EXAMPLE

In the second modification example, the first unit electrode drive circuit UCGW1(n) shown in FIG. 18 is used for each of the first unit electrode drive circuits UCGW1(0) to UCGW1(p) shown in FIG. 10, and the first unit electrode drive circuit UCGW1(n) shown in FIG. 17 is used for each of the second unit electrode drive circuits UCGW2(0) to UCGW2(p) shown in FIG. 10.

THIRD MODIFICATION EXAMPLE

In the third modification example, the first unit electrode drive circuit UCGW1(n) shown in FIG. 18 is used for each of the second unit electrode drive circuits UCGW2(0) to UCGW2(p) shown in FIG. 10, and the first unit electrode drive circuit UCGW1(n) shown in FIG. 11 or 13 is used for each of the first unit electrode drive circuits UCGW1(0) to UCGW1(p) shown in FIG. 10.

FOURTH MODIFICATION EXAMPLE

In the fourth modification example, the first unit electrode drive circuit UCGW1(n) shown in FIG. 18 is used for each of the first unit electrode drive circuits UCGW1(0) to UCGW1(p) shown in FIG. 10, and the first unit electrode drive circuit UCGW1(n) shown in FIG. 11 or 13 is used for each of the second unit electrode drive circuits UCGW2(0) to UCGW2(p) shown in FIG. 10.

According to the fourth embodiment and the first to fourth modification examples, the third voltage VCOMDC2 supplied to a non-selected common electrode in the touch detection period is fed from the third voltage wire 607 having a small line width. Accordingly, when described with reference to FIG. 6, the increase in the width of the edge frame on the upper side and/or the lower side in FIG. 6 can be suppressed.

Naturally, in the third modification example, the first unit electrode drive circuit UCGW1(n) shown in FIG. 17 may be used instead of the first unit electrode drive circuit UCGW1(n) shown in FIG. 18. Further, in the fourth modification example, the first unit electrode drive circuit UCGW1(n) shown in FIG. 17 may be used instead of the first unit electrode drive circuit UCGW1(n) shown in FIG. 18.

Fifth Embodiment

In the fifth embodiment, when described with respect to the liquid crystal display device 1 shown in FIG. 10, the first unit electrode drive circuits UCGW1(0) to UCGW1(p) and the second unit electrode drive circuits UCGW2(0) to UCGW2(p) have different configurations. Also in the fifth embodiment, the user can select and adopt the self-capacitance type touch detection method or the mutual capacitance type touch detection method.

Configuration of Liquid Crystal Display Device

Figure 23:
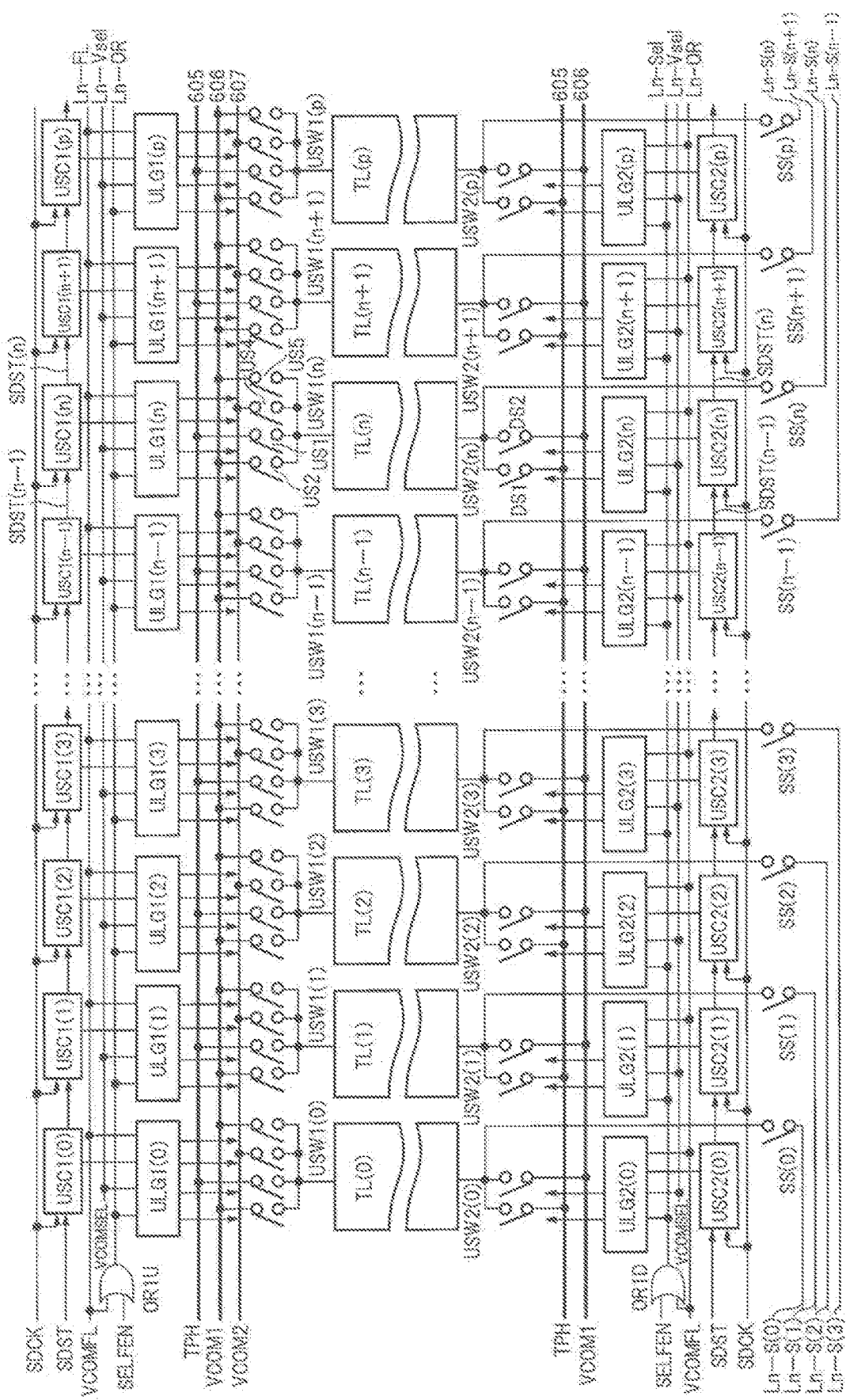
FIG. 23 is a block diagram showing a configuration of the liquid crystal display device according to the fifth embodiment.

FIG. 23 is a block diagram showing the configuration of the liquid crystal display device according to the fifth embodiment. In FIG. 23, TL(0) to TL(p) denote common electrodes. USC1(0) to USC1(p) denote stages of a shift register, ULG1(0) to ULG1(p) denote first unit logic circuits, and USW1(0) to USW1(p) denote first unit switch circuits. Like those described in the first to fourth embodiments, each stage USC1(i), each first unit logic circuit ULG1(i), each first unit switch circuit USW1(i) and each common electrode TL(i) correspond to each other in a one-to-one manner (i=0 to p). Though not explicitly shown in FIG. 23 in order to prevent the drawing from being complicated, the stage USC1(i), the first unit logic circuit ULG1(i) and the first unit switch circuit USW1(i) corresponding to each other constitute the first unit electrode drive circuit UCGW1(i) for the corresponding common electrode TL(i) and the plurality of first unit electrode drive circuits UCGW1(0) to UCGW1(p) constitute the first electrode drive circuit CGW1.

Similarly, USC2(0) to USC2(p) denote stages of a shift register, ULG2(0) to ULG2(p) denote second unit logic circuits, and USW2(0) to USW2(p) denote second unit switch circuits. Each stage USC2(i), each second unit logic circuit ULG2(i), each second unit switch circuit USW2(i) and each common electrode TL(i) correspond to each other in a one-to-one manner (i=0 to p). Though not explicitly shown in FIG. 23, the stage USC2(i), the second unit logic circuit ULG2(i) and the second unit switch circuit USW2(i) corresponding to each other constitute the second unit electrode drive circuit UCGW2(i) for the corresponding common electrode TL(i) and the plurality of second unit electrode drive circuits UCGW2(0) to UCGW2(p) constitute the second electrode drive circuit CGW2.

In the fifth embodiment, the first unit electrode drive circuits UCGW1(0) to UCGW1(p) have the same configuration and the second unit electrode drive circuits UCGW2(0) to UCGW2(p) also have the same configuration. However, it should be noted that the configuration of the first unit electrode drive circuits UCGW1(0) to UCGW1(p) and that of the second unit electrode drive circuits UCGW2(0) to UCGW2(p) are different from each other.

In FIG. 23, each of OR1U and OR1D denotes a two-input OR circuit having the control signal VCOMFL and the detection method specifying signal SELFEN as inputs. The OR circuit OR1U corresponds to the first electrode drive circuit CGW1 and the OR circuit OR1D corresponds to the second electrode drive circuit CGW2. These OR circuits OR1U and OR1D correspond to the OR circuit OR1 shown in FIG. 18 and are at a high level when touch detection is specified. Although OR circuits corresponding to the first and second electrode drive circuits CGW1 and CGW2 are provided in FIG. 23, the control signals supplied to the signal wire Ln-OR may of course be formed by one OR circuit.

In FIG. 23, SS(0) to SS(p) denote switches connected between the signal wires Ln-S(0) to Ln-S(p) and the common electrodes TL(0) to TL(n). Each of the switches SS(0) to SS(p) is depicted independently of the second electrode drive circuit CGW2 in FIG. 23 to make the drawing easier to view, but each of the switches SS(0) to SS(p) is provided in the corresponding second unit electrode drive circuits UCGW2(0) to UCGW2(p) in the second electrode drive circuit CGW2. Namely, each of the switches SS(0) to SS(p) is provided in the corresponding second unit logic circuits ULG2(0) to ULG2(p) in the second unit electrode drive circuits UCGW2(0) to UCGW2(p).

Though omitted in FIG. 23, the switches SS(0) to SS(p) are controlled by the second unit logic circuits UCGW2(0) to UCGW2(p) having these switches SS(0) to SS(p). Note that the signal wires Ln-S(0) to Ln-S(p) are connected to the input/output terminals ST(0) to ST(p) shown in FIG. 16.

Further, though omitted in FIG. 23, the detection electrodes RL(0) to RL(p) and the scanning lines GL(0) to GL(p) are arranged so as to intersect with the common electrodes TL(0) to TL(p).

Next, the first electrode drive circuit CGW1 and the second electrode drive circuit CGW2 will be described. Since the first unit electrode drive circuits UCGW1(0) to UCGW1(p) constituting the first electrode drive circuit CGW1 have the same configuration, the first unit electrode drive circuit UCGW1(n) will be described as a representative example. Similarly, since the second unit electrode drive circuits UCGW2(0) to UCGW2(p) constituting the second electrode drive circuit CGW2 have the same configuration, the second unit electrode drive circuit UCGW2(n) will be described as a representative example.

Configuration of First Unit Electrode Drive Circuit

Figure 21:
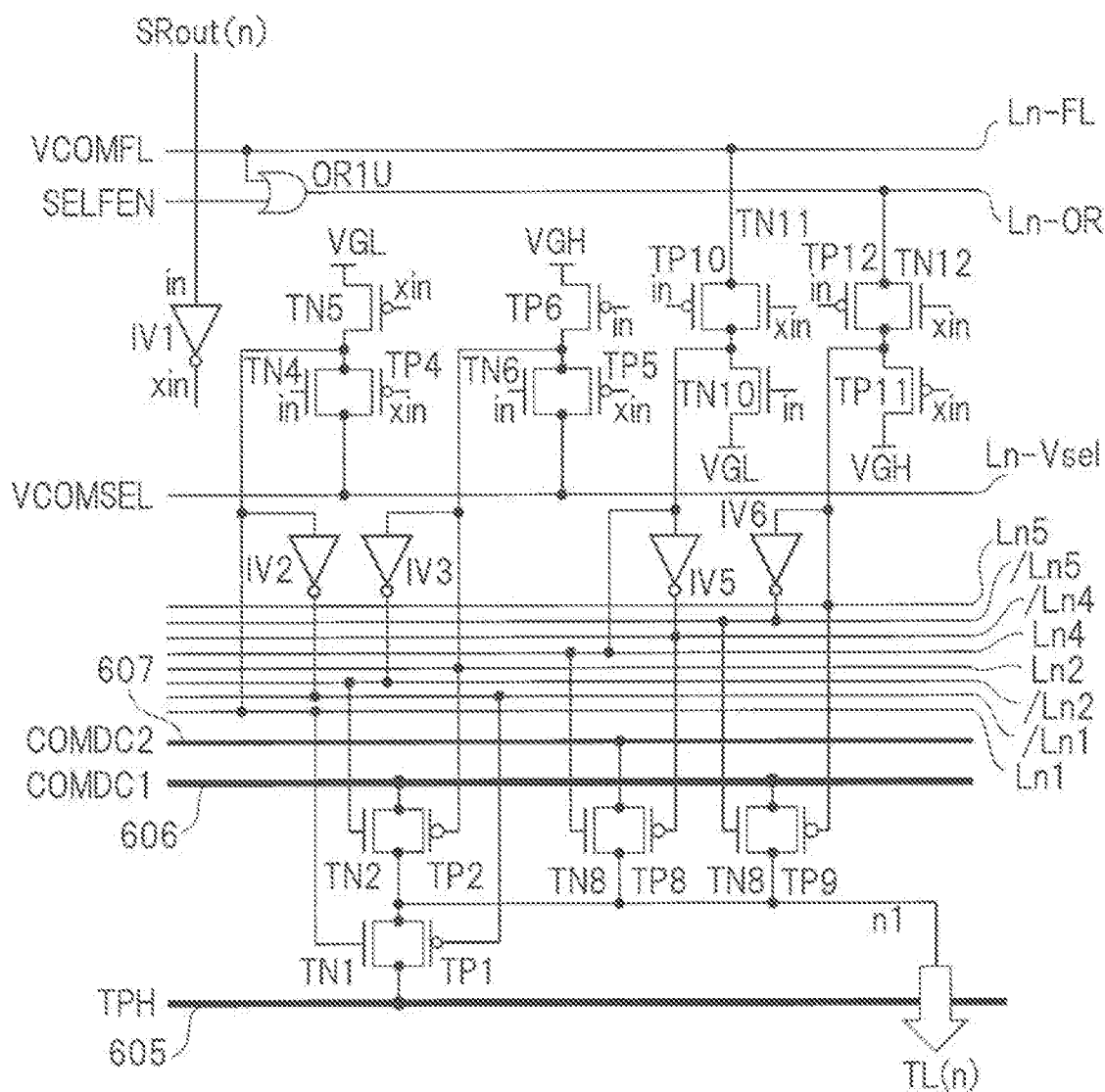
FIG. 21 is a circuit diagram showing a configuration of the first unit electrode drive circuit according to the fifth embodiment.

FIG. 21 is a circuit diagram showing the configuration of the first unit electrode drive circuit UCGW1(n) according to the fifth embodiment. For convenience of description, the OR circuit OR1U shown in FIG. 23 is also shown in FIG. 21.

The first unit electrode drive circuit UCGW1(n) shown in FIG. 21 is similar to the first unit electrode drive circuit UCGW1(n) shown in FIGS. 13 and 18. The difference therebetween is that the first unit electrode drive circuit UCGW1(n) shown in FIG. 21 does not include the N-type MOSFET TN14, the P-type MOSFET TP15, the inverter IV8 and the signal wire Ln-Sel compared with the first unit electrode drive circuit UCGW1(n) shown in FIG. 18.

Namely, like those described with reference to FIGS. 13 and 18, in the first unit electrode drive circuit UCGW1(n) shown in FIG. 21, the first unit switch circuit USW1(n) includes the N-type MOSFETs TN1, TN2, TN8 and TN9 and the P-type MOSFETs TP1, TP2, TP8 and TP9. Also, the first unit logic circuit ULG1(n) includes the inverter circuits IV1 to IV3, IV5 and IV6, the N-type MOSFETs TN4 to TN6 and TN10 to TN12, and the P-type MOSFETs TP4 to TP6 and TP10 to TP12.

Here, the first switch (TN1, TP1) is constituted of the N-type MOSFET TN1 and the P-type MOSFET TP1, the second switch (TN2, TP2) is constituted of the N-type MOSFET TN2 and the P-type MOSFET TP2, the fourth switch (TN8, TP8) is constituted of the N-type MOSFET TN8 and the P-type MOSFET TP8, and the fifth switch (TN9, TP9) is constituted of the N-type MOSFET TN9 and the P-type MOSFET TP9. In FIG. 23, the first switch (TN1, TP1) is denoted as US1, the second switch (TN2, TP2) is denoted as US2, the fourth switch (TN8, TP8) is denoted as US4, and the fifth switch (TN9, TP9) is denoted as US5.

As shown in FIGS. 21 and 23, the first switch (TN1, TP1) US1 is connected between the corresponding common electrode TL(n) and the first voltage wire 605 and the second switch (TN2, TP2) US2 is connected between the common electrode TL(n) and the second voltage wire 606. Also, the fourth switch (TN8, TP8) US4 is connected between the common electrode TL(n) and the third voltage wire 607 and the fifth switch (TN9, TP9) US5 is connected between the common electrode TL(n) and the second voltage wire 606. Here, the line width of the third voltage wire 607 is made smaller than that of the first voltage wire 605 or the second voltage wire 606. Also in FIGS. 21 and 23, the third voltage wire 607 is depicted with a thinner line so as to clarify the difference in line width.

When the output signal SRout(n) from the stage USC1(0) of the corresponding shift register is the logical value "1" specifying the common electrode TL(n) as a selected common electrode, the P-type MOSFETs TP4 and TP5 and the N-type MOSFETs TN4 and TN6 are turned on. The drive signal VCOMSEL whose voltage changes periodically is transmitted to the signal wires Ln1 and Ln2 via these MOSFETs. Also, the drive signal inverted with respect to the voltage changes in the signal wires Ln1 and Ln2 is supplied to the signal wires/Ln1 and /Ln2 by the inverters IV2 and IV3. Accordingly, when the drive signal VCOMSEL is at a high level, the first switch (TN1, TP1) US1 is turned on and electrically connects the first voltage wire 605 and the corresponding common electrode TL(n). On the other hand, when the drive signal VCOMSEL is at a low level, the second switch (TN2, TP2) US2 is turned on and electrically connects the second voltage wire 606 and the corresponding common electrode TL(n). Accordingly, like in the configurations in FIGS. 13 and 18, the first voltage TPH and the second voltage VCOMDC1 are supplied to the common electrode TL(n) in synchronization with the period of the drive signal VCOMSEL.

On the other hand, when the output signal SRout(n) from the stage USC1(n) of the corresponding shift register is the logical value "0" specifying the common electrode TL(n) as a non-selected common electrode in the touch detection period, the N-type MOSFET TN11 and the P-type MOSFET TP10 are turned on. Since it is in the touch detection period, the control signal VCOMFL is at the high level. Thus, the control signal VCOMFL at a high level is transmitted to the signal wire Ln4 via the N-type MOSFET TN11 and the P-type MOSFET TP10 that are turned on. Also, the signal in the signal wire Ln4 is inverted by the inverter IV5 and supplied to the signal wire /Ln4. The fourth switch (TN8, TP8) US4 is turned on by the signal wires Ln4 and /Ln4 at this time. Thus, when the common electrode TL(n) is specified as a non-selected common electrode, the common electrode TL(n) is electrically connected to the third voltage wire 607 like in FIGS. 13 and 18.

Further, in the display period, the logical value of the output signal SRout(n) from the stage USC1(0) of the corresponding shift register is set to "0" (low level). Accordingly, the N-type MOSFET TN12 and the P-type MO SFET TP12 are turned on. Since each of the control signal VCOMFL and the detection method specifying signal SELFEN is set to the low level in the display period, the voltage of the signal wire Ln-FL is at a low level. The low level is transmitted to the signal wire Ln5 via the N-type MOSFET TN12 and the P-type MOSFET TP12 that are turned on. Also, the voltage of the signal wire Ln5 is inverted by the inverter IV6 and transmitted to the signal wire /Ln5. Accordingly, the fifth switch (TN9, TP9) US5 is turned on and the second voltage wire 606 is connected to the common electrode TL(n).

Note that the P-type MOSFET TP12 and the N-type MOSFET TN12 are turned on also when the output signal SRout(n) has the logical value "0" in the touch detection period, but since the voltage of the signal wire Ln-OR at this time is set to the high level by the OR circuit OR1U, the fifth switch (TN9, TP9) US5 is not turned on.

Here, the stages USC1(0) to USC1(p) and USC2(0) to USC2(p) of the shift registers will be described with using the stages USC1(n) and USC2(n) as an example. As shown in FIG. 23, the clock signal SDCK is supplied to each of the stages USC1(0) to USC1(p) and USC2(0) to USC2(p) and the selection signal is supplied to each stage from the previous stage thereof. When the voltage of the clock signal SDCK changes, each stage fetches and stores the selection signal from the previous stage thereof and then outputs the output signals SRout(0) to SRout(p) in accordance with the logical value of the fetched selection signal to the corresponding first and second unit logic circuits. When described with respect to the stages USC1(n) and USC2(n), the stages USC1(n) and USC2(n) fetch and store the selection signal SDST(n-1) from the stages USC1(n-1) and USC2(n-1) serving as previous stages thereof. Then, the stages USC1(n) and USC2(n) output the output signal SRout(n) of the voltage in accordance with the logical value "1" or "0" of the fetched selection signal SDST(n-1) to the first and second unit logic circuits ULG1(n) and ULG2(n). Further, the stages USC1(n) and USC2(n) output the logical value of the fetched selection signal SDST(n-1) as the selection signal SDST(n).

The selection signal SDST is set to the initial stages USC1(0) and USC2(0) of the shift registers by the semiconductor device for touch 7. For example, the selection signal SDST of the logical value "1" is set once, and then the selection signal SDST of the logical value "0" is set while changing the clock signal SDCK. Accordingly, the selection signal SDST of the logical value "1" specifying the selected common electrode moves in the shift register. Namely, in the example of FIG. 23, the logical value "1" moves from the stages USC1(0) and USC2(0) on the left side toward the stages USC1(p) and USC2(p) on the right side.

Accordingly, when the mutual capacitance type touch detection method is adopted, the common electrodes TL(0) to TL(p) are sequentially specified in this order as the selected common electrode. When specified as a selected common electrode, as described with reference to FIG. 21, the selected common electrode is connected to the first voltage wire 605 or the second voltage wire 606 in accordance with voltage change of the drive signal VCOMSEL, so that the first voltage TPH and the second voltage VCOMDC1 are alternately supplied thereto.

On the other hand, as described with reference to FIG. 21, the common electrode specified as a non-selected common electrode in the touch detection period is connected to the third voltage wire 607, so that the third voltage VCOMDC2 is supplied thereto. In this case, the third voltage VCOMDC2 supplied to the common electrode specified as a non-selected common electrode does not have to discharge the capacitance at high speed like in the touch detection and only needs to be able to fix the voltage of the non-selected common electrode so as to prevent the occurrence of noise. Thus, the third voltage wire 607 that transmits the third voltage VCOMDC2 has a small line width.

Note that the common electrodes TL(0) to TL(p) are connected to the second voltage wire 606 in the display period. Accordingly, the common electrodes TL(0) to TL(p) are used as the voltage of liquid crystal elements for display in the display period.

Configuration of Second Unit Electrode Drive Circuit

Figure 22:
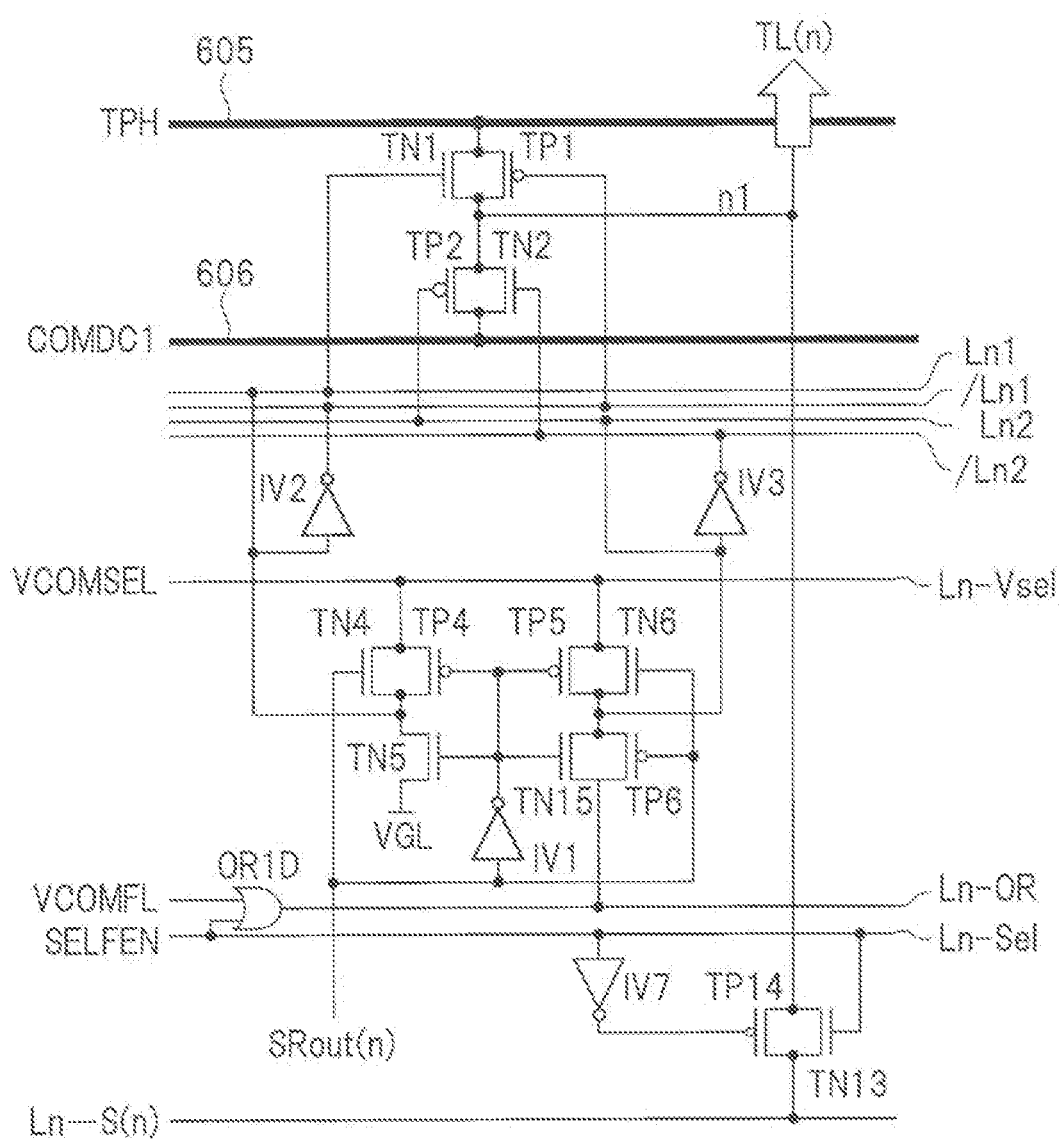
FIG. 22 is a circuit diagram showing a configuration of the second unit electrode drive circuit according to the fifth embodiment.

FIG. 22 is a circuit diagram showing the configuration of the second unit electrode drive circuit UCGW2(n) according to the fifth embodiment. For convenience of description, the OR circuit OR1D shown in FIG. 23 is depicted also in FIG. 22.

The second unit electrode drive circuit UCGW2(n) shown in FIG. 22 is similar to the first unit electrode drive circuit UCGW1(n) shown in FIGS. 11 and 17. The difference therebetween is that the second unit electrode drive circuit UCGW2(n) shown in FIG. 22 does not include the N-type MOSFETs TN3 and TN7, the P-type MOSFETs TP3, TP7 and TP13, the inverter circuit IV4, the signal wires Ln3, /Ln3, Ln4 and /Ln4, and the third voltage wire 607 compared with the first unit electrode drive circuit UCGW1(n) shown in FIG. 17. Also, the signal wire Ln-OR and N-type MOSFET TN15 to which the output of the OR circuit OR1D is supplied are added to the second unit electrode drive circuit UCGW2(n) shown in FIG. 22.

More specifically, like those described with reference to FIGS. 11 and 17, in the second unit electrode drive circuit UCGW2(n) shown in FIG. 22, the first unit switch circuit USW2(n) includes the N-type MOSFETs TN1 and TN2 and the P-type MOSFETs TP1 and TP2. Also, the first unit logic circuit ULG2(n) includes the inverter circuits IV1 to IV3 and IV7, the N-type MOSFETs TN4 to TN6 and TN13, and the P-type MOSFETs TP4 to TP6 and TP14. Since the arrangement of the inverter circuits IV1 to IV3 and IV7, the N-type MOSFETs TN4 to TN6 and TN13 and the P-type MOSFETs TP4 to TP6 and TP14 shown in FIG. 22 is different from the arrangement of these elements shown in FIG. 17, these arrangements seem to be different circuit configurations, but connections of these elements are the same between FIG. 22 and FIG. 18 except that the N-type MOSFET TN15 is added and the connection destination of the drain of the P-type MOSFET TP6 is changed.

The gate of the N-type MOSFET TN15 added to FIG. 18 is connected to the output of the inverter IV1 (signal xin in FIG. 18), the source thereof is connected to the signal wire Ln-OR, and the drain thereof is connected to the signal wire Ln2. Also, in FIG. 22, the drain of the P-type MOSFET TP6 is connected to the signal wire Ln-OR.

Here, the N-type MOSFET TN1 and the P-type MOSFET TP1 constitute the first switch (TN1, TP1) and the N-type MOSFET TN2 and the P-type MOSFET TP2 constitute the second switch (TN2, TP2). In FIG. 23, the first switch (TN1, TP1) is denoted as DS1 and the second switch (TN2, TP2) is denoted as DS2.

When the mutual capacitance type is specified as the touch detection method and the touch detection period comes, the detection method specifying signal SELFEN at a low level is supplied to the signal wire Ln-Sel and a high-level control signal is supplied to the signal wire Ln-OR from the OR circuit OR1D.

When the output signal SRout(n) of the logical value "1" specifying the corresponding common electrode TL(n) as a selected common electrode is output from the stage USC2(n) of the shift register in the touch detection period, the N-type MOSFETs TN4 and TN6 and the P-type MOSFETs TP4 and TP5 are turned on.

In the touch detection period, the drive signal VCOMSEL whose voltage changes periodically is transmitted to the signal wire Ln1 via the N-type MOSFET TN4 and the P-type MOSFET TP4 that are turned on. Also, the signal in the signal wire Ln1 is inverted by the inserter IV2 and transmitted to the signal wire /Ln1. Further, the drive signal VCOMSEL is transmitted to the signal wire Ln2 via the N-type MOSFET TN6 and the P-type MOSFET TP5 that are turned on. In addition, the signal in the signal wire Ln2 is inverted by the inserter IV3 and transmitted to the signal wire /Ln2.

The first switch (TN1, TP1) DS1 is turned on/off by the voltages of the signal wires Ln1 and /Ln1. In this case, the first switch (TN1, TP1) DS1 is turned on when the signal wire Ln1 is at a high level and the signal wire /Ln1 is at a low level. Namely, when the drive signal VCOMDC is at a high level, the first switch (TN1, TP1) DS1 is turned on and electrically connects the first voltage wire 605 to the corresponding common electrode TL(n). On the other hand, the second switch (TN2, TP2) DS2 is turned on/off by the voltages of the signal wires /Ln2 and Ln2. In this case, the second switch (TN2, TP2) DS2 is turned on when the signal wire /Ln2 is at a high level and the signal wire Ln2 is at a low level. More specifically, when the drive signal VCOMDC is at a low level, the second switch (TN2, TP2) DS2 is turned on and electrically connects the second voltage wire 606 to the corresponding common electrode TL(n).

On the other hand, when the output signal SRout(n) of the logical value "0" specifying the corresponding common electrode TL(n) as a non-selected common electrode is output from the stage USC2(n) of the shift register in the touch detection period, the N-type MOSFETs TN5 and TN15 and the P-type MOSFET TP6 are turned on. Accordingly, the voltage VGL at a low level is supplied to the signal wire Ln1 via the N-type MOSFET TN5 that is turned on and a high level is supplied to the signal wire /Ln1 by the inverter IV2. Also, a high level in the signal wire Ln-OR is transmitted to the signal wire Ln2 via the P-type MOSFET TP6 and the N-type MOSFET TN15 that are turned on. At this time, a low level is supplied to the signal wire /Ln2 by the inverter IV3. Accordingly, each of the first switch (TN1, TP1) DS1 and the second switch (TN2, TP2) is turned off.

Namely, in the fifth embodiment, when the mutual capacitance type touch detection method is specified, one end of the selected common electrode TL(n) is connected to the first voltage wire 605 or the second voltage wire 606 in the first electrode drive circuit UCGW1 and the other end of the selected common electrode TL(n) is connected to the first voltage wire 605 or the second voltage wire 606 in the second electrode drive circuit UCGW2. Meanwhile, the non-selected common electrode TL(n) is connected to the third voltage wire 607 only at one end thereof in the first electrode drive circuit UCGW1. In this manner, the number of elements and voltage wires constituting the second electrode drive circuit CGW2 arranged on the side of the semiconductor device for driver DDIC can be reduced and the size reduction can be achieved. When described with respect to FIG. 6, the width of the edge frame on the lower side can be reduced. Further, since the third voltage wire 607 feeding the third voltage to a non-selected common electrode has a small line width, the increase in the width of the edge frame on the upper side can be suppressed in the example of FIG. 6.

Also, since the output signal of the OR circuit OR1D changes to the low level and the output signal SRout(n) output from the stage USC2(n) changes to the low level in the display period, the N-type MOSFET TN15 and the P-type MOSFET TP6 are turned on, the low level in the signal wire Ln-OR is transmitted to the signal wire Ln2 via the N-type MOSFET TN15 and the P-type MOSFET TP6, and a high level is supplied to the signal wire /Ln2 by the inverter IV3. Accordingly, in the display period, the second switch (TN2, TP2) DS2 is turned on and the corresponding common electrode TL(n) is connected to the second voltage wire 606. Namely, in the display period, one ends of the common electrodes TL(0) to TL(p) are connected to the second voltage wire 606 in the first electrode drive circuit CGW1 and the other ends thereof are connected to the second voltage wire 606 in the second electrode drive circuit CGW2. Accordingly, in the display period, the variation of the voltage supplied to the liquid crystal element LC can be suppressed.

When the self-capacitance type is specified, the detection method specifying signal SELFEN at a high level is supplied to the signal wire Ln-Sel. Accordingly, the N-type MOSFET TN13 and the P-type MOSFET TP14 are turned on. Thus, the signal wire Ln-S(n) and the corresponding common electrode TL(n) are electrically connected via the N-type MOSFET TN13 and the P-type MOSFET TP14 that are turned on. In the touch detection period for which the self-capacitance type is specified, the drive signals S-In(0) to S-In(p) from the drive signal forming unit 1602 shown in FIG. 16 are supplied to the second electrode drive circuit CGW2. When described with respect to the drive signal S-In(n), the drive signal S-In(n) is supplied to the corresponding common electrode TL(n) via the N-type MOSFET TN13 and the P-type MOSFET TP14 in the second unit electrode drive circuit UCGW2 in the second electrode drive circuit CGW2. The voltage change in the common electrode TL(n) depending on whether the neighborhood of the common electrode TL(n) is touched is transmitted to the input/output terminal ST(n) shown in FIG. 16 via the N-type MOSFET TN13 and the P-type MOSFET TP14 in the second unit electrode drive circuit UCGW2 and amplified by the touch detection signal amplification unit 1601 as the detection signal SRx(n).

The first to third voltage wires supplying the first to third voltages to the first electrode drive circuit CGW1 can be regarded as a first voltage wire, a third voltage wire and a fifth voltage wire, respectively. In this case, the first and second voltage wires supplying the first and second voltages to the second electrode drive circuit CGW2 can be regarded as a second voltage wire and a fourth voltage wire, respectively. In addition, when the switches DS1 and DS2 are turned off in each of the second unit electrode drive circuits UCG2(0) to UCG2(p) constituting the second electrode drive circuit CGW2, the second electrode drive circuit CGW2 can be regarded as being in a high impedance state.

In the first to fifth embodiments, the first unit logic circuit ULG1(n) can be regarded as a first control circuit that controls a plurality of switches constituting the first unit switch circuit USW1(n) in the first unit electrode drive circuit UCGWL1(n). In this case, similarly, the second unit logic circuit ULG2(n) can be regarded as a second control circuit that controls a plurality of switches constituting the second unit switch circuit USW2(n) in the second unit electrode drive circuit UCGWL2(n).

When the fifth embodiment is considered, for example, the first switch US1, the second switch US2, the fourth switch US4 and the fifth switch US5 are controlled by the first control circuit so as to be alternatively brought into conduction. Here, since the second voltage VCOMDC1 and the third voltage VCOMDC2 are the same voltage, if the fourth switch US4 and the fifth switch US5 are regarded together as the third switch, the first to third switches can be regarded as being controlled by the first control circuit so as to be alternatively brought into conduction. On the other hand, if the first switch DS1 and the second switch DS2 are regarded as the fourth switch and the fifth switch, respectively, the second control circuit performs the control so as to prevent the state in which the fourth switch (DS1) and the fifth switch (DS2) are simultaneously turned on, and further performs the control so that the state in which they are both turned off (non-conduction) arises.

In the range of an idea of the present invention, a person skilled in the art can conceive various modifications and alterations and it should be understood that such modifications and alterations belong to the scope of the present invention.

For example, embodiments obtained by the addition, deletion or design change of elements or the addition, omission or condition change of steps made for each of the above-described embodiments by a person skilled in the art are included in the scope of the present invention as long as they include the gist of the present invention.

In the embodiments, for example, the case in which the common electrodes TL(0) to TL(p) and the signal lines SL(0) to SL(p) extend in the column direction and are arranged in the row direction has been described, but the row direction and the column direction change depending on the viewpoint. Specifically, the case in which the viewpoint is changed and the common electrodes TL(0) to TL(p) and the signal lines SL(0) to SL(p) extend in the row direction and are arranged in the column direction is also included in the scope of the present invention.

Further, in the third to fifth embodiments, for example, MOSFETs provided in advance for use to perform the liquid crystal display may be utilized as the N-type MOSFETs TN13 and TN14 and the P-type MOSFETs TP14 and TP15 constituting the switch added to adopt the self-capacitance type. By this means, the number of MOSFETs can be reduced and the increase in area can be suppressed.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A liquid crystal display device comprising:
a liquid crystal element array having a plurality of pixel electrodes and a plurality of switching elements arranged in a matrix form;
a plurality of scanning lines which are arranged in each row of the liquid crystal element array and supply a scanning signal to each of the switching elements;
a plurality of signal lines which are arranged in each column of the liquid crystal element array and supply an image signal to each of the pixel electrodes through each of the switching elements;
a plurality of touch electrodes overlapping the pixel electrodes and arranged in the column of the liquid crystal element array;
a signal line drive circuit which is arranged along one side of the liquid crystal element array parallel to the row of the liquid crystal element array and forms the image signal;
a first circuit which is arranged along the other side of the liquid crystal element array parallel to the row of the liquid crystal element array and is connected to the plurality of touch electrodes;
a second circuit which is arranged along the one side of the liquid crystal element array and is connected to the plurality of touch electrodes,
wherein a touch signal is supplied from the second circuit on the one side of the liquid crystal element array and the touch signal is supplied from the first circuit on the other side of the liquid crystal element array; and
a first voltage wire, a second voltage wire and a third voltage wire connected to the first circuit,
wherein each of the first voltage wire, the second voltage wire and the third voltage wire is arranged along the other side of the liquid crystal element array.

2. The liquid crystal display device according to claim 1, wherein the first circuit supplies the touch signal whose voltage periodically changes between a voltage based on a voltage of the first voltage wire and a voltage based on a voltage of the second voltage wire to a selected touch electrode among the plurality of touch electrodes and the first circuit supplies a voltage based on a voltage of the third voltage wire to a non-selected touch electrode among the plurality of touch electrodes.

3. The liquid crystal display device according to claim 1, wherein the second voltage and the third voltage have the same voltage value.

4. The liquid crystal display device according to claim 3, wherein a line width of the third voltage wire is smaller than a line width of the second voltage wire.

\* \* \* \* \*